United States Patent
Tonesi et al.

(10) Patent No.: US 12,284,624 B2
(45) Date of Patent: Apr. 22, 2025

(54) MULTI-ACCESS PACKET DATA UNIT SESSIONS FOR LOCAL AREA DATA NETWORKS

(71) Applicant: QUALCOMM Incorporated, San Diego, CA (US)

(72) Inventors: Dario Serafino Tonesi, Berlin (DE); Sunghoon Kim, San Diego, CA (US); Waqar Zia, Munich (DE); Lenaig Genevieve Chaponniere, La Jolla, CA (US); Stefano Faccin, San Ysidro, CA (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 17/537,337

(22) Filed: Nov. 29, 2021

(65) Prior Publication Data

US 2022/0264508 A1   Aug. 18, 2022

Related U.S. Application Data

(60) Provisional application No. 63/150,526, filed on Feb. 17, 2021.

(51) Int. Cl.
*H04W 60/04* (2009.01)
*H04W 48/02* (2009.01)
*H04W 76/15* (2018.01)

(52) U.S. Cl.
CPC ........... *H04W 60/04* (2013.01); *H04W 48/02* (2013.01); *H04W 76/15* (2018.02)

(58) Field of Classification Search
CPC ...... H04W 60/04; H04W 76/15; H04W 48/02
See application file for complete search history.

(56) References Cited

U.S. PATENT DOCUMENTS

2019/0394833 A1\* 12/2019 Talebi Fard ........ H04W 68/005
2020/0120752 A1   4/2020 Hu et al.
(Continued)

FOREIGN PATENT DOCUMENTS

EP          4266816 A1 \* 10/2023   ............ H04W 76/18
WO     WO-2020100719 A1    5/2020

OTHER PUBLICATIONS

Partial International Search Report—PCT/US2022/011628—ISA/EPO—Apr. 13, 2022 (2102982WO).
(Continued)

*Primary Examiner* — Pamit Kaur
(74) *Attorney, Agent, or Firm* — Holland & Hart LLP

(57) ABSTRACT

Methods, systems, and devices for wireless communications are described. Generally, a network may establish a multiple access (MA) packet data unit (PDU) session for a local area data network (LADN) and may reconfigure a registration area to map to a LADN service area. A network may establish an MA PDU session for an LADN, but may steer traffic to only one of two access links. A network may reject a request for an MA PDU if it is for an LADN. A user equipment (UE) may be configured to trigger a UE registration update or other location information if it leaves an LADN service area while in an idle mode with one access network and a connected mode with the other access network. A UE may request LADN registration, and the network may provide the UE with an indication that MA PDU sessions for the LADN are not supported.

26 Claims, 26 Drawing Sheets

(56) References Cited

U.S. PATENT DOCUMENTS

| | | | |
|---|---|---|---|
| 2020/0305118 A1 | 9/2020 | Ryu et al. | |
| 2020/0337093 A1* | 10/2020 | Kim | H04W 64/00 |
| 2021/0410010 A1* | 12/2021 | Salkintzis | H04W 76/10 |
| 2022/0015158 A1 | 1/2022 | Kawasaki et al. | |
| 2022/0132454 A1* | 4/2022 | Youn | H04W 76/32 |
| 2023/0132058 A1* | 4/2023 | Youn | H04L 12/14 |
| | | | 370/329 |

OTHER PUBLICATIONS

International Search Report and Written Opinion—PCT/US2022/011628—ISA/EPO—Jul. 28, 2022 (2102982WO).
ZTE: "Clarification on Handling of MA PDU Session for LADN DNN", 3GPP TSG-CT WG1 Meeting #127-e, C1-207453, 3rd Generation Partnership Project (3GPP), Mobile Competence Centre, 650, Route Des Lucioles, F-06921 Sophia-Antipolis Cedex, France, vol. CT WG1, No. Electronic meeting, Nov. 13, 2020-Nov. 20, 2020, Nov. 6, 2020 (Nov. 6, 2020), 3 Pages, XP051951983, C1-207453 LADN MA PDU.docx [retrieved on Nov. 6, 2020], The whole document.

* cited by examiner

MULTI-ACCESS PACKET DATA UNIT SESSIONS FOR LOCAL AREA DATA NETWORKS

CROSS REFERENCE

The present application for Patent claims the benefit of U.S. Provisional Patent Application No. 63/150,526 by Tonesi et al., entitled "MULTI-ACCESS PACKET DATA UNIT SESSIONS FOR LOCAL AREA DATA NETWORKS," filed Feb. 17, 2021, assigned to the assignee hereof, and expressly incorporated by reference herein.

FIELD OF TECHNOLOGY

The following relates to wireless communications, including multi-access packet data unit sessions for local area data networks.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). In some examples, wireless communications systems may support multiple access procedures.

SUMMARY

The described techniques relate to improved methods, systems, devices, and apparatuses that support multi-access packet data unit sessions for local area data networks. Generally, the described techniques may ensure that user plane resources are not erroneously allocated to a user equipment (UE) that leaves a local area data network (LADN) service area while operating in a multiple access (MA) packet data unit (PDU) session and in an idle mode with one of two access networks. For example, upon establishing an MA PDU session using a first access network (e.g., a 3GPP access network) and a second access network (e.g., a non-3GPP access network) for an LADN, the network may reconfigure registration areas for the first access network to match or otherwise be associated with the LADN service area.

In some examples, the network may support establishment of MA PDU sessions for LADNs, but may steer all traffic to the first access network and away from the second access network. In some examples, the network may simply reject requests for an MA PDU session if it is for an LADN. In some examples, the UE may be configured with one or more triggering conditions for reporting location information or UE configuration updates upon leaving an LADN service area during an MA PDU session. In some examples, the network may indicate (e.g., implicitly or explicitly) whether it supports MA PDU sessions for LADNs during registration with the LADN.

A method for wireless communications at a network entity is described. The method may include receiving, from a user equipment (UE), a request to establish a multiple access communication session including a first wireless communications link with the UE via a first access network associated with a first registration area and a second wireless communications link with the UE via a second access network associated with a second registration area, establishing, according to a multiple access communication configuration, the multiple access communication session with the UE based on receiving the request, and transmitting, to the UE, an area configuration update message that reconfigures the first registration area according to a mapping with a local area data network service area associated with the multiple access communication session.

An apparatus for wireless communications at a network entity is described. The apparatus may include a processor, memory coupled with the processor, and instructions stored in the memory. The instructions may be executable by the processor to cause the apparatus to receive, from a UE, a request to establish a multiple access communication session including a first wireless communications link with the UE via a first access network associated with a first registration area and a second wireless communications link with the UE via a second access network associated with a second registration area, establish, according to a multiple access communication configuration, the multiple access communication session with the UE based on receiving the request, and transmit, to the UE, an area configuration update message that reconfigures the first registration area according to a mapping with a local area data network service area associated with the multiple access communication session.

Another apparatus for wireless communications at a network entity is described. The apparatus may include means for receiving, from a UE, a request to establish a multiple access communication session including a first wireless communications link with the UE via a first access network associated with a first registration area and a second wireless communications link with the UE via a second access network associated with a second registration area, means for establishing, according to a multiple access communication configuration, the multiple access communication session with the UE based on receiving the request, and means for transmitting, to the UE, an area configuration update message that reconfigures the first registration area according to a mapping with a local area data network service area associated with the multiple access communication session.

A non-transitory computer-readable medium storing code for wireless communications at a network entity is described. The code may include instructions executable by a processor to receive, from a UE, a request to establish a multiple access communication session including a first wireless communications link with the UE via a first access network associated with a first registration area and a second wireless communications link with the UE via a second access network associated with a second registration area, establish, according to a multiple access communication configuration, the multiple access communication session with the UE based on receiving the request, and transmit, to the UE, an area configuration update message that reconfigures the first registration area according to a mapping with a local area data network service area associated with the multiple access communication session.

Some examples of the method, apparatuses, and non-transitory computer-readable medium described herein may further include operations, features, means, or instructions for reconfiguring the first registration area by mapping the first registration area according to a mapping with the local area data network service area by mapping one or more aspects of a geographic boundary of the first registration area to one or more corresponding aspects of a geographic boundary of the local area data network service area, where transmitting the area configuration update message may be based on the reconfiguring.

Some examples of the method, apparatuses, and non-transitory computer-readable medium described herein may further include operations, features, means, or instructions for receiving, from the UE, a UE location update message with reference to the first registration area, determining, based on receiving the UE location update message and on the reconfigured first registration area, that the UE may have left the local area data network service area, and terminating the multiple access communications session with the UE based on the determining.

In some examples of the method, apparatuses, and non-transitory computer-readable medium described herein, the multiple access communication configuration includes one or more conditions and establishing the multiple access communication session may be based on determining that the one or more conditions may be satisfied.

In some examples of the method, apparatuses, and non-transitory computer-readable medium described herein, the multiple access communication session includes a multiple access packet data unit session.

In some examples of the method, apparatuses, and non-transitory computer-readable medium described herein, the network entity includes an access and mobility management functionality.

In some examples of the method, apparatuses, and non-transitory computer-readable medium described herein, the first wireless communications link includes a first radio access technology link and the second wireless communications link may be a second radio access technology link that may be different than the first radio access technology link.

In some examples of the method, apparatuses, and non-transitory computer-readable medium described herein, the first wireless communication link includes a cellular link and the first registration area includes one or more tracking areas, the second wireless communications link includes a non-cellular link and the second registration area includes one or more tracking areas, and the local area data network service area includes one or more of the tracking areas of the first registration area.

A method for wireless communications at a UE is described. The method may include transmitting, to a network entity, a request to establish a multiple access communication session including a first wireless communications link with the network entity via a first access network associated with a first registration area and a second wireless communications link with the network entity via a second access network associated with a second registration area, establishing the multiple access communication session with the network entity based on transmitting the request, and receiving, from the network entity according to a multiple access communication configuration, an area configuration update message that reconfigures the first registration area according to a mapping with a local area data network service area associated with the multiple access communication session.

An apparatus for wireless communications at a UE is described. The apparatus may include a processor, memory coupled with the processor, and instructions stored in the memory. The instructions may be executable by the processor to cause the apparatus to transmit, to a network entity, a request to establish a multiple access communication session including a first wireless communications link with the network entity via a first access network associated with a first registration area and a second wireless communications link with the network entity via a second access network associated with a second registration area, establish the multiple access communication session with the network entity based on transmitting the request, and receive, from the network entity according to a multiple access communication configuration, an area configuration update message that reconfigures the first registration area according to a mapping with a local area data network service area associated with the multiple access communication session.

Another apparatus for wireless communications at a UE is described. The apparatus may include means for transmitting, to a network entity, a request to establish a multiple access communication session including a first wireless communications link with the network entity via a first access network associated with a first registration area and a second wireless communications link with the network entity via a second access network associated with a second registration area, means for establishing the multiple access communication session with the network entity based on transmitting the request, and means for receiving, from the network entity according to a multiple access communication configuration, an area configuration update message that reconfigures the first registration area according to a mapping with a local area data network service area associated with the multiple access communication session.

A non-transitory computer-readable medium storing code for wireless communications at a UE is described. The code may include instructions executable by a processor to transmit, to a network entity, a request to establish a multiple access communication session including a first wireless communications link with the network entity via a first access network associated with a first registration area and a second wireless communications link with the network entity via a second access network associated with a second registration area, establish the multiple access communication session with the network entity based on transmitting the request, and receive, from the network entity according to a multiple access communication configuration, an area configuration update message that reconfigures the first registration area according to a mapping with a local area data network service area associated with the multiple access communication session.

Some examples of the method, apparatuses, and non-transitory computer-readable medium described herein may further include operations, features, means, or instructions for transmitting, to the network entity, a UE location update message with reference to the first registration area and terminating the multiple access communication session based on leaving the first registration area transmitting the UE location update message.

In some examples of the method, apparatuses, and non-transitory computer-readable medium described herein, the multiple access communication session includes a multiple access packet data unit session.

In some examples of the method, apparatuses, and non-transitory computer-readable medium described herein, the network entity includes an access and mobility management functionality.

In some examples of the method, apparatuses, and non-transitory computer-readable medium described herein, the first wireless communications link includes a first radio access technology link and the second wireless communications link may be a second radio access technology link that may be different than the first radio access technology link.

In some examples of the method, apparatuses, and non-transitory computer-readable medium described herein, the first wireless communication link includes a cellular link and the first registration area includes one or more tracking areas, the second wireless communications link includes a non-cellular link and the second registration area includes one or more tracking areas, and the local area data network service area includes one or more of the tracking areas of the first registration area.

A method for wireless communications at a network entity is described. The method may include receiving, from a UE, a request to establish a multiple access communication session including a first wireless communications link with the UE via a first access network associated with a first registration area and a second wireless communications link with the UE via a second access network associated with a second registration area, where a local area data network is associated with the requested multiple access communication session, establishing, according to a multiple access communication configuration, the multiple access communication session with the UE based on receiving the request, and allocating a full amount of communications resources for the multiple access communication session to the first wireless communications link based on the multiple access communication configuration.

An apparatus for wireless communications at a network entity is described. The apparatus may include a processor, memory coupled with the processor, and instructions stored in the memory. The instructions may be executable by the processor to cause the apparatus to receive, from a UE, a request to establish a multiple access communication session including a first wireless communications link with the UE via a first access network associated with a first registration area and a second wireless communications link with the UE via a second access network associated with a second registration area, where a local area data network is associated with the requested multiple access communication session, establish, according to a multiple access communication configuration, the multiple access communication session with the UE based on receiving the request, and allocate a full amount of communications resources for the multiple access communication session to the first wireless communications link based on the multiple access communication configuration.

Another apparatus for wireless communications at a network entity is described. The apparatus may include means for receiving, from a UE, a request to establish a multiple access communication session including a first wireless communications link with the UE via a first access network associated with a first registration area and a second wireless communications link with the UE via a second access network associated with a second registration area, where a local area data network is associated with the requested multiple access communication session, means for establishing, according to a multiple access communication configuration, the multiple access communication session with the UE based on receiving the request, and means for allocating a full amount of communications resources for the multiple access communication session to the first wireless communications link based on the multiple access communication configuration.

A non-transitory computer-readable medium storing code for wireless communications at a network entity is described. The code may include instructions executable by a processor to receive, from a UE, a request to establish a multiple access communication session including a first wireless communications link with the UE via a first access network associated with a first registration area and a second wireless communications link with the UE via a second access network associated with a second registration area, where a local area data network is associated with the requested multiple access communication session, establish, according to a multiple access communication configuration, the multiple access communication session with the UE based on receiving the request, and allocate a full amount of communications resources for the multiple access communication session to the first wireless communications link based on the multiple access communication configuration.

Some examples of the method, apparatuses, and non-transitory computer-readable medium described herein may further include operations, features, means, or instructions for allocating none of the communications resources for the multiple access communication session to the second wireless communications link based on the multiple access communication configuration.

Some examples of the method, apparatuses, and non-transitory computer-readable medium described herein may further include operations, features, means, or instructions for transmitting, to the UE, a load balancing parameter indicating that the full amount of communications resources for the multiple access communication session may be to be allocated to the first wireless communications link.

In some examples of the method, apparatuses, and non-transitory computer-readable medium described herein, the multiple access communication configuration includes one or more conditions and establishing the multiple access communication session may be based on determining that the one or more conditions may be satisfied.

In some examples of the method, apparatuses, and non-transitory computer-readable medium described herein, the multiple access communication session includes a multiple access packet data unit session.

In some examples of the method, apparatuses, and non-transitory computer-readable medium described herein, the network entity includes an access and mobility management functionality.

In some examples of the method, apparatuses, and non-transitory computer-readable medium described herein, the first wireless communications link includes a first radio access technology link and the second wireless communications link may be a second radio access technology link that may be different than the first radio access technology link.

In some examples of the method, apparatuses, and non-transitory computer-readable medium described herein, the first wireless communication link includes a cellular link and the first registration area includes one or more tracking areas, the second wireless communications link includes a non-cellular link and the second registration area includes one or more tracking areas, and the local area data network service area includes one or more of the tracking areas of the first registration area.

A method for wireless communications at a network entity is described. The method may include receiving, from a UE, a request to establish a multiple access communication session including a first wireless communications link with the UE via a first access network associated with a first registration area and a second wireless communications link with the UE via a second access network associated with a second registration area, referring to a multiple access communication configuration including one or more rules for establishing multiple access communication sessions for local area data networks, and rejecting the request to establish the multiple access communication session based on the one or more rules and determining that the request to establish the multiple access communication session indicates a local area data network.

An apparatus for wireless communications at a network entity is described. The apparatus may include a processor, memory coupled with the processor, and instructions stored in the memory. The instructions may be executable by the processor to cause the apparatus to receive, from a UE, a request to establish a multiple access communication session including a first wireless communications link with the UE via a first access network associated with a first registration area and a second wireless communications link with the UE via a second access network associated with a second registration area, refer to a multiple access communication configuration including one or more rules for establishing multiple access communication sessions for local area data networks, and reject the request to establish the multiple access communication session based on the one or more rules and determining that the request to establish the multiple access communication session indicates a local area data network.

Another apparatus for wireless communications at a network entity is described. The apparatus may include means for receiving, from a UE, a request to establish a multiple access communication session including a first wireless communications link with the UE via a first access network associated with a first registration area and a second wireless communications link with the UE via a second access network associated with a second registration area, means for referring to a multiple access communication configuration including one or more rules for establishing multiple access communication sessions for local area data networks, and means for rejecting the request to establish the multiple access communication session based on the one or more rules and determining that the request to establish the multiple access communication session indicates a local area data network.

A non-transitory computer-readable medium storing code for wireless communications at a network entity is described. The code may include instructions executable by a processor to receive, from a UE, a request to establish a multiple access communication session including a first wireless communications link with the UE via a first access network associated with a first registration area and a second wireless communications link with the UE via a second access network associated with a second registration area, refer to a multiple access communication configuration including one or more rules for establishing multiple access communication sessions for local area data networks, and reject the request to establish the multiple access communication session based on the one or more rules and determining that the request to establish the multiple access communication session indicates a local area data network.

Some examples of the method, apparatuses, and non-transitory computer-readable medium described herein may further include operations, features, means, or instructions for transmitting, to the UE, an indication that the multiple access communication session may be not supported for the local area data network.

In some examples of the method, apparatuses, and non-transitory computer-readable medium described herein, the network entity includes an access and mobility management functionality.

In some examples of the method, apparatuses, and non-transitory computer-readable medium described herein, the first wireless communications link includes a first radio access technology link and the second wireless communications link may be a second radio access technology link that may be different than the first radio access technology link.

A method for wireless communications at a UE is described. The method may include transmitting, to a network entity, a request to establish a multiple access communication session including a first wireless communications link with the network entity via a first access network associated with a first registration area and a second wireless communications link with the network entity via a second access network associated with a second registration area, where a local area data network is associated with the requested multiple access communication session, receiving, from the network entity, an indication that the multiple access communication session is not supported for the local area data network; and determining that the request to establish the multiple access communication session has been rejected.

An apparatus for wireless communications at a UE is described. The apparatus may include a processor, memory coupled with the processor, and instructions stored in the memory. The instructions may be executable by the processor to cause the apparatus to transmit, to a network entity, a request to establish a multiple access communication session including a first wireless communications link with the network entity via a first access network associated with a first registration area and a second wireless communications link with the network entity via a second access network associated with a second registration area, where a local area data network is associated with the requested multiple access communication session, receive, from the network entity, an indication that the multiple access communication session is not supported for the local area data network, and determine that the request to establish the multiple access communication session has been rejected.

Another apparatus for wireless communications at a UE is described. The apparatus may include means for transmitting, to a network entity, a request to establish a multiple access communication session including a first wireless communications link with the network entity via a first access network associated with a first registration area and a second wireless communications link with the network entity via a second access network associated with a second registration area, where a local area data network is associated with the requested multiple access communication session, means for receiving, from the network entity, an indication that the multiple access communication session is not supported for the local area data network, and means for determining that the request to establish the multiple access communication session has been rejected.

A non-transitory computer-readable medium storing code for wireless communications at a UE is described. The code may include instructions executable by a processor to transmit, to a network entity, a request to establish a multiple access communication session including a first wireless communications link with the network entity via a first access network associated with a first registration area and a second wireless communications link with the network entity via a second access network associated with a second registration area, where a local area data network is associated with the requested multiple access communication session, receive, from the network entity, an indication that the multiple access communication session is not supported for the local area data network, and determine that the request to establish the multiple access communication session has been rejected.

In some examples of the method, apparatuses, and non-transitory computer-readable medium described herein, the network entity includes an access and mobility management functionality.

In some examples of the method, apparatuses, and non-transitory computer-readable medium described herein, the first wireless communications link includes a first radio access technology link and the second wireless communications link may be a second radio access technology link that may be different than the first radio access technology link.

A method for wireless communications at a UE is described. The method may include transmitting, to a network entity, a request to establish a multiple access communication session including a first wireless communications link with the network entity via a first access network associated with a first registration area and a second wireless communications link with the network entity via a second access network associated with a second registration area, where a local area data network is associated with the requested multiple access communication session, establishing the multiple access communication session with the network entity based on transmitting the request, and transmitting, to an access node based on leaving a local area data network service area for the local area data network while in an idle mode over the first wireless communications link and a connected mode over the second wireless communications link, an indication that the UE has left the local area data network service area.

An apparatus for wireless communications at a UE is described. The apparatus may include a processor, memory coupled with the processor, and instructions stored in the memory. The instructions may be executable by the processor to cause the apparatus to transmit, to a network entity, a request to establish a multiple access communication session including a first wireless communications link with the network entity via a first access network associated with a first registration area and a second wireless communications link with the network entity via a second access network associated with a second registration area, where a local area data network is associated with the requested multiple access communication session, establish the multiple access communication session with the network entity based on transmitting the request, and transmit, to an access node based on leaving a local area data network service area for the local area data network while in an idle mode over the first wireless communications link and a connected mode over the second wireless communications link, an indication that the UE has left the local area data network service area.

Another apparatus for wireless communications at a UE is described. The apparatus may include means for transmitting, to a network entity, a request to establish a multiple access communication session including a first wireless communications link with the network entity via a first access network associated with a first registration area and a second wireless communications link with the network entity via a second access network associated with a second registration area, where a local area data network is associated with the requested multiple access communication session, means for establishing the multiple access communication session with the network entity based on transmitting the request, and means for transmitting, to an access node based on leaving a local area data network service area for the local area data network while in an idle mode over the first wireless communications link and a connected mode over the second wireless communications link, an indication that the UE has left the local area data network service area.

A non-transitory computer-readable medium storing code for wireless communications at a UE is described. The code may include instructions executable by a processor to transmit, to a network entity, a request to establish a multiple access communication session including a first wireless communications link with the network entity via a first access network associated with a first registration area and a second wireless communications link with the network entity via a second access network associated with a second registration area, where a local area data network is associated with the requested multiple access communication session, establish the multiple access communication session with the network entity based on transmitting the request, and transmit, to an access node based on leaving a local area data network service area for the local area data network while in an idle mode over the first wireless communications link and a connected mode over the second wireless communications link, an indication that the UE has left the local area data network service area.

In some examples of the method, apparatuses, and non-transitory computer-readable medium described herein, transmitting the indication that the UE may have left the local area data network service area may include operations, features, means, or instructions for transmitting, to a base station, a UE registration update via the first wireless communications link.

In some examples of the method, apparatuses, and non-transitory computer-readable medium described herein, transmitting the indication that the UE may have left the local area data network service area may include operations, features, means, or instructions for transmitting, to a network entity, the indication that the UE may have left the local area data network service area via the second wireless communications link.

Some examples of the method, apparatuses, and non-transitory computer-readable medium described herein may further include operations, features, means, or instructions for identifying trigger conditions including a connected mode over the second wireless communications link at the UE and a location of the UE, where transmitting the indication that the UE may have left the local area data network service area may be based on identifying the trigger conditions.

In some examples of the method, apparatuses, and non-transitory computer-readable medium described herein, the multiple access communication session includes a multiple access packet data unit session.

In some examples of the method, apparatuses, and non-transitory computer-readable medium described herein, the network entity includes an access and mobility management functionality.

In some examples of the method, apparatuses, and non-transitory computer-readable medium described herein, the first wireless communications link includes a first radio access technology link and the second wireless communications link may be a second radio access technology link that may be different than the first radio access technology link.

In some examples of the method, apparatuses, and non-transitory computer-readable medium described herein, the first wireless communication link includes a cellular link and the first registration area includes one or more tracking areas, the second wireless communications link includes a non-cellular link and the second registration area includes one or more tracking areas, and the local area data network service area includes one or more of the tracking areas of the first registration area.

A method for wireless communications at a network entity is described. The method may include receiving, from a UE, a request to establish a multiple access communication session including a first wireless communications link with the UE via a first access network associated with a first registration area and a second wireless communications link with the UE via a second access network associated with a second registration area, where a local area data network is associated with the requested multiple access communication session, establishing the multiple access communication session with the network entity based on transmitting the request, and receiving, from the UE via the second wireless communications link based on the UE being in an idle mode over the first wireless communications link and in a connected mode over the second wireless communications link and leaving a local area data network service area for the local area data network, an indication that the UE has left the local area data network service area.

An apparatus for wireless communications at a network entity is described. The apparatus may include a processor, memory coupled with the processor, and instructions stored in the memory. The instructions may be executable by the processor to cause the apparatus to receive, from a UE, a request to establish a multiple access communication session including a first wireless communications link with the UE via a first access network associated with a first registration area and a second wireless communications link with the UE via a second access network associated with a second registration area, where a local area data network is associated with the requested multiple access communication session, establish the multiple access communication session with the network entity based on transmitting the request, and receive, from the UE via the second wireless communications link based on the UE being in an idle mode over the first wireless communications link and in a connected mode over the second wireless communications link and leaving a local area data network service area for the local area data network, an indication that the UE has left the local area data network service area.

Another apparatus for wireless communications at a network entity is described. The apparatus may include means for receiving, from a UE, a request to establish a multiple access communication session including a first wireless communications link with the UE via a first access network associated with a first registration area and a second wireless communications link with the UE via a second access network associated with a second registration area, where a local area data network is associated with the requested multiple access communication session, means for establishing the multiple access communication session with the network entity based on transmitting the request, and means for receiving, from the UE via the second wireless communications link based on the UE being in an idle mode over the first wireless communications link and in a connected mode over the second wireless communications link and leaving a local area data network service area for the local area data network, an indication that the UE has left the local area data network service area.

A non-transitory computer-readable medium storing code for wireless communications at a network entity is described. The code may include instructions executable by a processor to receive, from a UE, a request to establish a multiple access communication session including a first wireless communications link with the UE via a first access network associated with a first registration area and a second wireless communications link with the UE via a second access network associated with a second registration area, where a local area data network is associated with the requested multiple access communication session, establish the multiple access communication session with the network entity based on transmitting the request, and receive, from the UE via the second wireless communications link based on the UE being in an idle mode over the first wireless communications link and in a connected mode over the second wireless communications link and leaving a local area data network service area for the local area data network, an indication that the UE has left the local area data network service area.

In some examples of the method, apparatuses, and non-transitory computer-readable medium described herein, the multiple access communication session includes a multiple access packet data unit session.

In some examples of the method, apparatuses, and non-transitory computer-readable medium described herein, the network entity includes an access and mobility management functionality.

In some examples of the method, apparatuses, and non-transitory computer-readable medium described herein, the first wireless communications link includes a first radio access technology link and the second wireless communications link may be a second radio access technology link that may be different than the first radio access technology link.

In some examples of the method, apparatuses, and non-transitory computer-readable medium described herein, the first wireless communication link includes a cellular link and the first registration area includes one or more tracking areas, the second wireless communications link includes a non-cellular link and the second registration area includes one or more tracking areas, and the local area data network service area includes one or more of the tracking areas of the first registration area.

A method for wireless communications at a network entity is described. The method may include receiving, from a UE, a registration request for a local area data network associated with a local area data network service area, referring to a multiple access communication configuration including one or more rules for establishing multiple access communication sessions, and transmitting, to the UE based on the registration request and the one or more rules, or based on an area configuration update, or any combination thereof, local area data network configuration information including local area data network data network name information, tracking information for the local area data network service area, and an indication that a multiple access communication session for the local area data network is not supported for the UE.

An apparatus for wireless communications at a network entity is described. The apparatus may include a processor, memory coupled with the processor, and instructions stored in the memory. The instructions may be executable by the processor to cause the apparatus to receive, from a UE, a registration request for a local area data network associated with a local area data network service area, refer to a multiple access communication configuration including one or more rules for establishing multiple access communication sessions, and transmit, to the UE based on the registration request and the one or more rules, or based on an area configuration update, or any combination thereof, local area data network configuration information including local area data network data network name information, tracking information for the local area data network service area, and an indication that a multiple access communication session for the local area data network is not supported for the UE.

Another apparatus for wireless communications at a network entity is described. The apparatus may include means for receiving, from a UE, a registration request for a local area data network associated with a local area data network service area, means for referring to a multiple access communication configuration including one or more rules for establishing multiple access communication sessions, and means for transmitting, to the UE based on the registration request and the one or more rules, or based on an area configuration update, or any combination thereof, local area data network configuration information including local area data network data network name information, tracking information for the local area data network service area, and an indication that a multiple access communication session for the local area data network is not supported for the UE.

A non-transitory computer-readable medium storing code for wireless communications at a network entity is described. The code may include instructions executable by a processor to receive, from a UE, a registration request for a local area data network associated with a local area data network service area, refer to a multiple access communication configuration including one or more rules for establishing multiple access communication sessions, and transmit, to the UE based on the registration request and the one or more rules, or based on an area configuration update, or any combination thereof, local area data network configuration information including local area data network data network name information, tracking information for the local area data network service area, and an indication that a multiple access communication session for the local area data network is not supported for the UE.

In some examples of the method, apparatuses, and non-transitory computer-readable medium described herein, the multiple access communication session includes a multiple access packet data unit session.

In some examples of the method, apparatuses, and non-transitory computer-readable medium described herein, the network entity includes an access and mobility management functionality.

In some examples of the method, apparatuses, and non-transitory computer-readable medium described herein, the first wireless communications link includes a first radio access technology link and the second wireless communications link may be a second radio access technology link that may be different than the first radio access technology link.

A method for wireless communications at a UE is described. The method may include transmitting, to a network entity, a registration request for a local area data network associated with a local area data network service area, receiving, from the network entity based on transmitting the registration request, or based on an area configuration update, or any combination thereof, local area data network configuration information including local area data network data network name information, tracking information for the local area data network service area, and an indication that a multiple access communication session for the local area data network is not supported for the UE, and communicating with the network entity via the local area data network based on receiving the local area data network configuration information.

An apparatus for wireless communications at a UE is described. The apparatus may include a processor, memory coupled with the processor, and instructions stored in the memory. The instructions may be executable by the processor to cause the apparatus to transmit, to a network entity, a registration request for a local area data network associated with a local area data network service area, receive, from the network entity based on transmitting the registration request, or based on an area configuration update, or any combination thereof, local area data network configuration information including local area data network data network name information, tracking information for the local area data network service area, and an indication that a multiple access communication session for the local area data network is not supported for the UE, and communicate with the network entity via the local area data network based on receiving the local area data network configuration information.

Another apparatus for wireless communications at a UE is described. The apparatus may include means for transmitting, to a network entity, a registration request for a local area data network associated with a local area data network service area, means for receiving, from the network entity based on transmitting the registration request, or based on an area configuration update, or any combination thereof, local area data network configuration information including local area data network data network name information, tracking information for the local area data network service area, and an indication that a multiple access communication session for the local area data network is not supported for the UE, and means for communicating with the network entity via the local area data network based on receiving the local area data network configuration information.

A non-transitory computer-readable medium storing code for wireless communications at a UE is described. The code may include instructions executable by a processor to transmit, to a network entity, a registration request for a local area data network associated with a local area data network service area, receive, from the network entity based on transmitting the registration request, or based on an area configuration update, or any combination thereof, local area data network configuration information including local area data network data network name information, tracking information for the local area data network service area, and an indication that a multiple access communication session for the local area data network is not supported for the UE, and communicate with the network entity via the local area data network based on receiving the local area data network configuration information.

Some examples of the method, apparatuses, and non-transitory computer-readable medium described herein may further include operations, features, means, or instructions for refraining, based on receiving the local area data network configuration information, from transmitting a request to establish the multiple access communication session including the local area data network and the wireless communications link that may be different than the wireless communication link over which the registration request was transmitted.

In some examples of the method, apparatuses, and non-transitory computer-readable medium described herein, the multiple access communication session includes a multiple access packet data unit session.

In some examples of the method, apparatuses, and non-transitory computer-readable medium described herein, the network entity includes an access and mobility management functionality.

In some examples of the method, apparatuses, and non-transitory computer-readable medium described herein, the first wireless communications link includes a first radio access technology link and the second wireless communications link may be a second radio access technology link that may be different than the first radio access technology link.

DETAILED DESCRIPTION

Figure 1:
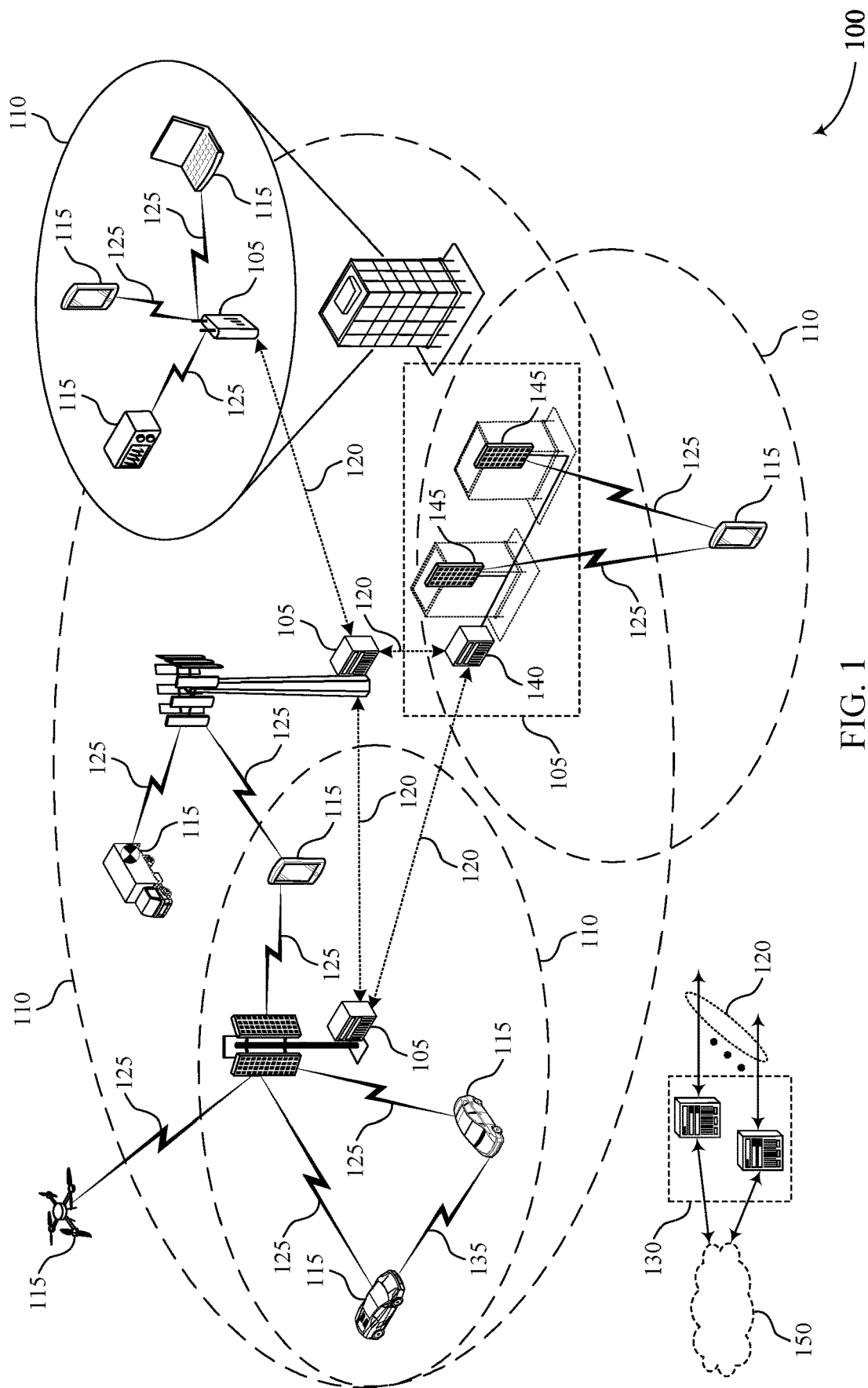
FIG. 1 illustrates an example of a wireless communications system that supports multi-access packet data unit sessions for local area data networks in accordance with aspects of the present disclosure.

Some examples of a wireless communications system may support local area data networks (LADNs). A packet data unit (PDU) session for an LADN may be available in specific LADN service areas (e.g., geographic coverage areas spanning one or more tracking areas). A user equipment (UE) may be permitted to request user plane resources for the LADN if it is located within the LADN service area, but may be restricted from requesting user plane resources for the LADN if the UE is located outside of the LADN service area. A network entity (e.g., a network access and mobility management function (AMF)) may determine whether a UE is located inside or outside of the LADN service area, and may inform another network entity (e.g., a session management function (SMF)) such that the LADN does not provide user plane resources to the UE if it is outside of the LADN service area. However, the AMF may not be aware of the UE presence inside of or outside of the LADN service area if the UE is in an idle mode.

Some examples of a wireless communications system may support multiple access MA PDU sessions. In such examples, the wireless communications system (e.g. a 5G system) may support dual connections between a UE and a data network. MA PDU sessions may support a data connection between the UE and the data network by simultaneously using two wireless communication links (e.g., a cellular access network and a non-cellular access network, a 3GPP access network and a non-3GPP access network, two different 3GPP access networks, or the like). Thus, the UE may access user plane resources on two access networks to utilize a data network. The UE may add user plane resources on one access network (e.g., one link) of the MA PDU session by sending a PDU session establishment request over the access network containing PDU session identifier information of the MA PDU session.

In some examples, a wireless communications system may support a MA PDU session for a LADN. For instance, a LADN may support local services (e.g., a stadium may provide live streaming on multi-viewpoint, live chat for event spectators, etc.). Users in the stadium may experience latency or reduced user experience on a first wireless communications link (e.g., a 3GPP link) resulting in congestion of user plane resources. However, a MA PDU session for spectators located within the LADN service area (e.g., within the stadium) may allow for applying access traffic steering, switching, splitting (ATSSS) procedures for stadium specific traffic (e.g., LADN services) such that traffic overload over the 3GPP access network may be mitigated.

Thus, MA PDU sessions for LADNs may result in decreased congestion, more efficient use of resources, decreased system latency, and the like.

The network may allow the UE to access user plane resources for the LADN if the UE is located within the LADN service area. The UE may utilize user plane resources to communicate with the local area data network via two links (e.g., a 3GPP access network and a non-3GPP access network). However, if the UE is in idle mode (e.g., with respect to the 3GPP link), one or more network entities (e.g., the AMF, the SMF, or the like) may be unaware of whether the UE is located within the LADN service area. Further, the tracking areas of the 3GPP registration area and the tracking areas of the non-3GPP registration area may not be the same, or may not be aligned. Thus, the UE may leave an LADN service area but still be located within a 3GPP registration area. Additionally, the UE may not be configured to provide the network with any indication of its location with reference to the LADN service area. Thus, if the UE is in idle mode on one wireless access network (e.g., the 3GPP access network) and in connected mode on the other wireless access network of the MA PDU session (e.g., the non-3GPP access network), and moves out of the LADN service area (e.g., but remains in a registration area for the 3GPP access network), then the UE may continue to utilize user plane resources over the non-3GPP access network, which the core network should not permit (e.g., because the network does not support LADN services for the UE if it is outside of the LADN service area). However, unless the UE triggers the notifications towards the network of information regarding its location with reference to the LADN service area, the network may have no way of determining that it should terminate the MA PDU session for the UE. This may result in decreases in the benefits provided by the MA PDU session for the LADN, increased system congestion, increased system latency, and reduced user experience.

In some examples, the network may support establishment of MA PDU sessions for LADNs. However, upon establishing the MA PDU session using a first access network (e.g., a 3GPP access network) and a second access network (e.g., a non-3GPP access network), the network may reconfigure registration areas for the first access network to match or otherwise be associated with the LADN service area. By reconfiguring the registration areas of the first access network, the network (e.g., an AMF) may determine whether a UE is located within the LADN service area based on its location in the reconfigured registration areas.

In some examples, the network may support establishment of MA PDU sessions for LADNs, but may steer all traffic to the first access network (e.g., the 3GPP network) and away from the second access network. Thus, although an MA PDU session is established, the UE may not be able to continue to use the LADN services via the non-3GPP access network when it leaves the LADN service area.

In some examples, the network may simply reject requests for an MA PDU session if it is for an LADN. For example, the network may reject the request for an MA PDU session, and may indicate that the LADN is not available, not supported, or another indication. The UE may subsequently refrain from requesting MA PDU sessions for LADNs.

In some examples, the UE may be configured with one or more updated triggering conditions for reporting location information or UE configuration updates upon leaving an LADN service area during an MA PDU session. For example, the UE may determine that it has left the LADN service area, and may transmit a mobility registration update according to one or more configured triggering conditions (e.g., the UE is in idle mode on the first access network and is connected mode on the second access network, and has left the LADN service area). In some examples, the UE may transmit such a mobility registration update via the first access network (e.g., may transmit a mobility registration update message as it would do if it were leaving the registration area of the 3GPP access network, but may do so upon leaving the LADN service area instead). In some examples, the UE may transmit location information or a mobility registration update or both via the second access network (e.g., a new message using the non-3GPP access network).

In some examples, the network may indicate (e.g., implicitly or explicitly) whether it supports MA PDU sessions for LADNs during registration with the LADN. For instance, a UE may transmit a request to register with the LADN. If the network does not support the MA PDU for the LADN, the network may include an indication that MA PDUs are not supported for the LADN in the LADN registration information. If such information is included in the LADN registration information, the UE may refrain from requesting the MA PDU session for the LADN. If the network supports MA PDUs for the LADN, the network may provide LADN registration information without an indication that the network does not support the MA PDU for the LADN. The UE may assume that MA PDU session for the LADN are supported (e.g., based on the lack of an indication to the contrary), and may subsequently request to establish an MA PDU session for the LADN.

Aspects of the disclosure are initially described in the context of wireless communications systems. Aspects of the disclosure are further illustrated by and described with reference to wireless communications systems and process flows. Aspects of the disclosure are further illustrated by and described with reference to apparatus diagrams, system diagrams, and flowcharts that relate to multi-access packet data unit sessions for local area data networks.

FIG. 1 illustrates an example of a wireless communications system 100 that supports multi-access packet data unit sessions for local area data networks in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, upon establishing an MA PDU session using a first access network (e.g., a 3GPP access network) and a second access network (e.g., a non-3GPP access network) for an LADN, the network may reconfigure registration areas for the first access network to match or otherwise be associated with the LADN service area. In some examples, the network may support establishment of MA PDU sessions for LADNs, but may steer all traffic to the first access network and away from the second access network. In some examples, the network may simply reject requests for an MA PDU session if it is for an LADN. In some examples, a UE 115 may be configured with one or more triggering conditions for reporting location information or UE 115 configuration updates upon leaving an LADN service area during an MA PDU session. In some examples, the network may indicate (e.g., implicitly or explicitly) whether it supports MA PDU sessions for LADNs during registration with the LADN.

Figure 2:
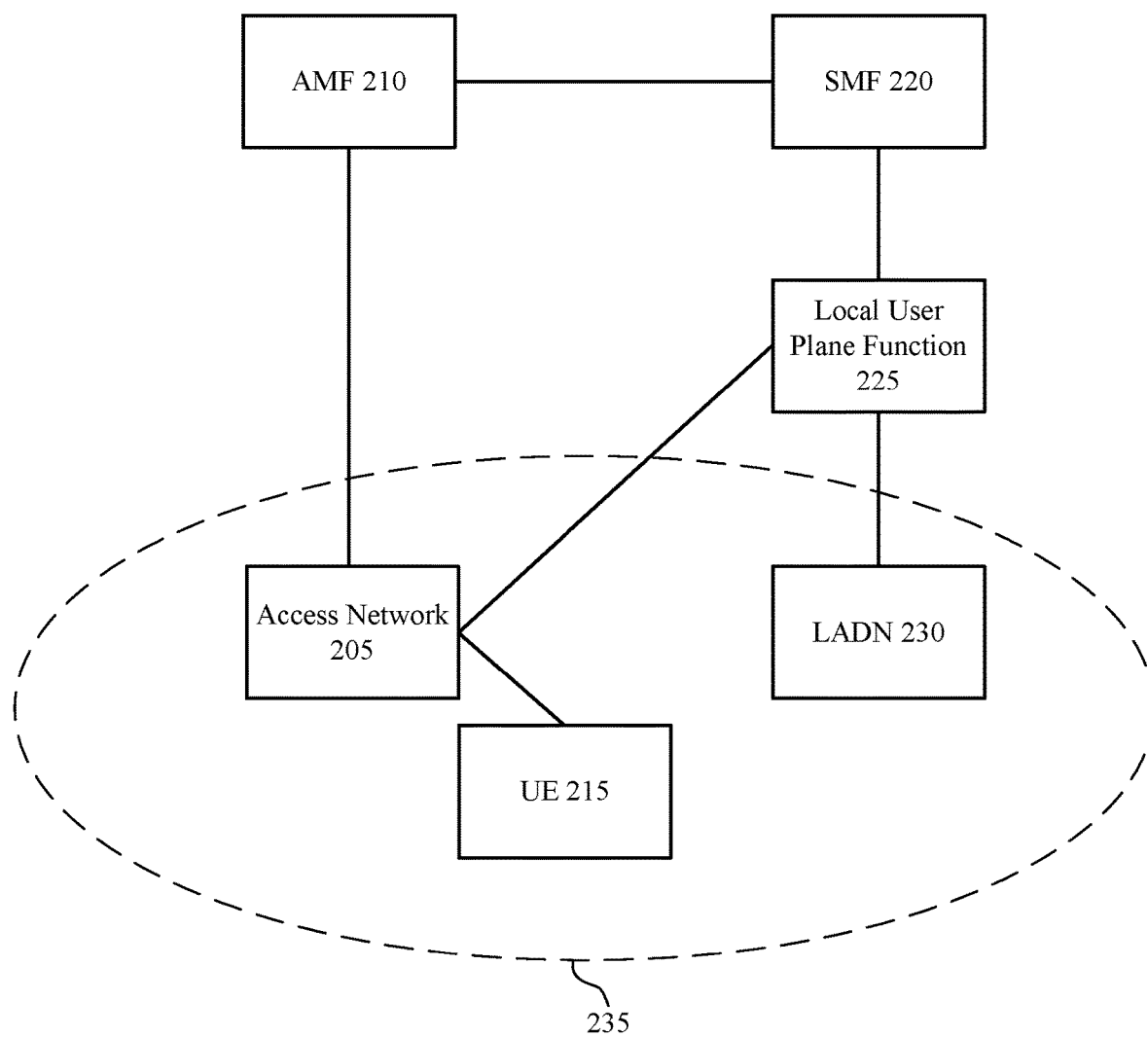
FIG. 2 illustrates an example of a wireless communications system that supports multi-access packet data unit sessions for local area data networks in accordance with aspects of the present disclosure.

FIG. 2 illustrates an example of a wireless communications system 200 that supports MA PDU sessions for LADNs in accordance with aspects of the present disclosure. Wireless communications system 200 may include a UE 215, network devices (e.g., base stations 105), and other various network entities and functionalities, which may be examples of corresponding devices, entities, and functionalities, as described with reference to FIG. 1.

In some examples, a wireless communications system may support data sessions for UE 215 with an LADN 230. A PDU session with LADN 230 may be available within an LADN service area 235. LADN service area 235 may include a set of tracking areas (TAs) belong to a registration area for an access network 205. Access network 205 may be, for example, a cellular network such as a 3GPP access network. The UE may access the LADN 230 via access network 205 (e.g., via one or more base stations 105), which may provide access to local user plane function 225. Thus, UE 215 may communicate with the LADN 230 via the access network 205 and the local user plane function 225.

LADN 230 may provide service to UE 215 while UE 215 is located within LADN service area 235. If UE 215 leaves LADN service area 235, then the network may terminate the PDU session. One or more network entities may determine the location of UE 215 within the LADN service area 235. For example, access and mobility management function (AMF) 210 may determine UE presence inside or outside of LADN service area 235. AMF 210 may provide this information to session management function (SMF 220), which may control whether local user plane function 225 provides UE 215 with user plane resources for the PDU session with LADN 230 based on whether UE 215 is located within LADN service area 235.

However, as described in greater detail herein with reference to FIGS. 4-10, LADN 230 may be part of a MA PDU session. In such examples, AMF 210 may not be able to determine UE 215 presence inside or outside of LADN service area 235 if UE is in idle mode (e.g., a mode where the UE refrains from providing a location information update upon leaving or moving between defined geographic areas). Thus, if UE 215 leaves LADN service area 235 while in idle mode (and in a connected mode on a second access network as part of the MA PDU session), AMF 210 should terminate the PDU session with LADN 230. However, if AMF 210 cannot determine the location of UE 215 with reference to LADN service area 235, the MA PDU session may not be appropriately terminated.

In some examples, as described in greater detail with reference to FIG. 3, UE 215 may establish an MA PDU session, which may be for an LADN. However, if UE 215 leaves the LADN service area 235 during an MA PDU session, UE 215 may use user plane resources that should not be allocated to it. Thus, as described in greater detail with reference to FIGS. 4-10, UE 215 may determine, or the network may indicate, when or whether MA PDU sessions are permitted for LADN 230. In some examples, MA PDU sessions may be supported, and UE 215 may indicate, or the network may otherwise determine, the location of UE 215 with reference to LADN service area 235.

Figure 3:
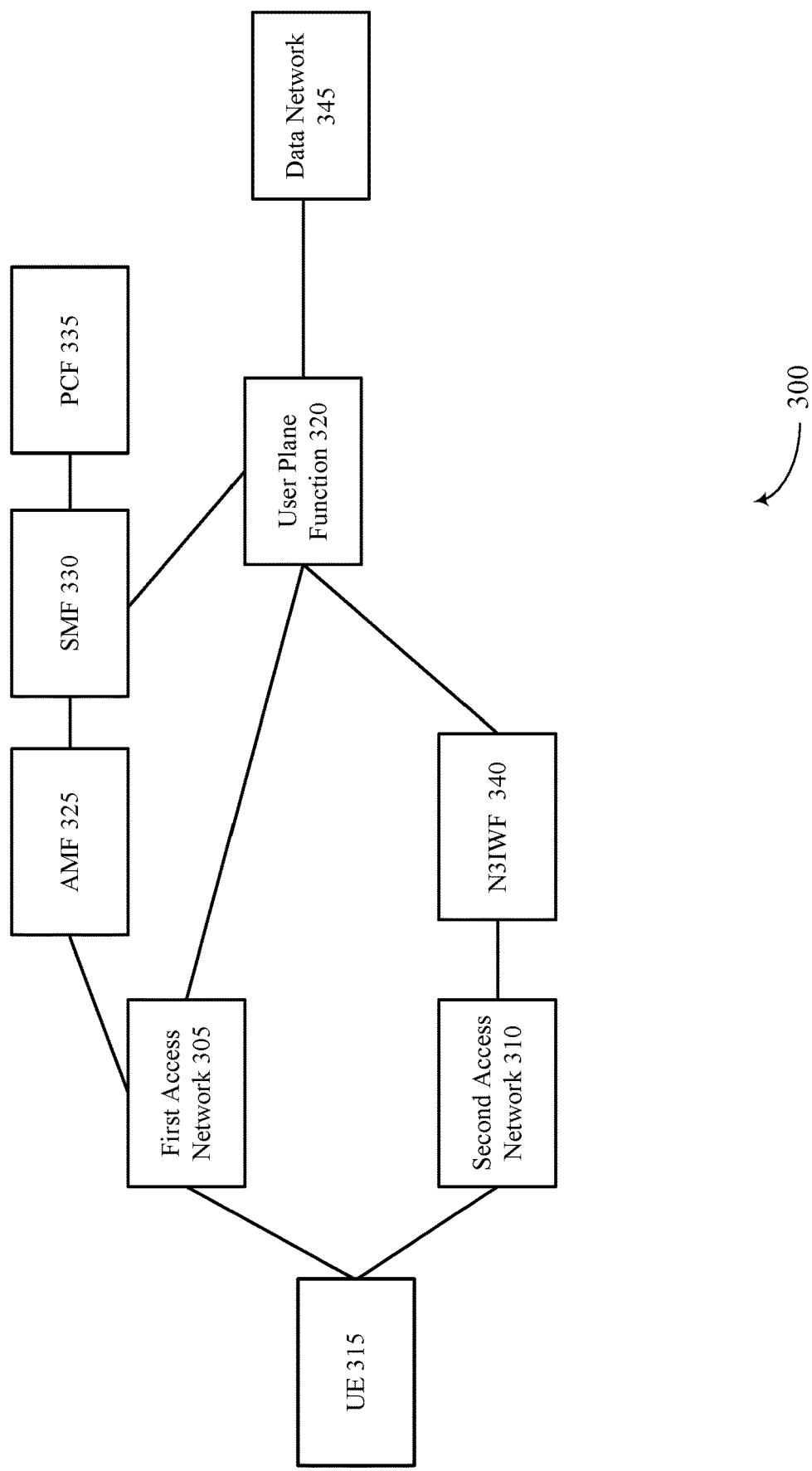
FIG. 3 illustrates an example of a wireless communications system that supports multi-access packet data unit sessions for local area data networks in accordance with aspects of the present disclosure.

FIG. 3 illustrates an example of a wireless communications system 300 that supports MA PDU sessions for LADNs in accordance with aspects of the present disclosure. Wireless communications system 300 may include a UE 315, network devices (e.g., base stations 105), and other various network entities and functionalities, which may be examples of corresponding devices, entities, and functionalities, as described with reference to FIGS. 1 and 2.

A wireless communications system may support MA PDU sessions. MA PDU sessions may support ATSSS procedures, allowing the network to steer, switch, or split, or otherwise allocate communications to a UE via multiple access networks. Thus, a UE 315 may communicate with the network and establish a PDU session with data network 345 via two wireless communications links (e.g., via two access networks). That is, an MA PDU may enable a connection between UE 315 and data network 345 by simultaneously using a first access network 305 (e.g., a 3GPP access network) and a second access network 310 (e.g., a non-3GPP access network). The network may provide user plane resources via user plane function 320 to UE 315 via both access networks.

During an MU PDU session, UE 315 may use user plane resources allocated by user plane function 320 via first access network 305 (e.g., via a base station 105). Similarly, UE 315 may use user plane resources allocated by user plane function 320 via second access network 310 and one or more network entities (e.g., via an access node and a non-3GPP interworking function (N3IWF) 340). Thus, UE 315 may access data network 345 via both access networks. UE 315 may also be in communication with AMF 325, SMF 330, and PCF 335 via the first access network 305. In some examples, as described in greater detail with reference to FIGS. 4-10, data network 345 may be an LADN. In such examples, AMF 325 and SMF 330 may monitor the location of UE 315 with respect to an LADN service area, to determine whether to terminate the MA PDU session based on the location of UE 315.

UE 315 may transmit a PDU session establishment request over either of the two access networks, if it is registered to the same PLMN. If UE 315 provides an MA PDU request message to the network, then user plane resources may be established on both access networks. To add user plane resources on one access network of the MA PDU session, UE 315 may transmit a PDU session establishment request over the access network containing the PDU session identifier of the MA PDU session.

In some examples, as described in greater detail with reference to FIG. 4, the data network 345 may be an LADN.

In such examples, as described in greater detail with reference to FIGS. 4-10, UE 315 may determine, or the network may indicate, when or whether MA PDU sessions are permitted for the LADN. In some examples, MA PDU sessions may be supported, and UE 315 may indicate, or the network may otherwise determine, the location of UE 315 with reference to an LADN service area.

Figure 4:
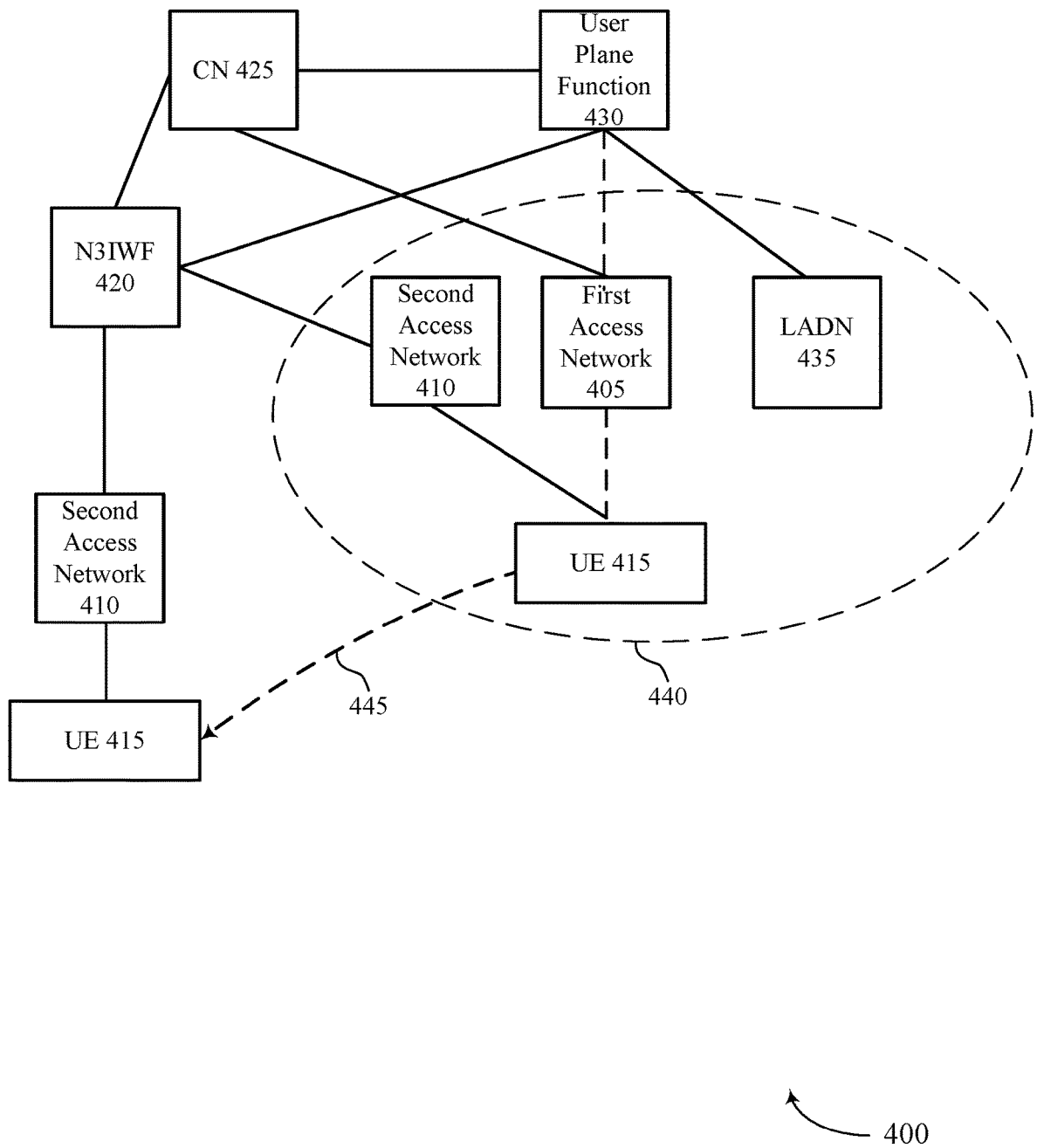
FIG. 4 illustrates an example of a wireless communications system that supports multi-access packet data unit sessions for local area data networks in accordance with aspects of the present disclosure.

FIG. 4 illustrates an example of a wireless communications system 400 that supports MA PDU sessions for LADNs in accordance with aspects of the present disclosure. Wireless communications system 400 may include a UE 415, network devices (e.g., base stations 105), and other various network entities and functionalities, which may be examples of corresponding devices, entities, and functionalities, as described with reference to FIGS. 1 and 2.

UE 415 may communicate with core network 425 via one or more access networks. For example, first access network 405 (e.g., a 3GPP access network), may provide service within a first registration area. The first registration may include one or more tracking areas. Second access network 410 (e.g., a non-3GPP access network), may provide service within a second registration area. The second registration area may include one or more tracking areas. In some examples, the non-3GPP access network may include a single operator-specific non-3GPP tracking area identifier (TAI) used for a whole PLMN. In some examples, the non-3GPP access network may include multiple non-3GPP TAIs. However, in any case, tracking areas for the first access network and the second access network and tracking areas for the second access network may not be aligned.

In some examples, an MA PDU session may decrease system congestion and more efficiently use user plane resources. For example, UE 415 may establish an MA PDU session with a data network (e.g., LADN 435). UE 415 may, as described in greater detail with reference to FIG. 3, communicate with the data network via multiple access networks (e.g., via first access network 405 and second access network 410). First access network 405 may be a 3GPP access network and second access network 410 may be a non-3GPP access network. UE 415 may thus communicate with the core network during a PDU data session with LADN 435 via first access network 405 and user plane function 430, and may communicate with the core network during a PDU data session with LADN 435 via second access network 410, non-3GPP interworking function (N3IWF) 420, and user plane function 430. That is, core network 425 may communicate with UE 415 via both access networks, and UE 415 may communicate with the data network via both access networks and the user plane function 430.

In some examples, the data network may be LADN 435. For example, UE 415 may be located in a particular geographic area (e.g., a stadium, an arena, or the like). The geographic area may provide location-specific services. For instance, if UE 415 is located in a stadium during a sporting event, the stadium may provide local services such as live streaming in multi-viewpoint, live chat for spectators, events for spectators, or the like. Such stadium specific services may suffer from congestion of user plane resources for the first access network 405 if all communications are performed using the first access network 405. Instead, the wireless communications system may support an MA PDU session allowing for steering of communications via both the first access network 405 and the second access network 410. Thus, the wireless communications system may steer, switch, split, or otherwise allocate features that are stadium specific (e.g., LADN services) to the stadium area (e.g., LADN service area 235). This may avoid traffic overload over a single access network (e.g., the first access network 405), decrease system latency, improve user experience, and the like. If UE 415 requests an MA PDU session over the first access network 405 for LADN 435, the network may establish user plane resources over both the first access network 405 and the second access network 410.

If UE 415 successfully establishes an MA PDU session with LADN 435, then UE 415 may utilize both the first access network 405 and the second access network 410. UE 415 may utilize user plane resources via both access networks. However, the tracking areas for the first access network 405 and the tracking areas for the second access network 410 may not be aligned. Therefore, there may not be a way for the second access network (e.g., non-3GPP access network) to determine if UE 415 is located inside or outside of LADN service area 440.

In some examples, UE 415 may move (e.g., along path 445) from inside LADN service area 440 to a location outside of LADN service area 440 while in an idle mode (e.g., a connection management (CM) idle state) with the first access network 405. In some examples, while moving along path 445, UE 415 may be in a connected mode (e.g., a CM connected state) with the second access network 410. One or more positions along path 445 may still be located within the registration area of the first access network 405. UE 415 may still have user plane resources allocated to it via the second access network 410 despite having left LADN service area 440, because the second access network 410 (e.g., the non-3GPP access network) may not have a mechanism to determine if UE 415 is located within the LADN service area 440. Thus, in some examples, unless UE 415 is configured to notify core network 425 when it moves out of LADN service area 440, UE 415 may continue to utilize user plane resources via the second access network 410, despite the fact that it should not be permitted to do so having left the LADN service area 440. In such examples, the restrictions on the LADN service area 440 may be broken, resulting in increased system latency and delays, increased congestion of user plane resources, reduced user experience, and the like.

In some examples, the network may determine whether or when to support MA PDU sessions for LADN 435. For example, as described in greater detail with reference to FIG. 5, the network may support MA PDU sessions for LADN 435, but may reconfigure the registration area of the first access network to increase network awareness of the location of UE 415 with reference to LADN service area 440.

Figure 5:
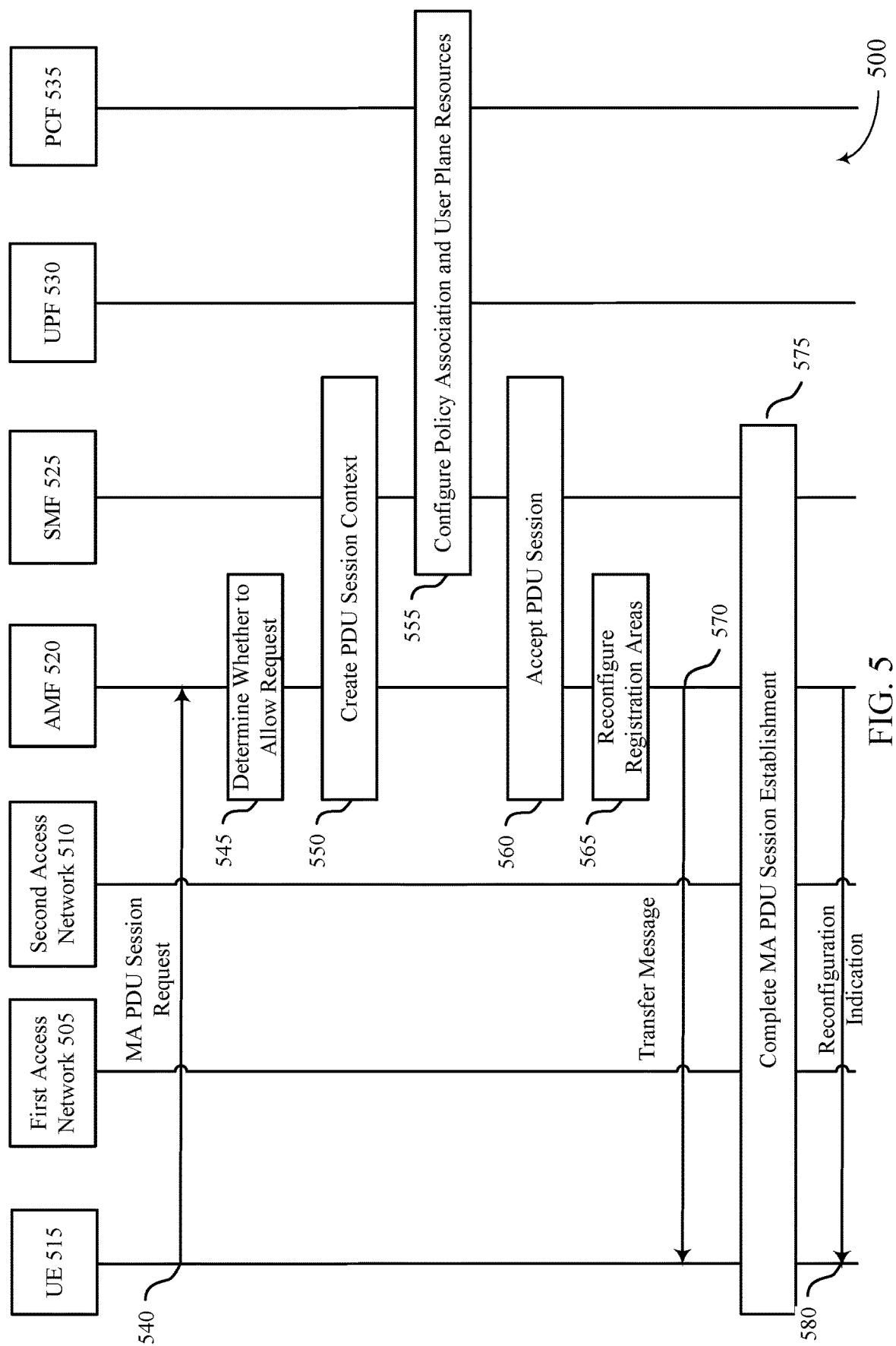
FIG. 5 illustrates an example of a process flow that supports multi-access packet data unit sessions for local area data networks in accordance with aspects of the present disclosure.

FIG. 5 illustrates an example of a process flow 500 that supports MA PDU sessions for LADNs in accordance with aspects of the present disclosure. Process flow 500 may implement or be implemented by a UE 515, a first access network 505, a second access network 510, an AMF 520, a SMF 525, a UPF 530, and a PCF 535, which may be examples of corresponding devices, entities, and functionalities described with reference to FIGS. 1-4. In some examples, a network (e.g., a network entity such as AMF 520), may reconfigure a registration service area for first access network 505, to support MA PDU sessions with an LADN and ensure that the network is aware if UE 515 leaves the LADN service area in an idle mode on the first access network 505.

At 540, UE 515 may initiate an MA PDU session with the network. UE 515 may transmit a request to establish the MA PDU session to AMF 520. In some examples, UE 515 may transmit the request via first access network 505 (e.g., 3GPP access network). In some examples, UE 515 may transmit a non-access stratum (NAS) transport message. The NAS transport message may include an MA PDU request, an identifier for the LADN (e.g., an LADN data network name (DNN)), a PDU session establishment request, or any combination thereof.

At 545, a network entity (e.g., AMF 520) may determine whether to allow the MA PDU session request. In some examples, AMF 520 may determine whether to support the MA PDU session according to one or more configurations or rules. In some examples, a PLMN or operator may determine (e.g., may refer to a MA PDU session configuration, which may define one or more rules or conditions for accepting or rejecting MA PDU sessions) whether to allow a MA PDU session for an LADN on a case by case basis, may support MA PDU sessions for one LADN and may refrain from supporting an MA PDU session for another LADN, or may apply one or more rules to each MA PDU session request. In some examples, AMF 520 may determine to allow the request for the MA PDU session received at 545.

At 550, AMF 520 and SMF 525 may create PDU session context for the MA PDU session. AMF 520 may communicate with SMF 525 to build the PDU session with the LADN. AMF 520 may provide, to SMF 525, network slice management function (NSMF) PDU session create context message.

At 555, SMF 525, UPF 530, and PCF 535 may configure policy and application of user plane resources for the MA PDU session. SMF 525 may interact with PCF 535 for policy establishment. AMF 520 may interact with UPF 530 to set up user plane resources for the MA PDU session.

At 560, AMF 520 and SMF 525 may accept the PDU session requested by UE 515 at 540. For instance, SMF 525 may transmit a message (e.g., an NSMF communication message indicating that the MA PDU session request is accepted).

At 565, AMF 520 may reconfigure a registration area for the first access network 505. For example, AMF 520 may detect the MA PDU session acceptance performed at 560 for an LAPD DNN. AMF 520 may determine to reconfigure the registration area for the first access network 505 according to the LADN service area of the LADN DNN. AMF 520 may thus reconfigure the registration area according to a mapping of one or more aspects of a geographic coverage area of the registration area to one or more aspects of the LADN service area. The mapping may be a 1:1 mapping such that the LADN service area and the registration area for first access network 505 are the similar or the same (e.g., cover the same geographic area). The mapping may be a N:M mapping such that at least a portion of the LADN service area and the registration area for first access network 505 overlap.

At 570, AMF 520 may provide (e.g., via the first access network 505) a DL NAS transfer message (e.g., an SM NAS message indicating the reconfigured registration area).

At 575, UE 515 and SMF 525 (e.g., via AMF 520 and first access network 505) may complete the MA PDU session establishment procedure.

At 580, AMF 520 may trigger UE 515 to update its registration areas at UE 515 according to the reconfiguration of the registration areas at 565. AMF 520 may transmit an area configuration update message (e.g., a UE configuration update), indicating that UE 515 is to reconfigure a registration area for first access network 505. UE 515 may update its registration areas as indicated at 580.

Having updated the registration area of the first access network 505, the network may be made aware if UE 515 leaves the LADN service area, even if UE 515 is in idle mode on the first access network 505. For example, UE 515 may leave the LADN service area in an idle mode on the first access network 505 and a connected mode on second access network 510, and may subsequently transmit, to AMF 520 via the second access network or the first access network, a location update message (e.g., a registration update message). The message may indicate the location of UE 515 with reference to the registration area of first access network 505. For example, UE 515 may trigger a registration update message, and the network may insert an indication of the location of UE 515 with reference to the registration area of first access network 505. However, because of the reconfiguration of the registration area for first access network 505 (e.g., a mapping between the registration area of first access network 505 and the LADN service area), the network may determine when UE 515 has left the LADN service based on its location with reference to the registration area. Upon determining that UE 515 has left the LADN service area, a network entity (e.g., SMF 525) may terminate the MA PDU session with UE 515.

In some examples, UE 515 may transmit the request to establish the MA PDU session via the first access network 505 (e.g., but not the second access network 510). In some examples, AMF 520 may not consider a tracking area of the second access network 510 with respect to LADN validity.

In some examples, the network may support MA PDU sessions for an LADN, but may steer traffic to only one access network, as described in greater detail with reference to FIG. 6.

Figure 6:
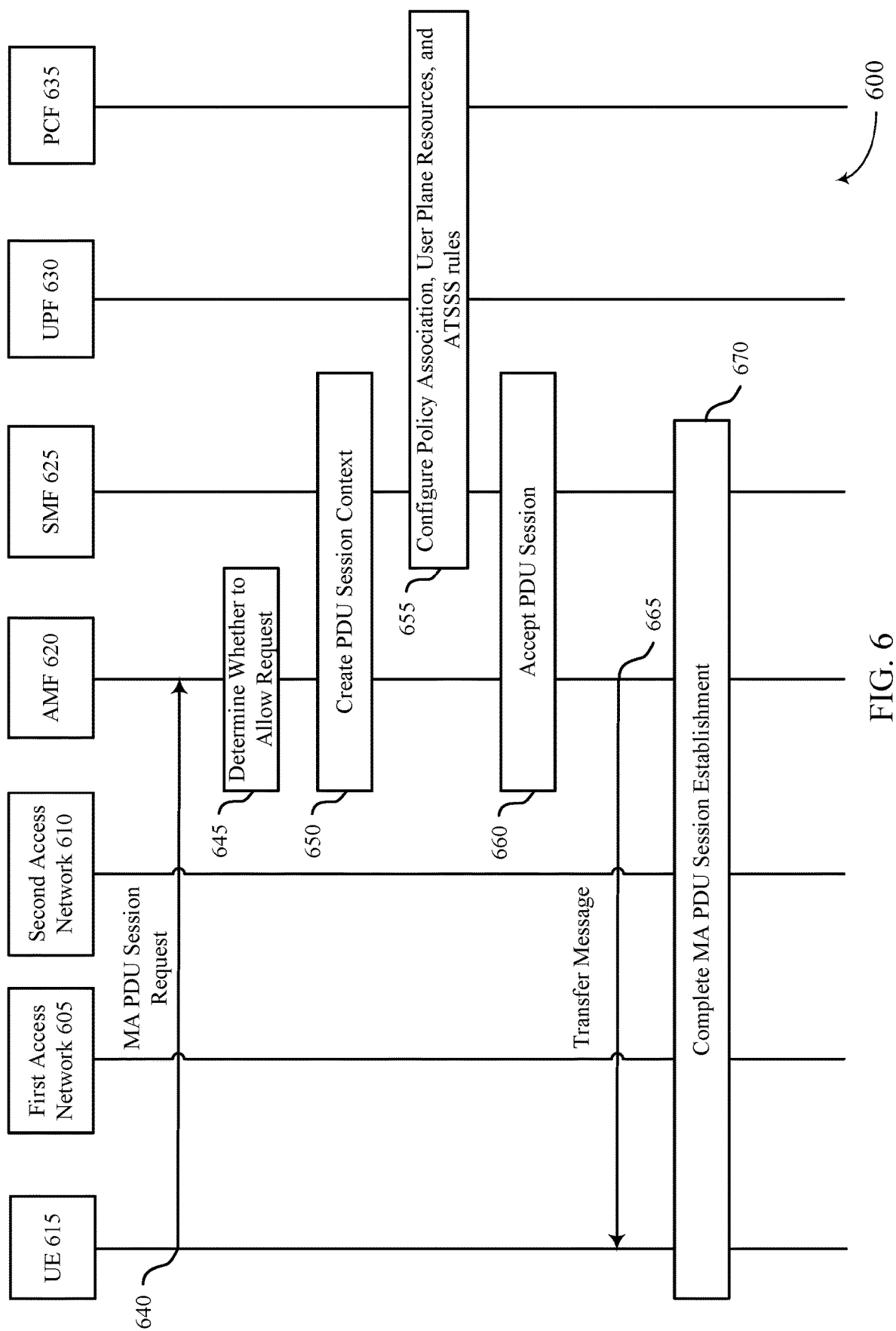
FIG. 6 illustrates an example of a process flow that supports multi-access packet data unit sessions for local area data networks in accordance with aspects of the present disclosure.

FIG. 6 illustrates an example of a process flow 600 that supports MA PDU sessions for LADNs in accordance with aspects of the present disclosure. Process flow 600 may implement or be implemented by a UE 615, a first access network 605, a second access network 610, an AMF 620, a SMF 625, a UPF 630, and a PCF 635, which may be examples of corresponding devices, entities, and functionalities described with reference to FIGS. 1-5. In some examples, a network (e.g., a network entity such as AMF 620), may support MA PDU sessions, but may steer communications on the MA PDU session to a first access network 605 (e.g., a 3GPP access network) and away from a second access network 610 (e.g., a non-3GPP access network).

At 640, UE 615 may initiate an MA PDU session with the network. UE 515 may transmit a request to establish the MA PDU session to AMF 620. In some examples, UE 615 may transmit the request via first access network 605 (e.g., 3GPP access network). In some examples, UE 615 may transmit a NAS transport message. The NAS transport message may include an MA PDU request, an identifier for the LADN (e.g., an LADN data network name (DNN)), a PDU session establishment request, or any combination thereof.

At 645, a network entity (e.g., AMF 620) may determine whether to allow the MA PDU session request. In some examples, AMF 620 may determine whether to support the MA PDU session according to one or more configurations or rules. For instance, AMF 620 may refer to a MA PDU session configuration, which may define one or more rules for accepting or rejecting MA PDU sessions. In some examples, a PLMN or operator may determine (e.g., based on the MA PDU session configuration) whether to allow a MA PDU session for an LADN on a case by case basis, may support MA PDU sessions for one LADN and may refrain from supporting an MA PDU session for another LADN, or may apply one or more rules to each MA PDU session request. In some examples, AMF 620 may determine to allow the request for the MA PDU session received at 645.

At 650, AMF 620 and SMF 625 may create PDU session context for the MA PDU session. AMF 620 may communicate with SMF 625 to build the PDU session with the LADN. AMF 620 may provide, to SMF 625, network slice management function (nsmf) PDU session create context message.

At 655, SMF 625, UPF 630, and PCF 635 may configure policy and application of user plane resources for the MA PDU session. SMF 625 may interact with PCF 635 for policy establishment. AMF 620 may interact with UPF 630 to set up user plane resources for the MA PDU session. In some examples, having determined to allow the MA PDU session at 645, SMF 625 may determine one or more ATSSS rules for the MA PDU session for LADN. For example, SMF 625 may receive the MA PDU session request transmitted by UE 615 at 640, and forwarded to SMF 625 by AMF 620 at 650. SMF 625 may check a policy (e.g., one or more configuration rules or conditions) to determine whether the MA PDU session for the LADN DNN is permitted. Based on the policy or rules, SMF 625 may determine that only ATSSS supported UE is allowed for MA PDU session for the LADN. In some examples, SMF 625 may steer all communications to UE 615 on the MA PDU session via first access network 605 (e.g., and away from second access network 610). For example, SMF 625 may set a steering mode for the MA PDU session such that an active standby value is set to active access to 3GPP, and a standby access to not defined. In some examples, SMF 625 may set a steering mode load balancing value to one hundred percent 3GPP access (such that no communications are steered to the second access network 610 (e.g., a non-3GPP access network)).

At 660, AMF 620 and SMF 625 may accept the PDU session requested by UE 615 at 640. For instance, SMF 625 may transmit a message (e.g., a NSMF communication message indicating that the MA PDU session request is accepted) to UE 615. The message may include an indication of the steering rule or one or more steering or load balancing values. In some examples, AMF 620 may generate the message at 660, and transmit the indication at 665 or 670.

At 665, AMF 620 may provide (e.g., via the first access network 605) a DL NAS transfer message (e.g., an SM NAS message with an indication of the steering rule or one or more steering or load balancing values).

At 670, UE 615 and SMF 625 (e.g., via AMF 620 and first access network 605) may complete the MA PDU session establishment procedure.

Upon establishing the MA PDU session with the network, UE 615 may communicate via first access network 605. However, because of the steering rules implemented at 665, UE 615 may not communicate on the LADN using second access network 610. For example, the network may allocate a full amount of communication resources for the MA PDU session to first access network 605, and no communication resources for the MA PDU session to second access network 610. In some examples, the network may provide, to UE 615, a load balancing parameter indicating the allocation of communication resources. Thus, if UE 615 leaves the LADN service area while in idle mode on first access network 605, UE 615 will not violate the LADN restrictions by continuing to utilize user plane resources for the LADN on the second access network 610.

In some examples, UE 615 may transmit the request to establish the MA PDU session via the first access network 605 (e.g., but not the second access network 610). In some examples, AMF 620 may not consider a tracking area of the second access network 610 with respect to LADN validity.

In some examples, the network may not support MA PDU sessions for LADNs, as described in greater detail with reference to FIG. 7.

Figure 7:
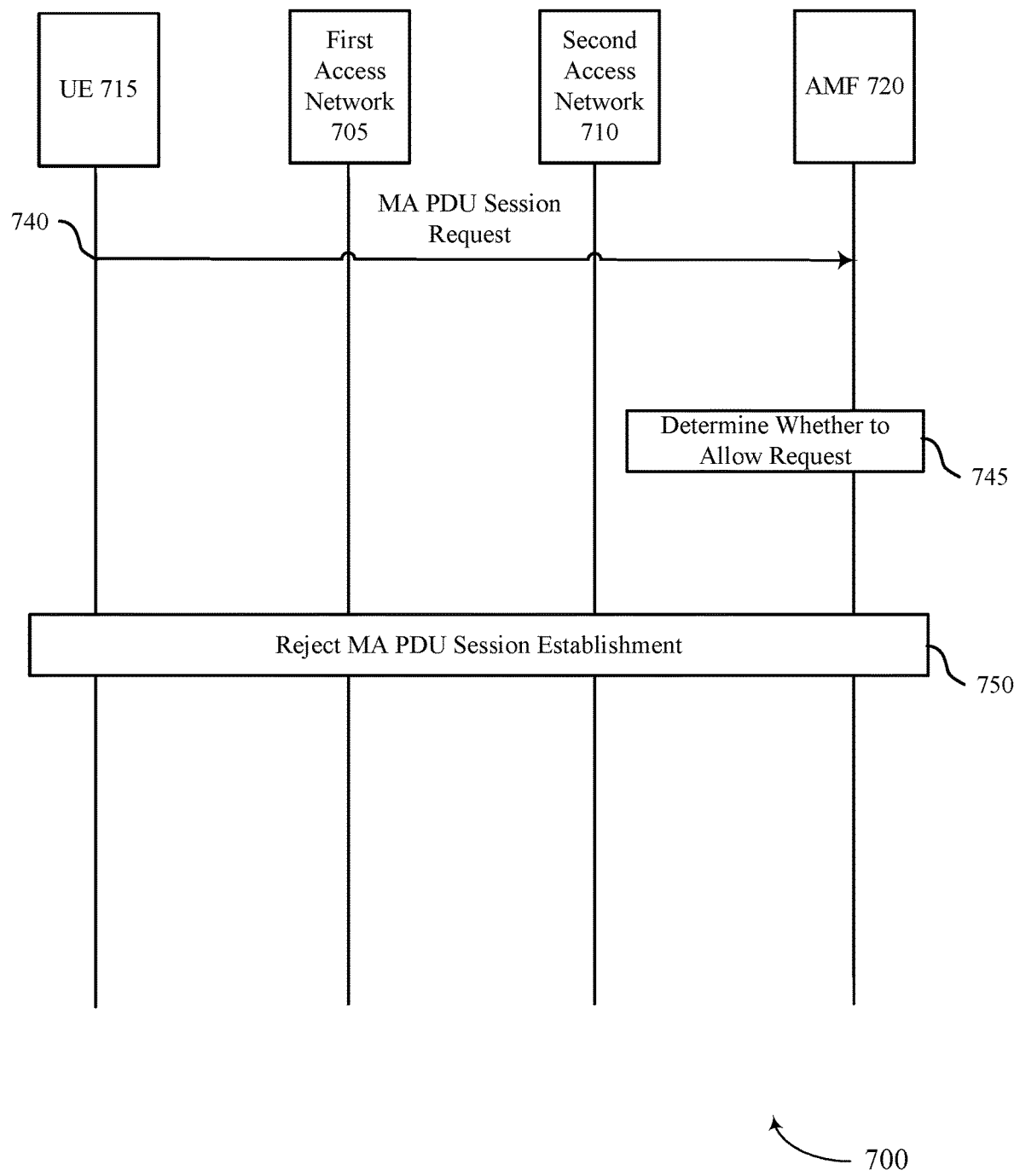
FIG. 7 illustrates an example of a process flow that supports multi-access packet data unit sessions for local area data networks in accordance with aspects of the present disclosure.

FIG. 7 illustrates an example of a process flow 700 that supports MA PDU sessions for LADNs in accordance with aspects of the present disclosure. Process flow 700 may implement or be implemented by a UE 615, a first access network 705, a second access network 710, and an AMF 720, which may be examples of corresponding devices, entities, and functionalities described with reference to FIGS. 1-6. In some examples, a network (e.g., a network entity such as AMF 720), may reject MA PDU sessions for LADNs.

At 740, UE 715 may initiate an MA PDU session with the network. UE 715 may transmit a request to establish the MA PDU session to AMF 720. In some examples, UE 715 may transmit the request via first access network 705 (e.g., a 3GPP access network). In some examples, UE 715 may transmit a NAS transport message. The NAS transport message may include an MA PDU request, an identifier for the LADN (e.g., an LADN DDN), a PDU session establishment request, or any combination thereof.

At 745 a network entity (e.g., AMF 720) may determine whether to allow the request for the MA PDU session. In some examples, AMF 720 may determine whether to support the MA PDU session according to one or more configurations or rules. For instance, AMF 720 may refer to a MA PDU session configuration, which may define one or more rules for accepting or rejecting MA PDU sessions. In some examples, a PLMN or operator may determine (e.g., based on the MA PDU session configuration) whether to allow a MA PDU session for an LADN on a case by case basis, may support MA PDU sessions for one LADN and may refrain from supporting an MA PDU session for another LADN, or may apply one or more rules to each MA PDU session request. In some examples, AMF 720 may not support any MA PDU sessions for LADNs. At 745, AMF 720 may determine not to allow the request for the MA PDU session received at 740.

At 750, AMF 720 may reject the MA PDU session establishment. For example, AMF 720 may reject the SM NAS request. AMF 720 may transmit, to UE 715, an indication of the rejection. For example, AMF 720 may provide an SM NAS message indicating a 5GMM cause value (e.g., #43 LADN not available, #91 DNN not supported or not subscribed in the slice, #90 payload was not forwarded, etc.). In some examples, the indication may include a new or updated cause value (e.g., MA PDU session is not supported for LADN).

UE 715, having received the indication at 750, may take the indicated cause value into account for subsequent communications. For example, having requested the MA PDU session for LADN DNN at 740, and having received the indication of the rejection at 750, UE 715 may determine the MA PDU sessions are not available for LADNs, and may not may any further or subsequent requests for MA PDU sessions with an LADN.

Figure 8:
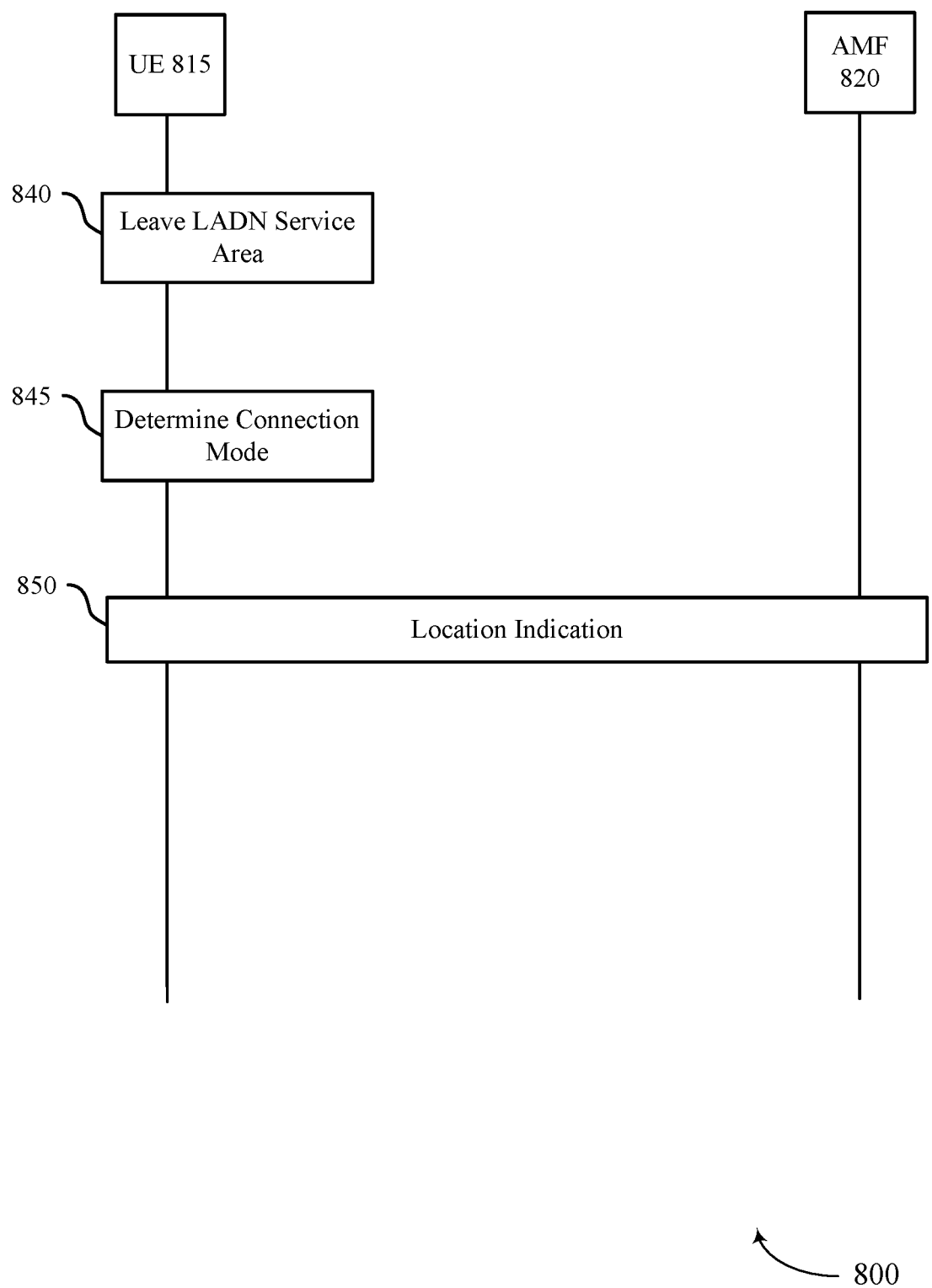
FIG. 8 illustrates an example of a process flow that supports multi-access packet data unit sessions for local area data networks in accordance with aspects of the present disclosure.

FIG. 8 illustrates an example of a process flow 800 that supports MA PDU sessions for LADNs in accordance with aspects of the present disclosure. Process flow 800 may include a UE 815 and an AMF 820, which may be examples of corresponding devices, functionalities, and network entities as described with reference to FIGS. 1-7. UE 815 may communicate with AMF 820 via a first access network (e.g., a 3GPP access network) or a second access network (e.g., a non-3GPP access network), or both.

At 840, UE 815 may leave an LADN service area during an MA PDU session with an LADN. UE 815 may be in an idle mode on a first access network, and may be in a connected mode on a second access network. UE 815 may be utilizing user plane resources allocate by the network for the MA PDU session.

At 845, UE 815 may determine its connection mode. The connection mode and the location of UE 815 (e.g., having left the LADN service area), may serve as triggering conditions. For example, UE 815 may be preconfigured with one or more triggering conditions, or one or more triggering conditions may be defined in a standard. UE 815 may thus be configured to transmit location information, registration information, or the like, to AMF 820 if the triggering conditions are satisfied. If UE 815 is in idle mode at 845, and if UE 815 has left the LADN service area, then the triggering conditions may be satisfied.

At 850, UE 815 may transmit a message to AMF 820. The message may be a location message, such as a registration update or a transport message triggered by the triggering conditions at 840 and 845. The location indication message may indicate that UE 815 has left the LADN service area.

In some examples, UE 815 may provide the location indication in the form of a registration update message via a first access network (e.g., a 3GPP access network). The registration update message may include a registration type of mobility registration updating. Or, in some examples, UE 815 may trigger a service request via the first access network. In such examples, using the first access network, UE 815 may provide the indication to AMF 820. UE 815 may transmit the registration update message to a base station, which may insert the location of the UE 815, and forward the registration update message to AMF 820. In some examples, UE 815 may trigger transmission of the registration update, and the network may insert the UE location to the registration update (e.g., as opposed to the UE 815 including its own location information in the registration update). In any case, upon receiving the registration update, AMF 820 may determine that UE 815 has left the LADN service area, and may terminate the MA PDU session based thereon. In such examples, without any changes to the network side of the procedure, UE presence with reference to the LADN service area may be detected by the network while UE 815 is in CM-idle mode on the first access network and CM-connected mode over the second access network.

In some examples, UE 815 may provide the location indication in the form of a transport message (e.g., an uplink NAS transport msg indicating a current TAI of the first access network (e.g., a 3GPP access network). UE 815 may transmit the transport message via the second access network (e.g., a non-3GPP access network). UE 815 may transmit the transport message to an access node (e.g., an access point), and the access node may forward the transport message to the AMF 820. In such examples, UE 815 may be able to transmit the transport message on the second access network without having to connect on the first access network (e.g., while UE 815 is in an idle mode on the first access network). This may result in more efficient or more immediate termination of the MA PDU session when UE 815 leaves the LADN service area, or improved battery life for UE 815 (e.g., due to not having to exit the idle mode on the first access network), or any combination thereof. With minor adjustments to the network side of the described techniques, UE presence with reference to the LADN service area may be detected by the network while UE 815 is in CM-idle mode on the first access network and CM-connected mode over the second access network.

In some examples, as described in greater detail with reference to FIG. 9, the network may provide an explicit or implicit indication of whether MA PDU sessions for LADNs are supported during LADN registration procedures.

Figure 9:
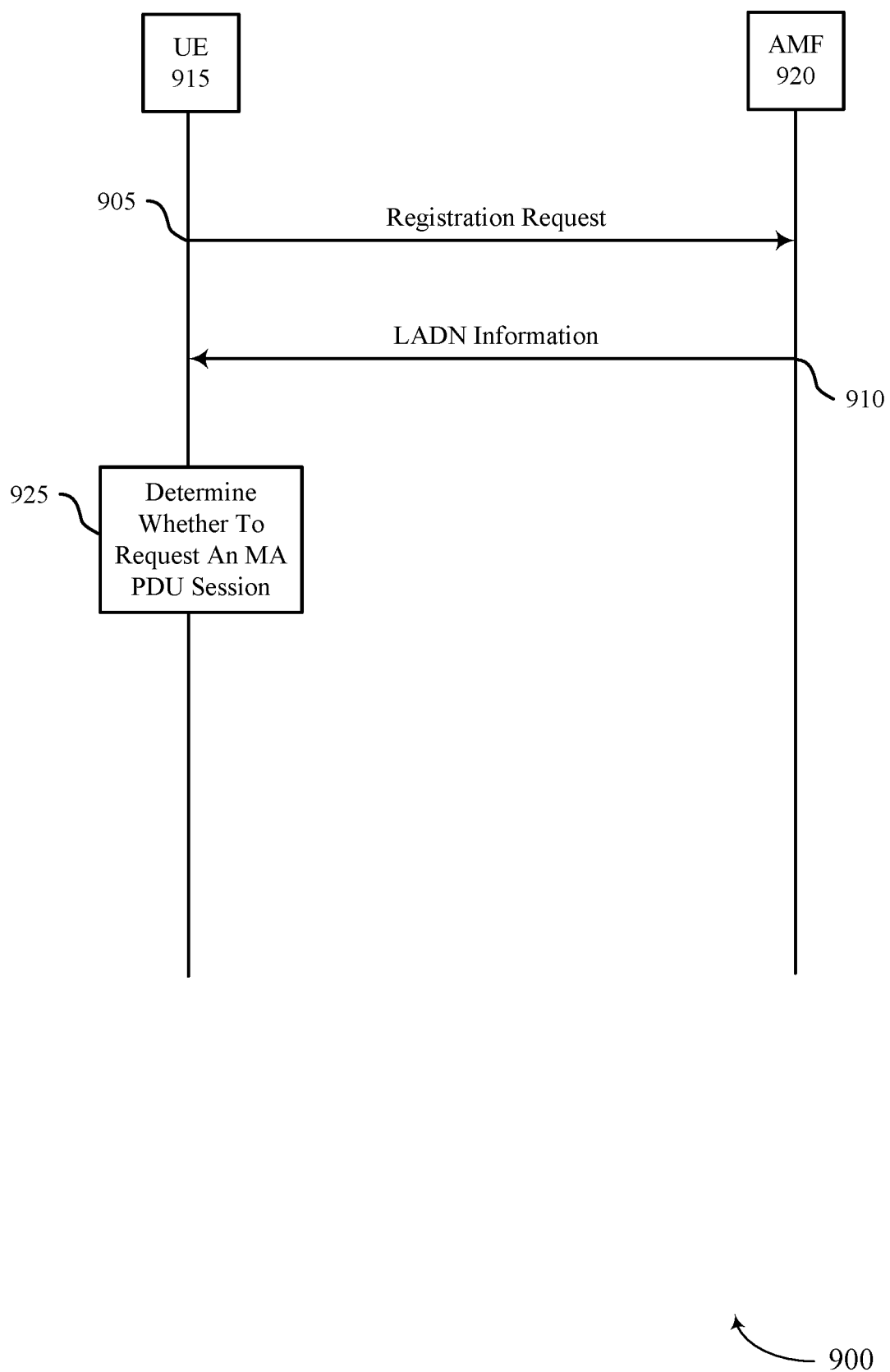
FIG. 9 illustrates an example of a process flow that supports multi-access packet data unit sessions for local area data networks in accordance with aspects of the present disclosure.

FIG. 9 illustrates an example of a process flow 900 that supports MA PDU sessions for LADNs in accordance with aspects of the present disclosure. Process flow 900 may include a UE 915 and an AMF 920, which may be examples of corresponding devices, functionalities, and network entities as described with reference to FIGS. 1-8. UE 915 may communicate with AMF 920 via a first access network (e.g., a 3GPP access network) or a second access network (e.g., a non-3GPP access network), or both.

At 905, UE 915 may transmit, and AMF 920 may receive, a registration request for an LADN. UE 915 may transmit the registration request via a first access network (e.g., a 3GPP access network). AMF 920 may refer to an MA PDU session configuration, which may include one or more rules for establishing MA PDU sessions (e.g., for an LADN). AMF 920 may determine, based on the MA PDU session configuration, whether MA PDU sessions for LADNs are permitted or supported.

At 910, AMF 920 may transmit, and UE 915 may receive, LADN information (e.g., LADN service area information). In some examples, AMF 920 may transmit the LADN information in response to receiving the registration request at 905. In some examples, AMF 920 may transmit the LADN information in response to an area configuration update message, or the like. The LADN information may include an LADN DNN for the requested LADN, an LADN service area, or the like.

In some examples, AMF 920 may determine, based on referring to the MA PDU session configuration, that MA PDU sessions for the LADN is not supported. In some examples, AMF 920 may include, in the LADN configuration information, an indication that UE 915 is not permitted to use an MA PDU session for the LADN DNN indicated in the LADN configuration information. In such examples, at 925, UE 915 may determine not to request an MA PDU session for the LADN, based on the explicit indication received at 910.

In some examples, AMF 920 may determine, based on referring to the MA PDU session configuration, that MA PDU session for the LADN is supported. In such examples, AMF 920 may refrain from including the indication that MA PDU sessions are not supported or the LADN DNN in the LADN configuration information. In such examples, UE 915 may correctly assume (e.g., based on the lack of an explicit indicator to the contrary in the LADN configuration information), that MA PDU sessions are supported for the LADN DNN indicated in the LADN configuration information. In such examples, at 925, UE 915 may proceed to transmit a request for an MA PDU session for the LADN to AMF 920. Thus, MA PDU sessions with an LADN may be permitted or rejected, while more efficiently utilizing system resources and reducing signaling, which may result in increased system efficiency, decreased system latency, and the like.

In some examples, AMF 920 may include, in a UE configuration update message, an indication of a lack of support for MA PDU sessions for LADNs. UE 915 may, in such cases, refrain from requesting MA PDU sessions for the indicated LADN (e.g., or all LADNs) based on the UE configuration update message including the indication.

Techniques described herein may be performed on various access networks. For example, as described herein, a first access network and a second access network for an MA PDU session may be different radio access technologies (e.g., 3GPP access networks and non-3GPP access networks), or may be the same RAT (e.g., first and second 3GPP access networks). In some examples, an access network for level 3 (L3) 5G networks may include a first link from a remote UE via a radio access network (RAN) and an N3 interface to a remote UE user plane function to a data network via an N6 interface. The RAN may also interact with a remote UE AMF and remote UE SMF via an N2 interface, and the remote UE AMF may interact with an N3IWF via an N2 interface. Thus, a first access leg of an MA PDU session may connect a remote UE to a RAN, a remote UE UPF to the RAN, and the remote UE UPF to the data network. A second leg of the MA PDU session may connect a remote UE to a relay UE (e., via PC5 connection), the relay UE to the RAN (e.g., via a Uu interface), the RAN to a relay UE UPF (e.g., via an N3 interface), and the relay UE UPF to the N3IWF (via an N6 interface). The N# IF may be connected to the remote UE UPF via an N3 interface. The RAN may interact with a relay UE AMF via N2 interface, and the relay UE AMF may interact with the relay UE SMF which may interact with the relay UE UPF. Thus, a second access network (e.g., a non-3GPP access network) may include the relay UE, the RAN, the relay UE UPF, the relay UE AMF, and the relay UE SMF. In such examples, assuming that non-3GPP access covers all relay UE entities, then techniques described herein may also apply to a relay network (e.g., an L3 relay for 5G).

Figure 10:
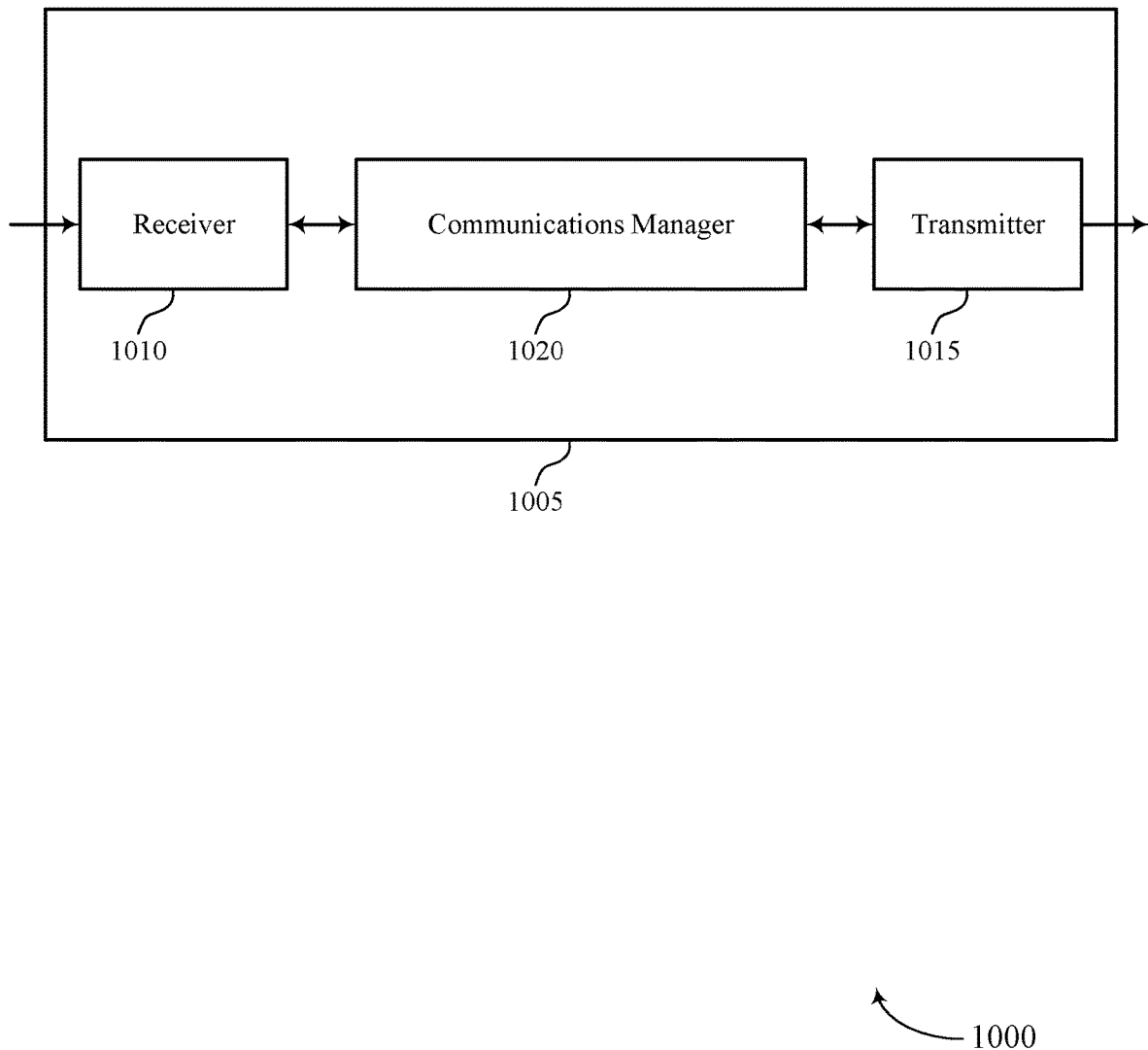
FIGS. 10 and 11 show block diagrams of devices that support multi-access packet data unit sessions for local area data networks in accordance with aspects of the present disclosure.

FIG. 10 shows a block diagram 1000 of a device 1005 that supports multi-access packet data unit sessions for local area data networks in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to multi-access packet data unit sessions for local area data networks). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to multi-access packet data unit sessions for local area data networks). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of multi-access packet data unit sessions for local area data networks as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a network entity in accordance with examples as disclosed herein. For example, the communications manager 1020 may be configured as or otherwise support a means for receiving, from a UE, a request to establish a multiple access communication session including a first wireless communications link with the UE via a first access network associated with a first registration area and a second wireless communications link with the UE via a second access network associated with a second registration area. The communications manager 1020 may be configured as or otherwise support a means for establishing, according to a multiple access communication configuration, the multiple access communication session with the UE based on receiving the request. The communications manager 1020 may be configured as or otherwise support a means for transmitting, to the UE, an area configuration update message that reconfigures the first registration area according to a mapping with a local area data network service area associated with the multiple access communication session.

Additionally, or alternatively, the communications manager 1020 may support wireless communications at a network entity in accordance with examples as disclosed herein. For example, the communications manager 1020 may be configured as or otherwise support a means for receiving, from a UE, a request to establish a multiple access communication session including a first wireless communications link with the UE via a first access network associated with a first registration area and a second wireless communications link with the UE via a second access network associated with a second registration area, where a local area data network is associated with the requested multiple access communication session. The communications manager 1020 may be configured as or otherwise support a means for establishing, according to a multiple access communication configuration, the multiple access communication session with the UE based on receiving the request. The communications manager 1020 may be configured as or otherwise support a means for allocating a full amount of communications resources for the multiple access communication session to the first wireless communications link based on the multiple access communication configuration.

Additionally, or alternatively, the communications manager 1020 may support wireless communications at a network entity in accordance with examples as disclosed herein. For example, the communications manager 1020 may be configured as or otherwise support a means for receiving, from a UE, a request to establish a multiple access communication session including a first wireless communications link with the UE via a first access network associated with a first registration area and a second wireless communications link with the UE via a second access network associated with a second registration area. The communications manager 1020 may be configured as or otherwise support a means for referring to a multiple access communication configuration including one or more rules for establishing multiple access communication sessions for local area data networks. The communications manager 1020 may be configured as or otherwise support a means for rejecting the request to establish the multiple access communication session based on the one or more rules and determining that the request to establish the multiple access communication session indicates a local area data network.

Additionally, or alternatively, the communications manager 1020 may support wireless communications at a network entity in accordance with examples as disclosed herein. For example, the communications manager 1020 may be configured as or otherwise support a means for receiving, from a UE, a request to establish a multiple access communication session including a first wireless communications link with the UE via a first access network associated with a first registration area and a second wireless communications link with the UE via a second access network associated with a second registration area, where a local area data network is associated with the requested multiple access communication session. The communications manager 1020 may be configured as or otherwise support a means for establishing the multiple access communication session with the network entity based on transmitting the request. The communications manager 1020 may be configured as or otherwise support a means for receiving, from the UE via the second wireless communications link based on the UE being in an idle mode over the first wireless communications link and in a connected mode over the second wireless communications link and leaving a local area data network service area for the local area data network, an indication that the UE has left the local area data network service area.

Additionally, or alternatively, the communications manager 1020 may support wireless communications at a network entity in accordance with examples as disclosed herein. For example, the communications manager 1020 may be configured as or otherwise support a means for receiving, from a UE, a registration request for a local area data network associated with a local area data network service area. The communications manager 1020 may be configured as or otherwise support a means for referring to a multiple access communication configuration including one or more rules for establishing multiple access communication sessions. The communications manager 1020 may be configured as or otherwise support a means for transmitting, to the UE based on the registration request and the one or more rules, or based on an area configuration update, or any combination thereof, local area data network configuration information including local area data network data network name information, tracking information for the local area data network service area, and an indication that a multiple access communication session for the local area data network is not supported for the UE.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for establishing or rejecting MA PDU sessions, or providing UE location information upon UE mobility in a timeline manner, resulting in improved system efficiency, more efficient use of user plane and computational resources, decreased system latency, and improved user experience.

Figure 11:
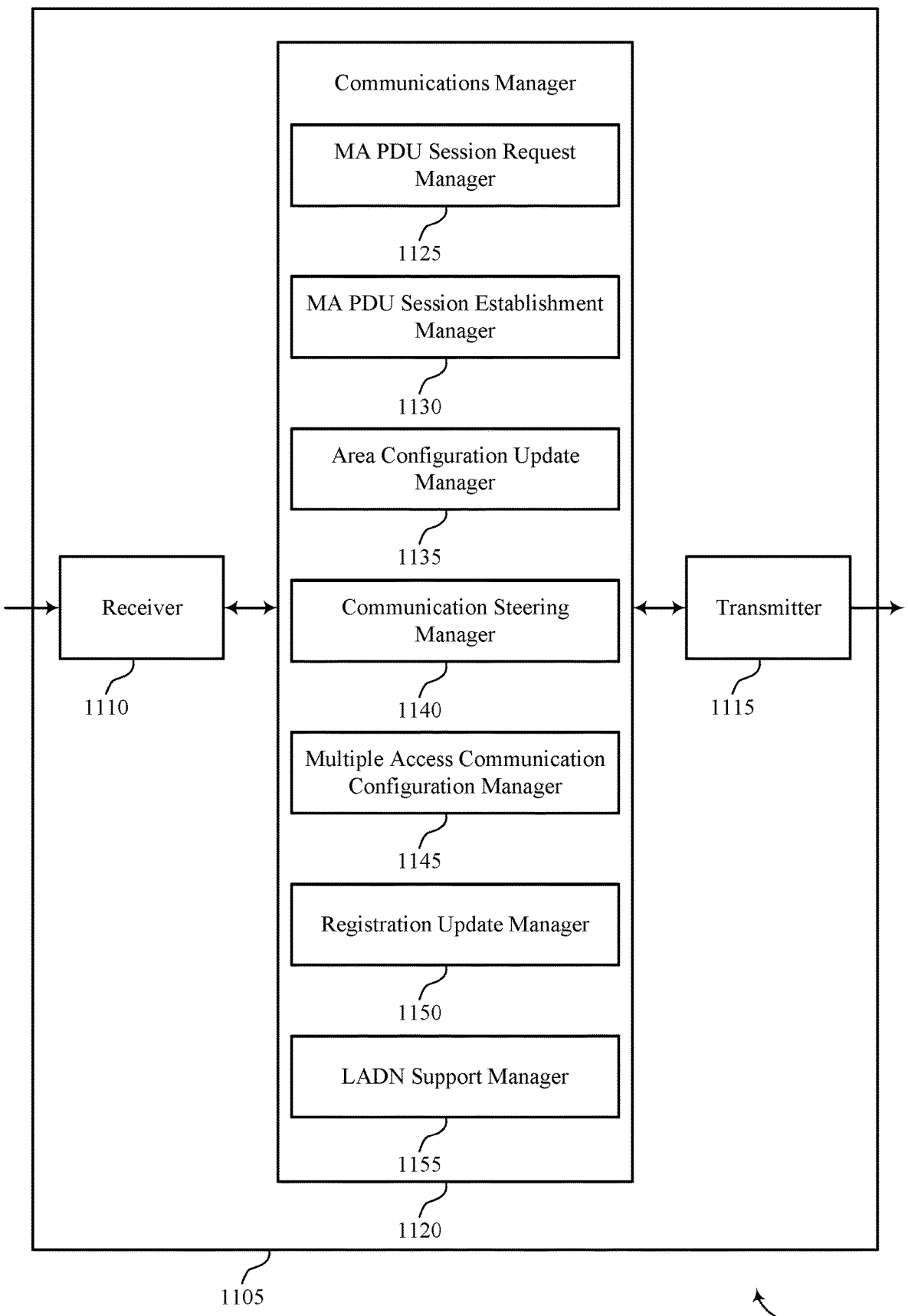

FIG. 11 shows a block diagram 1100 of a device 1105 that supports multi-access packet data unit sessions for local area data networks in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to multi-access packet data unit sessions for local area data networks). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to multi-access packet data unit sessions for local area data networks). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of multi-access packet data unit sessions for local area data networks as described herein. For example, the communications manager 1120 may include a MA PDU session request manager 1125, a MA PDU session establishment manager 1130, an area configuration update manager 1135, a communication steering manager 1140, a multiple access communication configuration manager 1145, a registration update manager 1150, a LADN support manager 1155, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a network entity in accordance with examples as disclosed herein. The MA PDU session request manager 1125 may be configured as or otherwise support a means for receiving, from a UE, a request to establish a multiple access communication session including a first wireless communications link with the UE via a first access network associated with a first registration area and a second wireless communications link with the UE via a second access network associated with a second registration area. The MA PDU session establishment manager 1130 may be configured as or otherwise support a means for establishing, according to a multiple access communication configuration, the multiple access communication session with the UE based on receiving the request. The area configuration update manager 1135 may be configured as or otherwise support a means for transmitting, to the UE, an area configuration update message that reconfigures the first registration area according to a mapping with a local area data network service area associated with the multiple access communication session.

Additionally, or alternatively, the communications manager 1120 may support wireless communications at a network entity in accordance with examples as disclosed herein. The MA PDU session request manager 1125 may be configured as or otherwise support a means for receiving, from a UE, a request to establish a multiple access communication session including a first wireless communications link with the UE via a first access network associated with a first registration area and a second wireless communications link with the UE via a second access network associated with a second registration area, where a local area data network is associated with the requested multiple access communication session. The MA PDU session establishment manager 1130 may be configured as or otherwise support a means for establishing, according to a multiple access communication configuration, the multiple access communication session with the UE based on receiving the request. The communication steering manager 1140 may be configured as or otherwise support a means for allocating a full amount of communications resources for the multiple access communication session to the first wireless communications link based on the multiple access communication configuration.

Additionally, or alternatively, the communications manager 1120 may support wireless communications at a network entity in accordance with examples as disclosed herein. The MA PDU session request manager 1125 may be configured as or otherwise support a means for receiving, from a UE, a request to establish a multiple access communication session including a first wireless communications link with the UE via a first access network associated with a first registration area and a second wireless communications link with the UE via a second access network associated with a second registration area. The multiple access communication configuration manager 1145 may be configured as or otherwise support a means for referring to a multiple access communication configuration including one or more rules for establishing multiple access communication sessions for local area data networks. The MA PDU session request manager 1125 may be configured as or otherwise support a means for rejecting the request to establish the multiple access communication session based on the one or more rules and determining that the request to establish the multiple access communication session indicates a local area data network.

Additionally, or alternatively, the communications manager 1120 may support wireless communications at a network entity in accordance with examples as disclosed herein. The MA PDU session request manager 1125 may be configured as or otherwise support a means for receiving, from a UE, a request to establish a multiple access communication session including a first wireless communications link with the UE via a first access network associated with a first registration area and a second wireless communications link with the UE via a second access network associated with a second registration area, where a local area data network is associated with the requested multiple access communication session. The MA PDU session establishment manager 1130 may be configured as or otherwise support a means for establishing the multiple access communication session with the network entity based on transmitting the request. The registration update manager 1150 may be configured as or otherwise support a means for receiving, from the UE via the second wireless communications link based on the UE being in an idle mode over the first wireless communications link and in a connected mode over the second wireless communications link and leaving a local area data network service area for the local area data network, an indication that the UE has left the local area data network service area.

Additionally, or alternatively, the communications manager 1120 may support wireless communications at a network entity in accordance with examples as disclosed herein. The MA PDU session request manager 1125 may be configured as or otherwise support a means for receiving, from a UE, a registration request for a local area data network associated with a local area data network service area. The MA PDU session establishment manager 1130 may be configured as or otherwise support a means for referring to a multiple access communication configuration including one or more rules for establishing multiple access communication sessions. The LADN support manager 1155 may be configured as or otherwise support a means for transmitting, to the UE based on the registration request and the one or more rules, or based on an area configuration update, or any combination thereof, local area data network configuration information including local area data network data network name information, tracking information for the local area data network service area, and an indication that a multiple access communication session for the local area data network is not supported for the UE.

Figure 12:
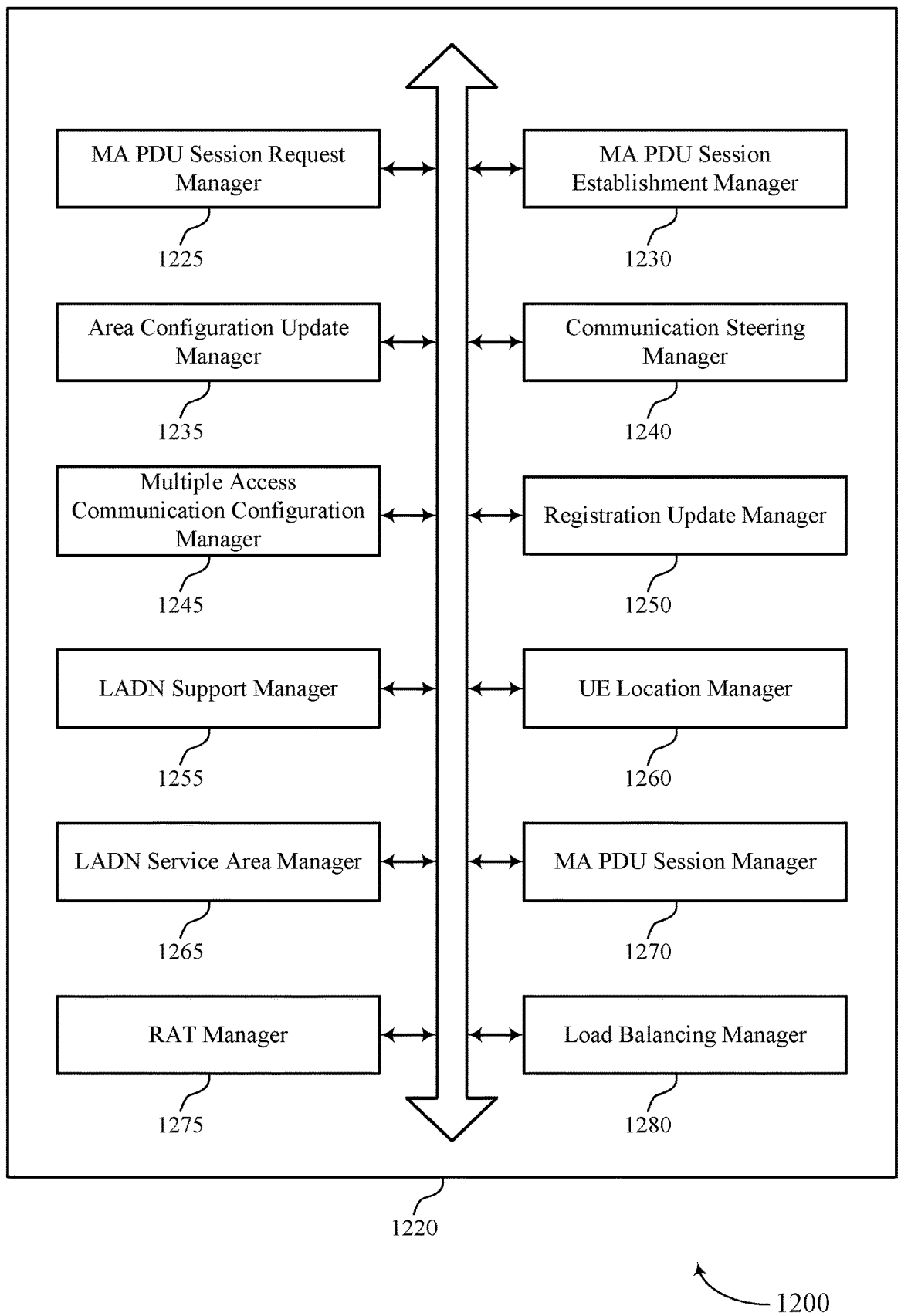
FIG. 12 shows a block diagram of a communications manager that supports multi-access packet data unit sessions for local area data networks in accordance with aspects of the present disclosure.

FIG. 12 shows a block diagram 1200 of a communications manager 1220 that supports multi-access packet data unit sessions for local area data networks in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of multi-access packet data unit sessions for local area data networks as described herein. For example, the communications manager 1220 may include a MA PDU session request manager 1225, a MA PDU session establishment manager 1230, an area configuration update manager 1235, a communication steering manager 1240, a multiple access communication configuration manager 1245, a registration update manager 1250, a LADN support manager 1255, a UE location manager 1260, a LADN service area manager 1265, a MA PDU session manager 1270, a RAT manager 1275, a load balancing manager 1280, or any combination thereof. Each of these components may communicate, directly or indirectly, with one another (e.g., via one or more buses).

The communications manager 1220 may support wireless communications at a network entity in accordance with examples as disclosed herein. The MA PDU session request manager 1225 may be configured as or otherwise support a means for receiving, from a UE, a request to establish a multiple access communication session including a first wireless communications link with the UE via a first access network associated with a first registration area and a second wireless communications link with the UE via a second access network associated with a second registration area. The MA PDU session establishment manager 1230 may be configured as or otherwise support a means for establishing, according to a multiple access communication configuration, the multiple access communication session with the UE based on receiving the request. The area configuration update manager 1235 may be configured as or otherwise support a means for transmitting, to the UE, an area configuration update message that reconfigures the first registration area according to a mapping with a local area data network service area associated with the multiple access communication session.

In some examples, the area configuration update manager 1235 may be configured as or otherwise support a means for reconfiguring the first registration area by mapping the first registration area according to a mapping with the local area data network service area by mapping one or more aspects of a geographic boundary of the first registration area to one or more corresponding aspects of a geographic boundary of the local area data network service area, where transmitting the area configuration update message is based on the reconfiguring.

In some examples, the UE location manager 1260 may be configured as or otherwise support a means for receiving, from the UE, a UE location update message with reference to the first registration area. In some examples, the LADN service area manager 1265 may be configured as or otherwise support a means for determining, based on receiving the UE location update message and on the reconfigured first registration area, that the UE has left the local area data network service area. In some examples, the MA PDU session manager 1270 may be configured as or otherwise support a means for terminating the multiple access communications session with the UE based on the determining. In some examples, the multiple access communication configuration includes one or more conditions. In some examples, establishing the multiple access communication session is based on determining that the one or more conditions are satisfied. In some examples, the multiple access communication session includes a multiple access packet data unit session. In some examples, the network entity includes an access and mobility management functionality. In some examples, the first wireless communications link includes a first radio access technology link. In some examples, the second wireless communications link is a second radio access technology link that is different than the first radio access technology link.

In some examples, the first wireless communication link includes a cellular link and the first registration area includes one or more tracking areas. In some examples, the second wireless communications link includes a non-cellular link and the second registration area includes one or more tracking areas. In some examples, the local area data network service area includes one or more of the tracking areas of the first registration area.

Additionally, or alternatively, the communications manager 1220 may support wireless communications at a network entity in accordance with examples as disclosed herein. In some examples, the MA PDU session request manager 1225 may be configured as or otherwise support a means for receiving, from a UE, a request to establish a multiple access communication session including a first wireless communications link with the UE via a first access network associated with a first registration area and a second wireless communications link with the UE via a second access network associated with a second registration area, where a local area data network is associated with the requested multiple access communication session. In some examples, the MA PDU session establishment manager 1230 may be configured as or otherwise support a means for establishing, according to a multiple access communication configuration, the multiple access communication session with the UE based on receiving the request. The communication steering manager 1240 may be configured as or otherwise support a means for allocating a full amount of communications resources for the multiple access communication session to the first wireless communications link based on the multiple access communication configuration.

In some examples, the communication steering manager 1240 may be configured as or otherwise support a means for allocating none of the communications resources for the multiple access communication session to the second wireless communications link based on the multiple access communication configuration.

In some examples, the load balancing manager 1280 may be configured as or otherwise support a means for transmitting, to the UE, a load balancing parameter indicating that the full amount of communications resources for the multiple access communication session are to be allocated to the first wireless communications link. In some examples, the multiple access communication configuration includes one or more conditions. In some examples, establishing the multiple access communication session is based on determining that the one or more conditions are satisfied. In some examples, the multiple access communication session includes a multiple access packet data unit session. In some examples, the network entity includes an access and mobility management functionality.

In some examples, the first wireless communications link includes a first radio access technology link. In some examples, the second wireless communications link is a second radio access technology link that is different than the first radio access technology link. In some examples, the first wireless communication link includes a cellular link and the first registration area includes one or more tracking areas. In some examples, the second wireless communications link includes a non-cellular link and the second registration area includes one or more tracking areas. In some examples, the local area data network service area includes one or more of the tracking areas of the first registration area.

Additionally, or alternatively, the communications manager 1220 may support wireless communications at a network entity in accordance with examples as disclosed herein. In some examples, the MA PDU session request manager 1225 may be configured as or otherwise support a means for receiving, from a UE, a request to establish a multiple access communication session including a first wireless communications link with the UE via a first access network associated with a first registration area and a second wireless communications link with the UE via a second access network associated with a second registration area. The multiple access communication configuration manager 1245 may be configured as or otherwise support a means for referring to a multiple access communication configuration including one or more rules for establishing multiple access communication sessions for local area data networks. In some examples, the MA PDU session request manager 1225 may be configured as or otherwise support a means for rejecting the request to establish the multiple access communication session based on the one or more rules and determining that the request to establish the multiple access communication session indicates a local area data network.

In some examples, the LADN service area manager 1265 may be configured as or otherwise support a means for transmitting, to the UE, an indication that the multiple access communication session is not supported for the local area data network. In some examples, the network entity includes an access and mobility management functionality. In some examples, the first wireless communications link includes a first radio access technology link. In some examples, the second wireless communications link is a second radio access technology link that is different than the first radio access technology link.

Additionally, or alternatively, the communications manager 1220 may support wireless communications at a network entity in accordance with examples as disclosed herein. In some examples, the MA PDU session request manager 1225 may be configured as or otherwise support a means for receiving, from a UE, a request to establish a multiple access communication session including a first wireless communications link with the UE via a first access network associated with a first registration area and a second wireless communications link with the UE via a second access network associated with a second registration area, where a local area data network is associated with the requested multiple access communication session. In some examples, the MA PDU session establishment manager 1230 may be configured as or otherwise support a means for establishing the multiple access communication session with the network entity based on transmitting the request. The registration update manager 1250 may be configured as or otherwise support a means for receiving, from the UE via the second wireless communications link based on the UE being in an idle mode over the first wireless communications link and in a connected mode over the second wireless communications link and leaving a local area data network service area for the local area data network, an indication that the UE has left the local area data network service area.

In some examples, the multiple access communication session includes a multiple access packet data unit session. In some examples, the network entity includes an access and mobility management functionality. In some examples, the first wireless communications link includes a first radio access technology link. In some examples, the second wireless communications link is a second radio access technology link that is different than the first radio access technology link. In some examples, the first wireless communication link includes a cellular link and the first registration area includes one or more tracking areas. In some examples, the second wireless communications link includes a non-cellular link and the second registration area includes one or more tracking areas. In some examples, the local area data network service area includes one or more of the tracking areas of the first registration area.

Additionally, or alternatively, the communications manager 1220 may support wireless communications at a network entity in accordance with examples as disclosed herein. In some examples, the MA PDU session request manager 1225 may be configured as or otherwise support a means for receiving, from a UE, a registration request for a local area data network associated with a local area data network service area. In some examples, the MA PDU session establishment manager 1230 may be configured as or otherwise support a means for referring to a multiple access communication configuration including one or more rules for establishing multiple access communication sessions. The LADN support manager 1255 may be configured as or otherwise support a means for transmitting, to the UE based on the registration request and the one or more rules, or based on an area configuration update, or any combination thereof, local area data network configuration information including local area data network data network name information, tracking information for the local area data network service area, and an indication that a multiple access communication session for the local area data network is not supported for the UE.

In some examples, the multiple access communication session includes a multiple access packet data unit session. In some examples, the network entity includes an access and mobility management functionality. In some examples, the first wireless communications link includes a first radio access technology link. In some examples, the second wireless communications link is a second radio access technology link that is different than the first radio access technology link.

Figure 13:
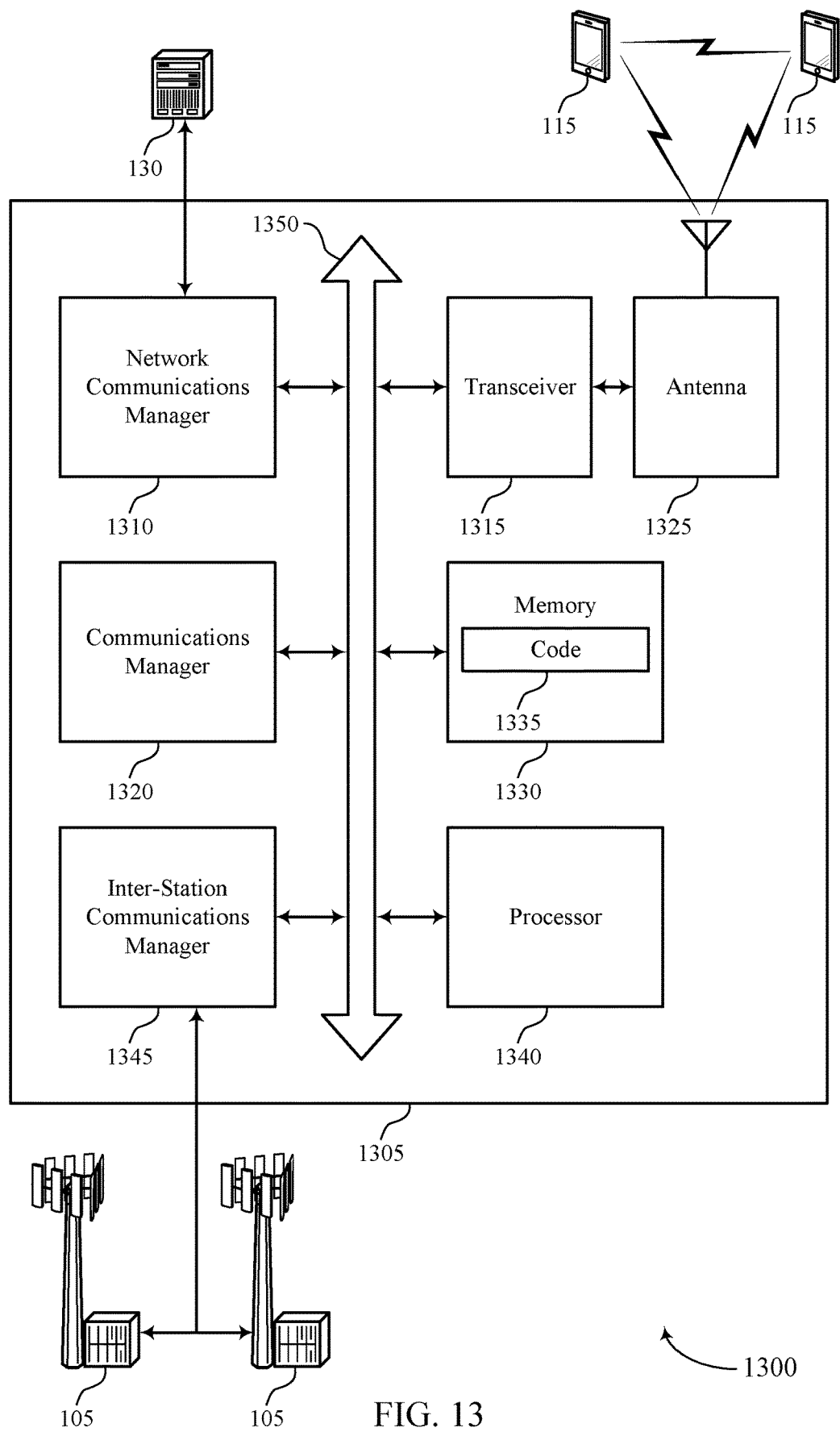
FIG. 13 shows a diagram of a system including a device that supports multi-access packet data unit sessions for local area data networks in accordance with aspects of the present disclosure.

FIG. 13 shows a diagram of a system 1300 including a device 1305 that supports multi-access packet data unit sessions for local area data networks in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting multi-access packet data unit sessions for local area data networks). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communications at a network entity in accordance with examples as disclosed herein. For example, the communications manager 1320 may be configured as or otherwise support a means for receiving, from a UE, a request to establish a multiple access communication session including a first wireless communications link with the UE via a first access network associated with a first registration area and a second wireless communications link with the UE via a second access network associated with a second registration area. The communications manager 1320 may be configured as or otherwise support a means for establishing, according to a multiple access communication configuration, the multiple access communication session with the UE based on receiving the request. The communications manager 1320 may be configured as or otherwise support a means for transmitting, to the UE, an area configuration update message that reconfigures the first registration area according to a mapping with a local area data network service area associated with the multiple access communication session.

Additionally, or alternatively, the communications manager 1320 may support wireless communications at a network entity in accordance with examples as disclosed herein. For example, the communications manager 1320 may be configured as or otherwise support a means for receiving, from a UE, a request to establish a multiple access communication session including a first wireless communications link with the UE via a first access network associated with a first registration area and a second wireless communications link with the UE via a second access network associated with a second registration area, where a local area data network is associated with the requested multiple access communication session. The communications manager 1320 may be configured as or otherwise support a means for establishing, according to a multiple access communication configuration, the multiple access communication session with the UE based on receiving the request. The communications manager 1320 may be configured as or otherwise support a means for allocating a full amount of communications resources for the multiple access communication session to the first wireless communications link based on the multiple access communication configuration.

Additionally, or alternatively, the communications manager 1320 may support wireless communications at a network entity in accordance with examples as disclosed herein. For example, the communications manager 1320 may be configured as or otherwise support a means for receiving, from a UE, a request to establish a multiple access communication session including a first wireless communications link with the UE via a first access network associated with a first registration area and a second wireless communications link with the UE via a second access network associated with a second registration area. The communications manager 1320 may be configured as or otherwise support a means for referring to a multiple access communication configuration including one or more rules for establishing multiple access communication sessions for local area data networks. The communications manager 1320 may be configured as or otherwise support a means for rejecting the request to establish the multiple access communication session based on the one or more rules and determining that the request to establish the multiple access communication session indicates a local area data network.

Additionally, or alternatively, the communications manager 1320 may support wireless communications at a network entity in accordance with examples as disclosed herein. For example, the communications manager 1320 may be configured as or otherwise support a means for receiving, from a UE, a request to establish a multiple access communication session including a first wireless communications link with the UE via a first access network associated with a first registration area and a second wireless communications link with the UE via a second access network associated with a second registration area, where a local area data network is associated with the requested multiple access communication session. The communications manager 1320 may be configured as or otherwise support a means for establishing the multiple access communication session with the network entity based on transmitting the request. The communications manager 1320 may be configured as or otherwise support a means for receiving, from the UE via the second wireless communications link based on the UE being in an idle mode over the first wireless communications link and in a connected mode over the second wireless communications link and leaving a local area data network service area for the local area data network, an indication that the UE has left the local area data network service area.

Additionally, or alternatively, the communications manager 1320 may support wireless communications at a network entity in accordance with examples as disclosed herein. For example, the communications manager 1320 may be configured as or otherwise support a means for receiving, from a UE, a registration request for a local area data network associated with a local area data network service area. The communications manager 1320 may be configured as or otherwise support a means for referring to a multiple access communication configuration including one or more rules for establishing multiple access communication sessions. The communications manager 1320 may be configured as or otherwise support a means for transmitting, to the UE based on the registration request and the one or more rules, or based on an area configuration update, or any combination thereof, local area data network configuration information including local area data network data network name information, tracking information for the local area data network service area, and an indication that a multiple access communication session for the local area data network is not supported for the UE.

By including or configuring the communications manager 1320 in accordance with examples as described herein, the device 1305 may support techniques for establishing or rejecting MA PDU sessions, or providing UE location information upon UE mobility in a timeline manner, resulting in improved system efficiency, more efficient use of user plane and computational resources, decreased system latency, and improved user experience.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of multi-access packet data unit sessions for local area data networks as described herein, or the processor 1340 and the memory 1330 may be otherwise configured to perform or support such operations.

Figure 14:
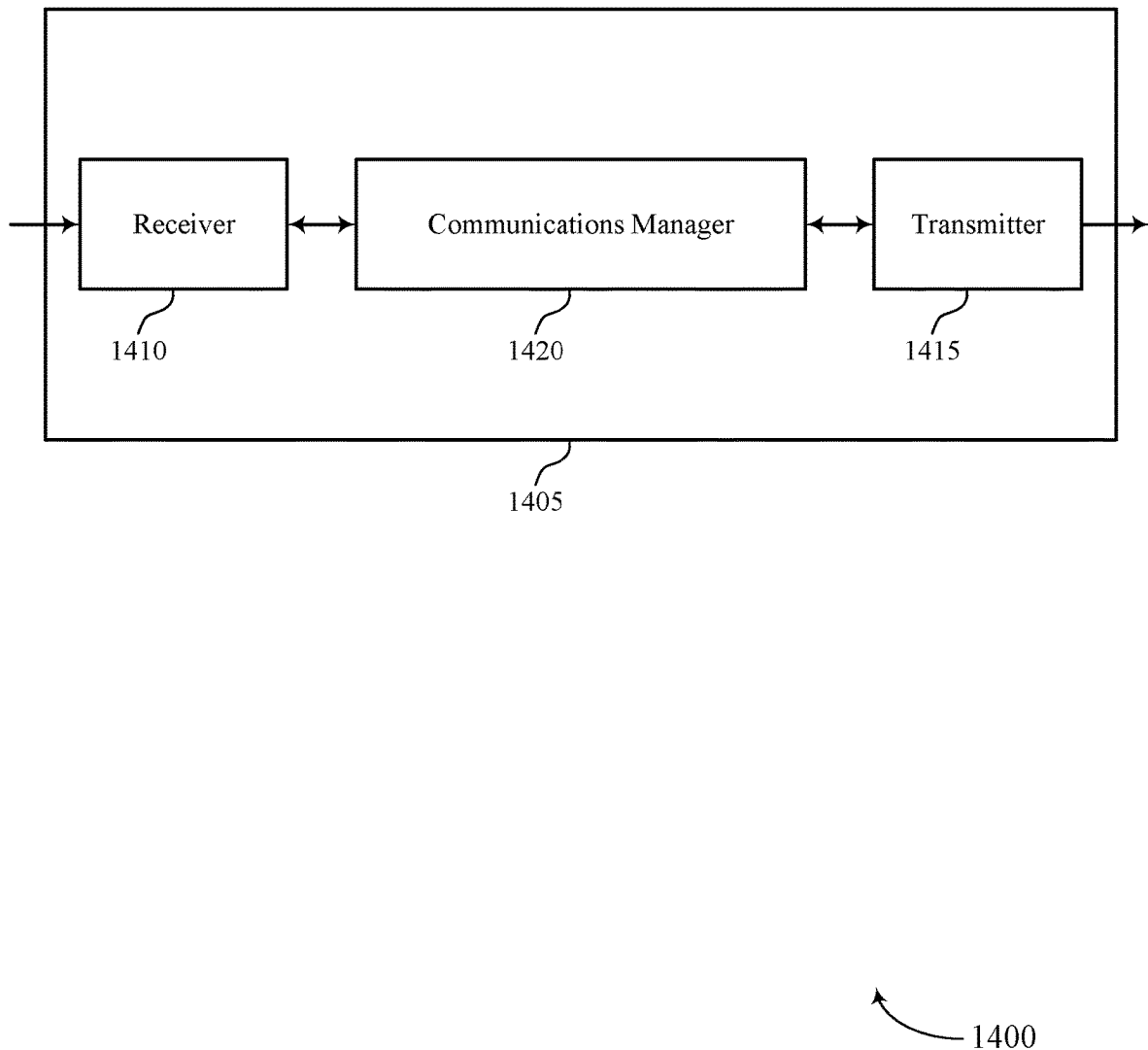
FIGS. 14 and 15 show block diagrams of devices that support multi-access packet data unit sessions for local area data networks in accordance with aspects of the present disclosure.

FIG. 14 shows a block diagram 1400 of a device 1405 that supports multi-access packet data unit sessions for local area data networks in accordance with aspects of the present disclosure. The device 1405 may be an example of aspects of a UE 115 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to multi-access packet data unit sessions for local area data networks). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to multi-access packet data unit sessions for local area data networks). In some examples, the transmitter 1415 may be co-located with a receiver 1410 in a transceiver module. The transmitter 1415 may utilize a single antenna or a set of multiple antennas.

The communications manager 1420, the receiver 1410, the transmitter 1415, or various combinations thereof or various components thereof may be examples of means for performing various aspects of multi-access packet data unit sessions for local area data networks as described herein. For example, the communications manager 1420, the receiver 1410, the transmitter 1415, or various combinations or components thereof may support a method for performing one or more of the functions described herein.

In some examples, the communications manager 1420, the receiver 1410, the transmitter 1415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1420, the receiver 1410, the transmitter 1415, or various combinations or components thereof may be implemented in code (e.g., as communications management software or firmware) executed by a processor. If implemented in code executed by a processor, the functions of the communications manager 1420, the receiver 1410, the transmitter 1415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1420 may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communications at a UE in accordance with examples as disclosed herein. For example, the communications manager 1420 may be configured as or otherwise support a means for transmitting, to a network entity, a request to establish a multiple access communication session including a first wireless communications link with the network entity via a first access network associated with a first registration area and a second wireless communications link with the network entity via a second access network associated with a second registration area. The communications manager 1420 may be configured as or otherwise support a means for establishing the multiple access communication session with the network entity based on transmitting the request. The communications manager 1420 may be configured as or otherwise support a means for receiving, from the network entity according to a multiple access communication configuration, an area configuration update message that reconfigures the first registration area according to a mapping with a local area data network service area associated with the multiple access communication session.

Additionally, or alternatively, the communications manager 1420 may support wireless communications at a UE in accordance with examples as disclosed herein. For example, the communications manager 1420 may be configured as or otherwise support a means for transmitting, to a network entity, a request to establish a multiple access communication session including a first wireless communications link with the network entity via a first access network associated with a first registration area and a second wireless communications link with the network entity via a second access network associated with a second registration area, where a local area data network is associated with the requested multiple access communication session. The communications manager 1420 may be configured as or otherwise support a means for determining that the request to establish the multiple access communication session has been rejected. The communications manager 1420 may be configured as or otherwise support a means for receiving, from the network entity, an indication that the multiple access communication session is not supported for the local area data network.

Additionally, or alternatively, the communications manager 1420 may support wireless communications at a UE in accordance with examples as disclosed herein. For example, the communications manager 1420 may be configured as or otherwise support a means for transmitting, to a network entity, a request to establish a multiple access communication session including a first wireless communications link with the network entity via a first access network associated with a first registration area and a second wireless communications link with the network entity via a second access network associated with a second registration area, where a local area data network is associated with the requested multiple access communication session. The communications manager 1420 may be configured as or otherwise support a means for establishing the multiple access communication session with the network entity based on transmitting the request. The communications manager 1420 may be configured as or otherwise support a means for transmitting, to an access node based on leaving a local area data network service area for the local area data network while in an idle mode over the first wireless communications link and a connected mode over the second wireless communications link, an indication that the UE has left the local area data network service area.

Additionally, or alternatively, the communications manager 1420 may support wireless communications at a UE in accordance with examples as disclosed herein. For example, the communications manager 1420 may be configured as or otherwise support a means for transmitting, to a network entity, a registration request for a local area data network associated with a local area data network service area. The communications manager 1420 may be configured as or otherwise support a means for receiving, from the network entity based on transmitting the registration request, or based on an area configuration update, or any combination thereof, local area data network configuration information including local area data network data network name information, tracking information for the local area data network service area, and an indication that a multiple access communication session for the local area data network is not supported for the UE. The communications manager 1420 may be configured as or otherwise support a means for communicating with the network entity via the local area data network based on receiving the local area data network configuration information.

By including or configuring the communications manager 1420 in accordance with examples as described herein, the device 1405 (e.g., a processor controlling or otherwise coupled to the receiver 1410, the transmitter 1415, the communications manager 1420, or a combination thereof) may support techniques for establishing or rejecting MA PDU sessions, or providing UE location information upon UE mobility in a timeline manner, resulting in improved system efficiency, more efficient use of user plane and computational resources, decreased system latency, and improved user experience.

Figure 15:
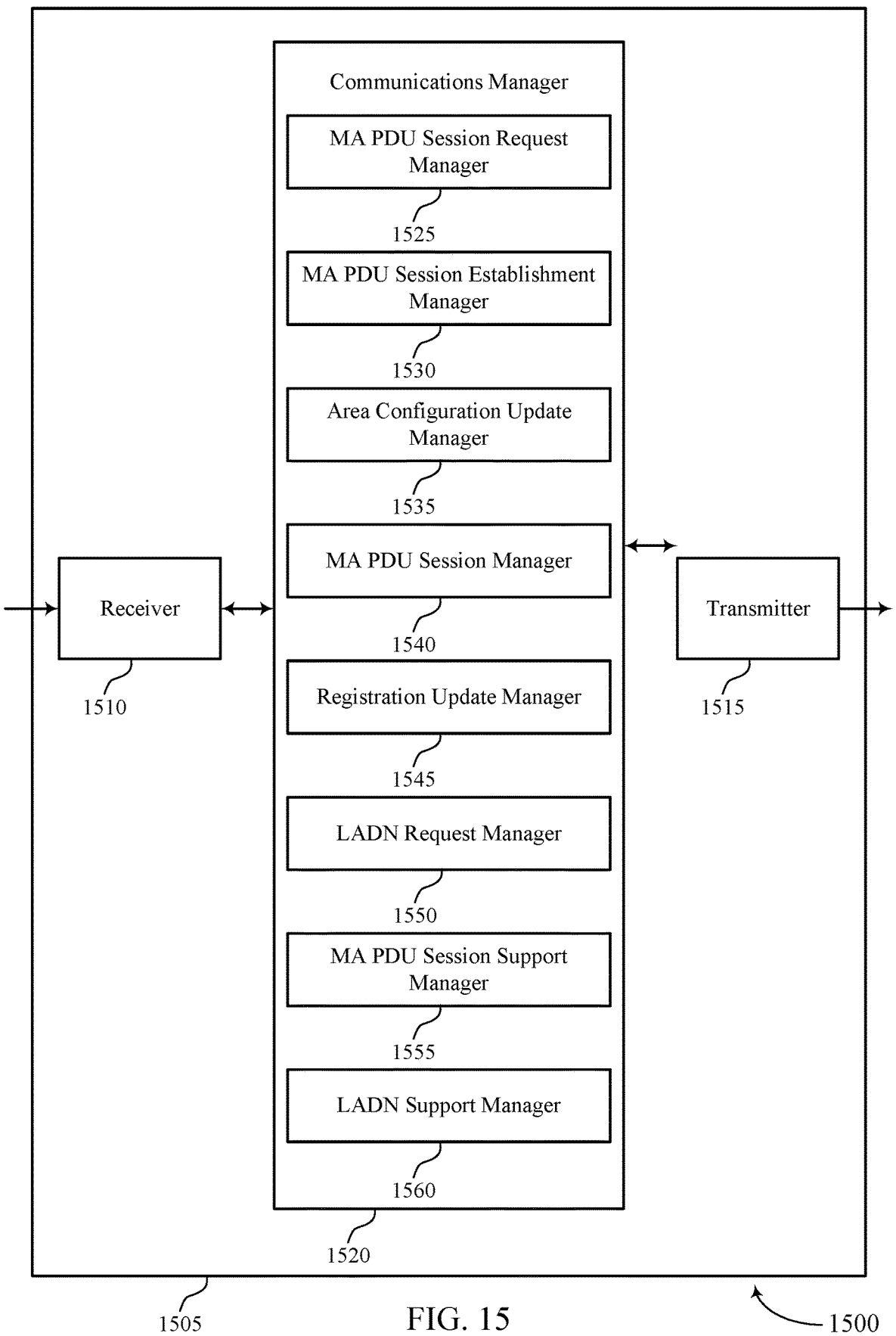

FIG. 15 shows a block diagram 1500 of a device 1505 that supports multi-access packet data unit sessions for local area data networks in accordance with aspects of the present disclosure. The device 1505 may be an example of aspects of a device 1405 or a UE 115 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to multi-access packet data unit sessions for local area data networks). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to multi-access packet data unit sessions for local area data networks). In some examples, the transmitter 1515 may be co-located with a receiver 1510 in a transceiver module. The transmitter 1515 may utilize a single antenna or a set of multiple antennas.

The device 1505, or various components thereof, may be an example of means for performing various aspects of multi-access packet data unit sessions for local area data networks as described herein. For example, the communications manager 1520 may include a MA PDU session request manager 1525, a MA PDU session establishment manager 1530, an area configuration update manager 1535, a MA PDU session manager 1540, a registration update manager 1545, a LADN request manager 1550, a MA PDU session support manager 1555, a LADN support manager 1560, or any combination thereof. The communications manager 1520 may be an example of aspects of a communications manager 1420 as described herein. In some examples, the communications manager 1520, or various components thereof, may be configured to perform various operations (e.g., receiving, monitoring, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to receive information, transmit information, or perform various other operations as described herein.

The communications manager 1520 may support wireless communications at a UE in accordance with examples as disclosed herein. The MA PDU session request manager 1525 may be configured as or otherwise support a means for transmitting, to a network entity, a request to establish a multiple access communication session including a first wireless communications link with the network entity via a first access network associated with a first registration area and a second wireless communications link with the network entity via a second access network associated with a second registration area. The MA PDU session establishment manager 1530 may be configured as or otherwise support a means for establishing the multiple access communication session with the network entity based on transmitting the request. The area configuration update manager 1535 may be configured as or otherwise support a means for receiving, from the network entity according to a multiple access communication configuration, an area configuration update message that reconfigures the first registration area according to a mapping with a local area data network service area associated with the multiple access communication session.

Additionally, or alternatively, the communications manager 1520 may support wireless communications at a UE in accordance with examples as disclosed herein. The MA PDU session request manager 1525 may be configured as or otherwise support a means for transmitting, to a network entity, a request to establish a multiple access communication session including a first wireless communications link with the network entity via a first access network associated with a first registration area and a second wireless communications link with the network entity via a second access network associated with a second registration area, where a local area data network is associated with the requested multiple access communication session. The MA PDU session establishment manager 1530 may be configured as or otherwise support a means for determining that the request to establish the multiple access communication session has been rejected. The MA PDU session manager 1540 may be configured as or otherwise support a means for receiving, from the network entity, an indication that the multiple access communication session is not supported for the local area data network.

Additionally, or alternatively, the communications manager 1520 may support wireless communications at a UE in accordance with examples as disclosed herein. The MA PDU session request manager 1525 may be configured as or otherwise support a means for transmitting, to a network entity, a request to establish a multiple access communication session including a first wireless communications link with the network entity via a first access network associated with a first registration area and a second wireless communications link with the network entity via a second access network associated with a second registration area, where a local area data network is associated with the requested multiple access communication session. The MA PDU session establishment manager 1530 may be configured as or otherwise support a means for establishing the multiple access communication session with the network entity based on transmitting the request. The registration update manager 1545 may be configured as or otherwise support a means for transmitting, to an access node based on leaving a local area data network service area for the local area data network while in an idle mode over the first wireless communications link and a connected mode over the second wireless communications link, an indication that the UE has left the local area data network service area.

Additionally, or alternatively, the communications manager 1520 may support wireless communications at a UE in accordance with examples as disclosed herein. The LADN request manager 1550 may be configured as or otherwise support a means for transmitting, to a network entity, a registration request for a local area data network associated with a local area data network service area. The MA PDU session support manager 1555 may be configured as or otherwise support a means for receiving, from the network entity based on transmitting the registration request, or based on an area configuration update, or any combination thereof, local area data network configuration information including local area data network data network name information, tracking information for the local area data network service area, and an indication that a multiple access communication session for the local area data network is not supported for the UE. The LADN support manager 1560 may be configured as or otherwise support a means for communicating with the network entity via the local area data network based on receiving the local area data network configuration information.

Figure 16:
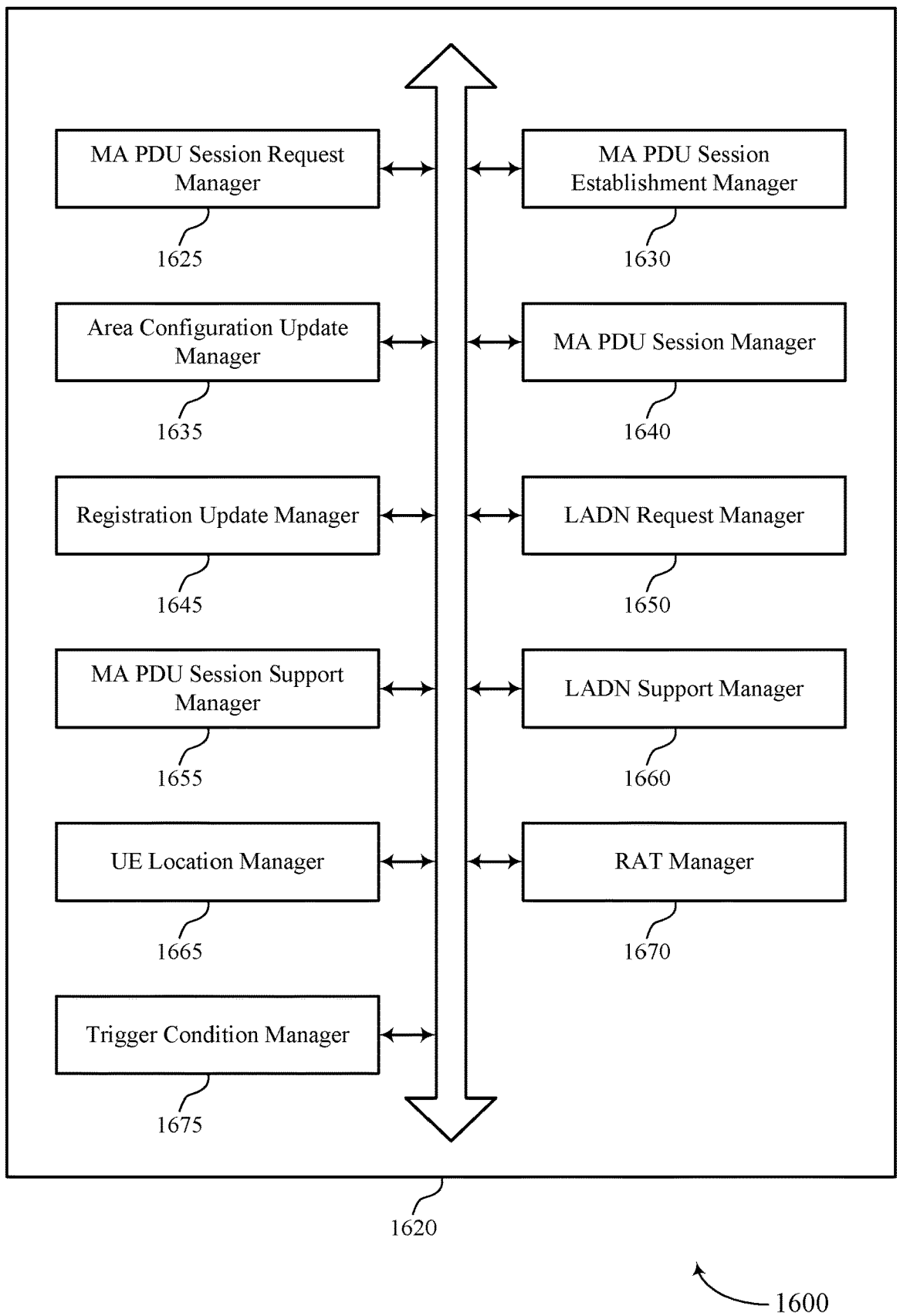
FIG. 16 shows a block diagram of a communications manager that supports multi-access packet data unit sessions for local area data networks in accordance with aspects of the present disclosure.

FIG. 16 shows a block diagram 1600 of a communications manager 1620 that supports multi-access packet data unit sessions for local area data networks in accordance with aspects of the present disclosure. The communications manager 1620 may be an example of aspects of a communications manager 1420, a communications manager 1520, or both, as described herein. The communications manager 1620, or various components thereof, may be an example of means for performing various aspects of multi-access packet data unit sessions for local area data networks as described herein. For example, the communications manager 1620 may include a MA PDU session request manager 1625, a MA PDU session establishment manager 1630, an area configuration update manager 1635, a MA PDU session manager 1640, a registration update manager 1645, a LADN request manager 1650, a MA PDU session support manager 1655, a LADN support manager 1660, a UE location manager 1665, a RAT manager 1670, a trigger condition manager 1675, or any combination thereof. Each of these components may communicate, directly or indirectly, with one another (e.g., via one or more buses).

The communications manager 1620 may support wireless communications at a UE in accordance with examples as disclosed herein. The MA PDU session request manager 1625 may be configured as or otherwise support a means for transmitting, to a network entity, a request to establish a multiple access communication session including a first wireless communications link with the network entity via a first access network associated with a first registration area and a second wireless communications link with the network entity via a second access network associated with a second registration area. The MA PDU session establishment manager 1630 may be configured as or otherwise support a means for establishing the multiple access communication session with the network entity based on transmitting the request. The area configuration update manager 1635 may be configured as or otherwise support a means for receiving, from the network entity according to a multiple access communication configuration, an area configuration update message that reconfigures the first registration area according to a mapping with a local area data network service area associated with the multiple access communication session.

In some examples, the UE location manager 1665 may be configured as or otherwise support a means for transmitting, to the network entity, a UE location update message with reference to the first registration area. In some examples, the MA PDU session manager 1640 may be configured as or otherwise support a means for terminating the multiple access communication session based on leaving the first registration area transmitting the UE location update message.

In some examples, the multiple access communication session includes a multiple access packet data unit session. In some examples, the network entity includes an access and mobility management functionality. In some examples, the first wireless communications link includes a first radio access technology link. In some examples, the second wireless communications link is a second radio access technology link that is different than the first radio access technology link. In some examples, the first wireless communication link includes a cellular link and the first registration area includes one or more tracking areas. In some examples, the second wireless communications link includes a non-cellular link and the second registration area includes one or more tracking areas. In some examples, the local area data network service area includes one or more of the tracking areas of the first registration area.

Additionally, or alternatively, the communications manager 1620 may support wireless communications at a UE in accordance with examples as disclosed herein. In some examples, the MA PDU session request manager 1625 may be configured as or otherwise support a means for transmitting, to a network entity, a request to establish a multiple access communication session including a first wireless communications link with the network entity via a first access network associated with a first registration area and a second wireless communications link with the network entity via a second access network associated with a second registration area, where a local area data network is associated with the requested multiple access communication session. In some examples, the MA PDU session establishment manager 1630 may be configured as or otherwise support a means for determining that the request to establish the multiple access communication session has been rejected. The MA PDU session manager 1640 may be configured as or otherwise support a means for receiving, from the network entity, an indication that the multiple access communication session is not supported for the local area data network.

In some examples, the network entity includes an access and mobility management functionality. In some examples, the first wireless communications link includes a first radio access technology link. In some examples, the second wireless communications link is a second radio access technology link that is different than the first radio access technology link.

Additionally, or alternatively, the communications manager 1620 may support wireless communications at a UE in accordance with examples as disclosed herein. In some examples, the MA PDU session request manager 1625 may be configured as or otherwise support a means for transmitting, to a network entity, a request to establish a multiple access communication session including a first wireless communications link with the network entity via a first access network associated with a first registration area and a second wireless communications link with the network entity via a second access network associated with a second registration area, where a local area data network is associated with the requested multiple access communication session. In some examples, the MA PDU session establishment manager 1630 may be configured as or otherwise support a means for establishing the multiple access communication session with the network entity based on transmitting the request. The registration update manager 1645 may be configured as or otherwise support a means for transmitting, to an access node based on leaving a local area data network service area for the local area data network while in an idle mode over the first wireless communications link and a connected mode over the second wireless communications link, an indication that the UE has left the local area data network service area.

In some examples, to support transmitting the indication that the UE has left the local area data network service area, the registration update manager 1645 may be configured as or otherwise support a means for transmitting, to a base station, a UE registration update via the first wireless communications link. In some examples, to support transmitting the indication that the UE has left the local area data network service area, the registration update manager 1645 may be configured as or otherwise support a means for transmitting, to a network entity, the indication that the UE has left the local area data network service area via the second wireless communications link.

In some examples, the trigger condition manager 1675 may be configured as or otherwise support a means for identifying trigger conditions including a connected mode over the second wireless communications link at the UE and a location of the UE, where transmitting the indication that the UE has left the local area data network service area is based on identifying the trigger conditions.

In some examples, the multiple access communication session includes a multiple access packet data unit session. In some examples, the network entity includes an access and mobility management functionality. In some examples, the first wireless communications link includes a first radio access technology link. In some examples, the second wireless communications link is a second radio access technology link that is different than the first radio access technology link. In some examples, the first wireless communication link includes a cellular link and the first registration area includes one or more tracking areas. In some examples, the second wireless communications link includes a non-cellular link and the second registration area includes one or more tracking areas. In some examples, the local area data network service area includes one or more of the tracking areas of the first registration area.

Additionally, or alternatively, the communications manager 1620 may support wireless communications at a UE in accordance with examples as disclosed herein. The LADN request manager 1650 may be configured as or otherwise support a means for transmitting, to a network entity, a registration request for a local area data network associated with a local area data network service area. The MA PDU session support manager 1655 may be configured as or otherwise support a means for receiving, from the network entity based on transmitting the registration request, or based on an area configuration update, or any combination thereof, local area data network configuration information including local area data network data network name information, tracking information for the local area data network service area, and an indication that a multiple access communication session for the local area data network is not supported for the UE. The LADN support manager 1660 may be configured as or otherwise support a means for communicating with the network entity via the local area data network based on receiving the local area data network configuration information.

In some examples, the MA PDU session request manager 1625 may be configured as or otherwise support a means for refraining, based on receiving the local area data network configuration information, from transmitting a request to establish the multiple access communication session including the local area data network and the wireless communications link that is different than the wireless communication link over which the registration request was transmitted.

In some examples, the multiple access communication session includes a multiple access packet data unit session. In some examples, the network entity includes an access and mobility management functionality. In some examples, the first wireless communications link includes a first radio access technology link. In some examples, the second wireless communications link is a second radio access technology link that is different than the first radio access technology link.

Figure 17:
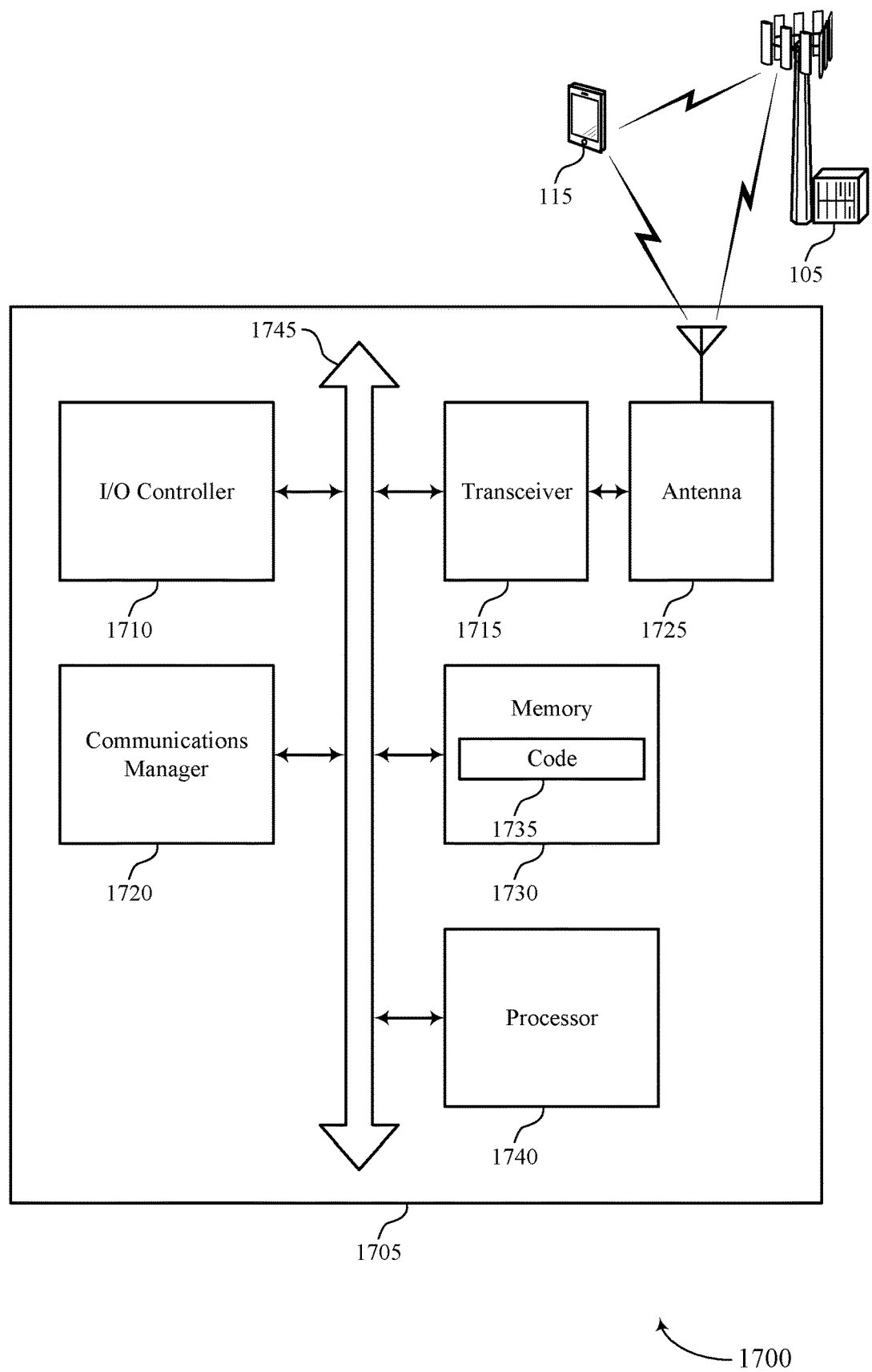
FIG. 17 shows a diagram of a system including a device that supports multi-access packet data unit sessions for local area data networks in accordance with aspects of the present disclosure.

FIG. 17 shows a diagram of a system 1700 including a device 1705 that supports multi-access packet data unit sessions for local area data networks in accordance with aspects of the present disclosure. The device 1705 may be an example of or include the components of a device 1405, a device 1505, or a UE 115 as described herein. The device 1705 may communicate wirelessly with one or more base stations 105, UEs 115, or any combination thereof. The device 1705 may include components for bi-directional voice and data communications including components for transmitting and receiving communications, such as a communications manager 1720, an input/output (I/O) controller 1710, a transceiver 1715, an antenna 1725, a memory 1730, code 1735, and a processor 1740. These components may be in electronic communication or otherwise coupled (e.g., operatively, communicatively, functionally, electronically, electrically) via one or more buses (e.g., a bus 1745).

The I/O controller 1710 may manage input and output signals for the device 1705. The I/O controller 1710 may also manage peripherals not integrated into the device 1705. In some cases, the I/O controller 1710 may represent a physical connection or port to an external peripheral. In some cases, the I/O controller 1710 may utilize an operating system such as iOS®, ANDROID®, MS-DOS®, MS-WINDOWS®, OS/2®, UNIX®, LINUX®, or another known operating system. Additionally, or alternatively, the I/O controller 1710 may represent or interact with a modem, a keyboard, a mouse, a touchscreen, or a similar device. In some cases, the I/O controller 1710 may be implemented as part of a processor, such as the processor 1740. In some cases, a user may interact with the device 1705 via the I/O controller 1710 or via hardware components controlled by the I/O controller 1710.

In some cases, the device 1705 may include a single antenna 1725. However, in some other cases, the device 1705 may have more than one antenna 1725, which may be capable of concurrently transmitting or receiving multiple wireless transmissions. The transceiver 1715 may communicate bi-directionally, via the one or more antennas 1725, wired, or wireless links as described herein. For example, the transceiver 1715 may represent a wireless transceiver and may communicate bi-directionally with another wireless transceiver. The transceiver 1715 may also include a modem to modulate the packets, to provide the modulated packets to one or more antennas 1725 for transmission, and to demodulate packets received from the one or more antennas 1725. The transceiver 1715, or the transceiver 1715 and one or more antennas 1725, may be an example of a transmitter 1415, a transmitter 1515, a receiver 1410, a receiver 1510, or any combination thereof or component thereof, as described herein.

The memory 1730 may include random access memory (RAM) and read-only memory (ROM). The memory 1730 may store computer-readable, computer-executable code 1735 including instructions that, when executed by the processor 1740, cause the device 1705 to perform various functions described herein. The code 1735 may be stored in a non-transitory computer-readable medium such as system memory or another type of memory. In some cases, the code 1735 may not be directly executable by the processor 1740 but may cause a computer (e.g., when compiled and executed) to perform functions described herein. In some cases, the memory 1730 may contain, among other things, a basic I/O system (BIOS) which may control basic hardware or software operation such as the interaction with peripheral components or devices.

The processor 1740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some other cases, a memory controller may be integrated into the processor 1740. The processor 1740 may be configured to execute computer-readable instructions stored in a memory (e.g., the memory 1730) to cause the device 1705 to perform various functions (e.g., functions or tasks supporting multi-access packet data unit sessions for local area data networks). For example, the device 1705 or a component of the device 1705 may include a processor 1740 and memory 1730 coupled to the processor 1740, the processor 1740 and memory 1730 configured to perform various functions described herein.

The communications manager 1720 may support wireless communications at a UE in accordance with examples as disclosed herein. For example, the communications manager 1720 may be configured as or otherwise support a means for transmitting, to a network entity, a request to establish a multiple access communication session including a first wireless communications link with the network entity via a first access network associated with a first registration area and a second wireless communications link with the network entity via a second access network associated with a second registration area. The communications manager 1720 may be configured as or otherwise support a means for establishing the multiple access communication session with the network entity based on transmitting the request. The communications manager 1720 may be configured as or otherwise support a means for receiving, from the network entity according to a multiple access communication configuration, an area configuration update message that reconfigures the first registration area according to a mapping with a local area data network service area associated with the multiple access communication session.

Additionally, or alternatively, the communications manager 1720 may support wireless communications at a UE in accordance with examples as disclosed herein. For example, the communications manager 1720 may be configured as or otherwise support a means for transmitting, to a network entity, a request to establish a multiple access communication session including a first wireless communications link with the network entity via a first access network associated with a first registration area and a second wireless communications link with the network entity via a second access network associated with a second registration area, where a local area data network is associated with the requested multiple access communication session. The communications manager 1720 may be configured as or otherwise support a means for determining that the request to establish the multiple access communication session has been rejected. The communications manager 1720 may be configured as or otherwise support a means for receiving, from the network entity, an indication that the multiple access communication session is not supported for the local area data network.

Additionally, or alternatively, the communications manager 1720 may support wireless communications at a UE in accordance with examples as disclosed herein. For example, the communications manager 1720 may be configured as or otherwise support a means for transmitting, to a network entity, a request to establish a multiple access communication session including a first wireless communications link with the network entity via a first access network associated with a first registration area and a second wireless communications link with the network entity via a second access network associated with a second registration area, where a local area data network is associated with the requested multiple access communication session. The communications manager 1720 may be configured as or otherwise support a means for establishing the multiple access communication session with the network entity based on transmitting the request. The communications manager 1720 may be configured as or otherwise support a means for transmitting, to an access node based on leaving a local area data network service area for the local area data network while in an idle mode over the first wireless communications link and a connected mode over the second wireless communications link, an indication that the UE has left the local area data network service area.

Additionally, or alternatively, the communications manager 1720 may support wireless communications at a UE in accordance with examples as disclosed herein. For example, the communications manager 1720 may be configured as or otherwise support a means for transmitting, to a network entity, a registration request for a local area data network associated with a local area data network service area. The communications manager 1720 may be configured as or otherwise support a means for receiving, from the network entity based on transmitting the registration request, or based on an area configuration update, or any combination thereof, local area data network configuration information including local area data network data network name information, tracking information for the local area data network service area, and an indication that a multiple access communication session for the local area data network is not supported for the UE. The communications manager 1720 may be configured as or otherwise support a means for communicating with the network entity via the local area data network based on receiving the local area data network configuration information.

By including or configuring the communications manager 1720 in accordance with examples as described herein, the device 1705 may support techniques for establishing or rejecting MA PDU sessions, or providing UE location information upon UE mobility in a timeline manner, resulting in improved system efficiency, more efficient use of user plane and computational resources, decreased system latency, and improved user experience.

In some examples, the communications manager 1720 may be configured to perform various operations (e.g., receiving, monitoring, transmitting) using or otherwise in cooperation with the transceiver 1715, the one or more antennas 1725, or any combination thereof. Although the communications manager 1720 is illustrated as a separate component, in some examples, one or more functions described with reference to the communications manager 1720 may be supported by or performed by the processor 1740, the memory 1730, the code 1735, or any combination thereof. For example, the code 1735 may include instructions executable by the processor 1740 to cause the device 1705 to perform various aspects of multi-access packet data unit sessions for local area data networks as described herein, or the processor 1740 and the memory 1730 may be otherwise configured to perform or support such operations.

Figure 18:
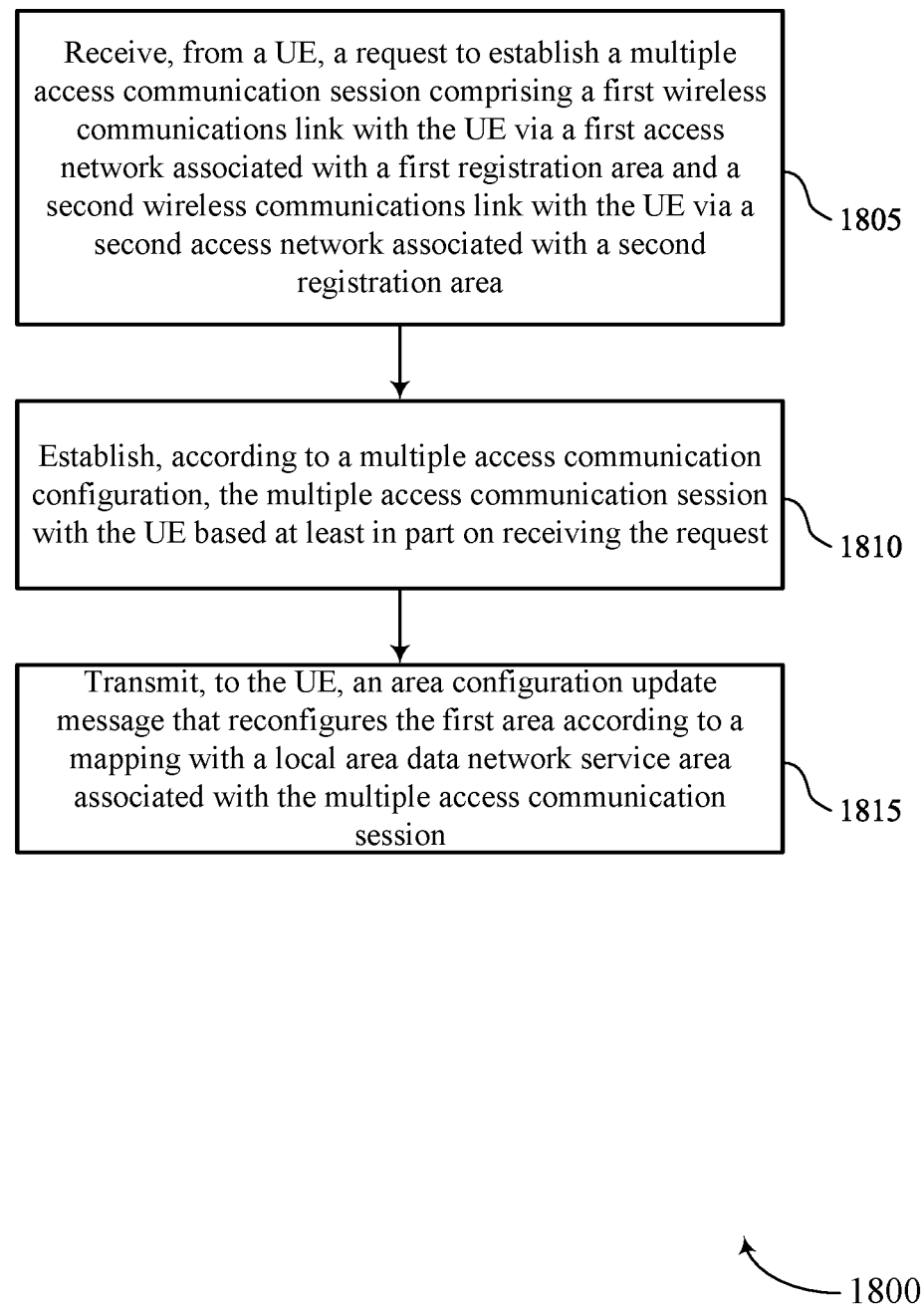
FIGS. 18 through 26 show flowcharts illustrating methods that support multi-access packet data unit sessions for local area data networks in accordance with aspects of the present disclosure.

FIG. 18 shows a flowchart illustrating a method 1800 that supports multi-access packet data unit sessions for local area data networks in accordance with aspects of the present disclosure. The operations of the method 1800 may be implemented by a base station or its components as described herein. For example, the operations of the method 1800 may be performed by a base station 105 as described with reference to FIGS. 1 through 13. In some examples, a base station may execute a set of instructions to control the functional elements of the base station to perform the described functions. Additionally, or alternatively, the base station may perform aspects of the described functions using special-purpose hardware.

At 1805, the method may include receiving, from a UE, a request to establish a multiple access communication session including a first wireless communications link with the UE via a first access network associated with a first registration area and a second wireless communications link with the UE via a second access network associated with a second registration area. The operations of 1805 may be performed in accordance with examples as disclosed herein. In some examples, aspects of the operations of 1805 may be performed by a MA PDU session request manager 1225 as described with reference to FIG. 12.

At 1810, the method may include establishing, according to a multiple access communication configuration, the multiple access communication session with the UE based on receiving the request. The operations of 1810 may be performed in accordance with examples as disclosed herein. In some examples, aspects of the operations of 1810 may be performed by a MA PDU session establishment manager 1230 as described with reference to FIG. 12.

At 1815, the method may include transmitting, to the UE, an area configuration update message that reconfigures the first registration area according to a mapping with a local area data network service area associated with the multiple access communication session. The operations of 1815 may be performed in accordance with examples as disclosed herein. In some examples, aspects of the operations of 1815 may be performed by an area configuration update manager 1235 as described with reference to FIG. 12.

Figure 19:
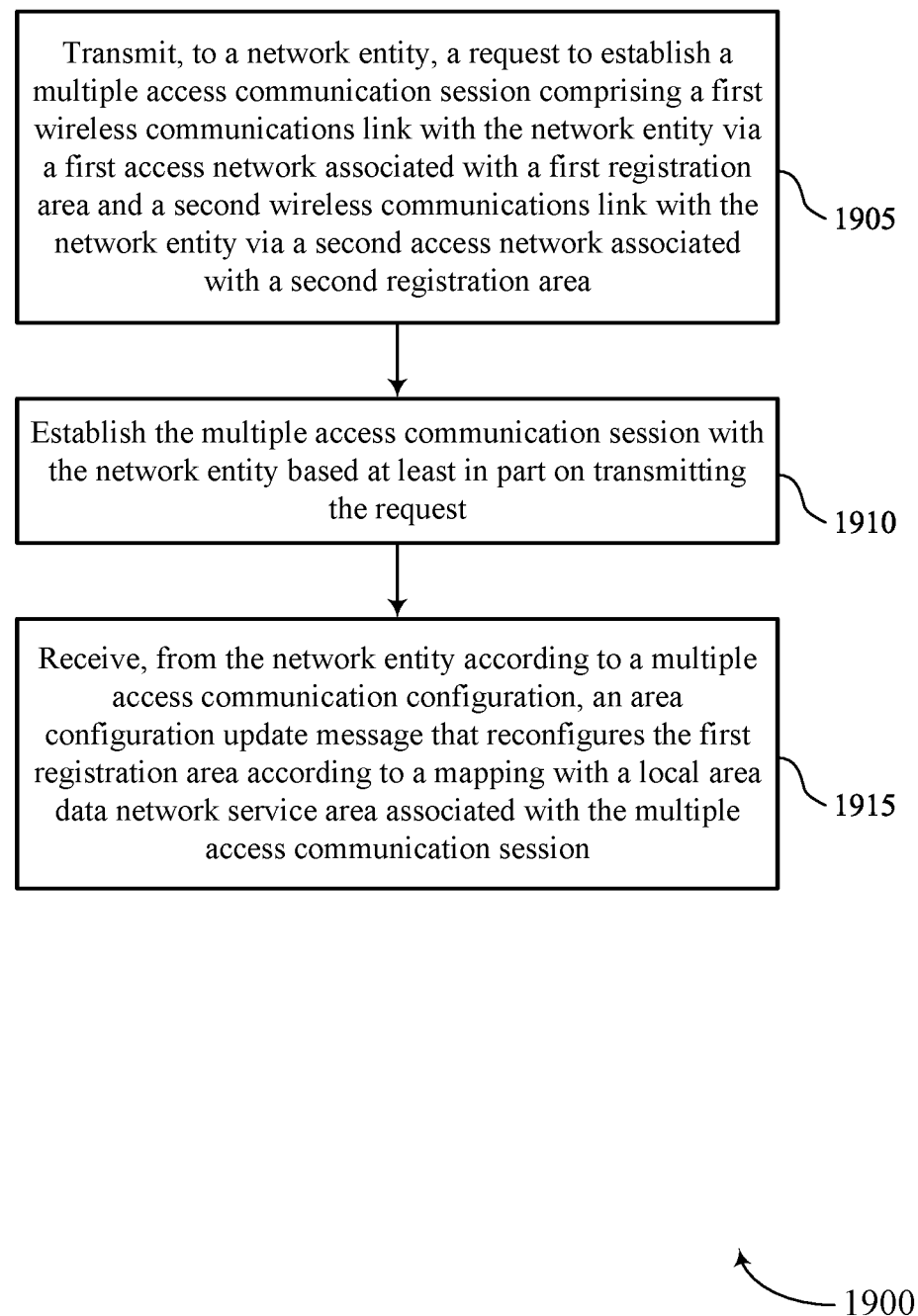

FIG. 19 shows a flowchart illustrating a method 1900 that supports multi-access packet data unit sessions for local area data networks in accordance with aspects of the present disclosure. The operations of the method 1900 may be implemented by a UE or its components as described herein. For example, the operations of the method 1900 may be performed by a UE 115 as described with reference to FIGS. 1 through 9 and 14 through 17. In some examples, a UE may execute a set of instructions to control the functional elements of the UE to perform the described functions. Additionally, or alternatively, the UE may perform aspects of the described functions using special-purpose hardware.

At 1905, the method may include transmitting, to a network entity, a request to establish a multiple access communication session including a first wireless communications link with the network entity via a first access network associated with a first registration area and a second wireless communications link with the network entity via a second access network associated with a second registration area. The operations of 1905 may be performed in accordance with examples as disclosed herein. In some examples, aspects of the operations of 1905 may be performed by a MA PDU session request manager 1625 as described with reference to FIG. 16.

At 1910, the method may include establishing the multiple access communication session with the network entity based on transmitting the request. The operations of 1910 may be performed in accordance with examples as disclosed herein. In some examples, aspects of the operations of 1910 may be performed by a MA PDU session establishment manager 1630 as described with reference to FIG. 16.

At 1915, the method may include receiving, from the network entity according to a multiple access communication configuration, an area configuration update message that reconfigures the first registration area according to a mapping with a local area data network service area associated with the multiple access communication session. The operations of 1915 may be performed in accordance with examples as disclosed herein. In some examples, aspects of the operations of 1915 may be performed by an area configuration update manager 1635 as described with reference to FIG. 16.

Figure 20:
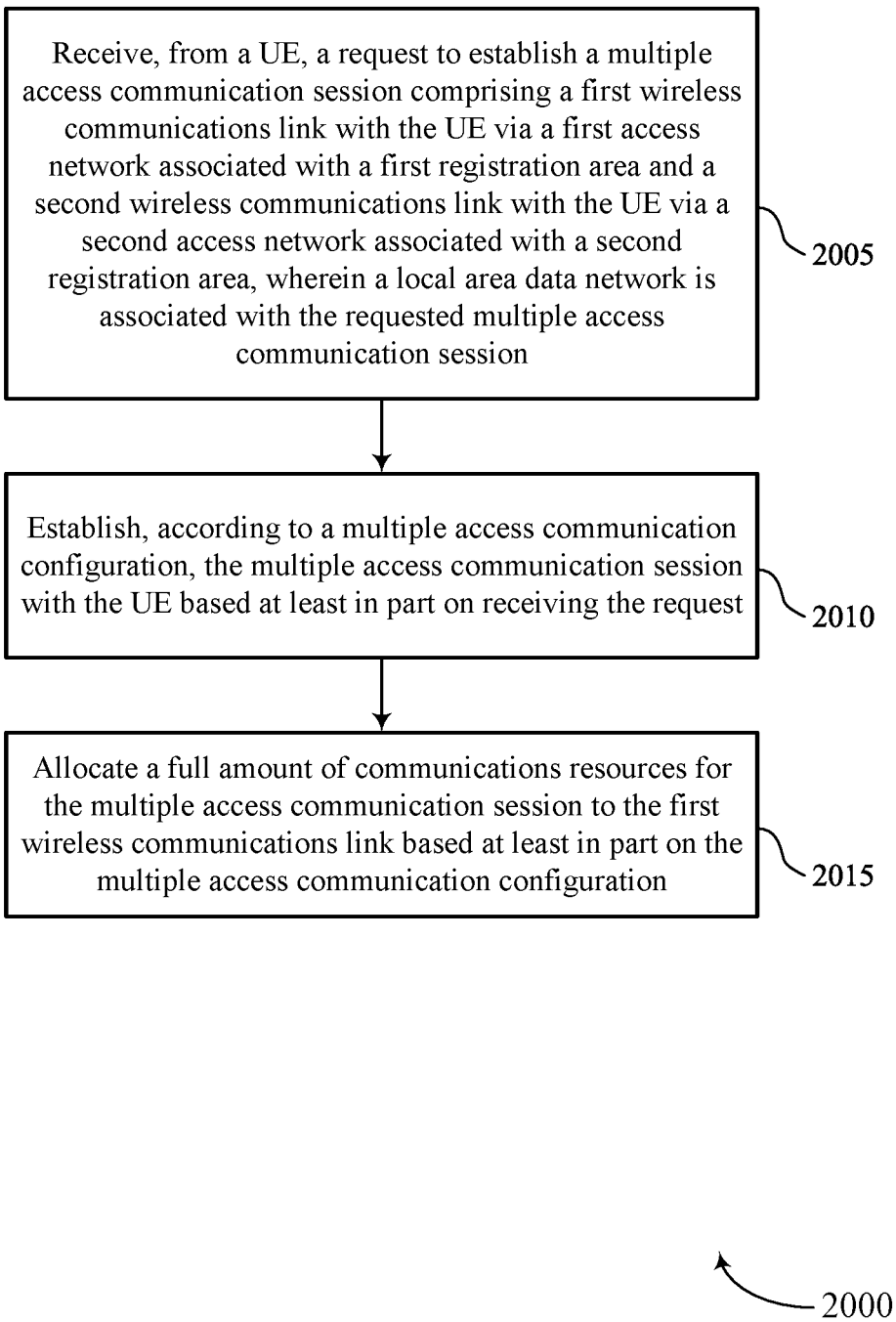

FIG. 20 shows a flowchart illustrating a method 2000 that supports multi-access packet data unit sessions for local area data networks in accordance with aspects of the present disclosure. The operations of the method 2000 may be implemented by a base station or its components as described herein. For example, the operations of the method 2000 may be performed by a base station 105 as described with reference to FIGS. 1 through 13. In some examples, a base station may execute a set of instructions to control the functional elements of the base station to perform the described functions. Additionally, or alternatively, the base station may perform aspects of the described functions using special-purpose hardware.

At 2005, the method may include receiving, from a UE, a request to establish a multiple access communication session including a first wireless communications link with the UE via a first access network associated with a first registration area and a second wireless communications link with the UE via a second access network associated with a second registration area, where a local area data network is associated with the requested multiple access communication session. The operations of 2005 may be performed in accordance with examples as disclosed herein. In some examples, aspects of the operations of 2005 may be performed by a MA PDU session request manager 1225 as described with reference to FIG. 12.

At 2010, the method may include establishing, according to a multiple access communication configuration, the multiple access communication session with the UE based on receiving the request. The operations of 2010 may be performed in accordance with examples as disclosed herein. In some examples, aspects of the operations of 2010 may be performed by a MA PDU session establishment manager 1230 as described with reference to FIG. 12.

At 2015, the method may include allocating a full amount of communications resources for the multiple access communication session to the first wireless communications link based on the multiple access communication configuration. The operations of 2015 may be performed in accordance with examples as disclosed herein. In some examples, aspects of the operations of 2015 may be performed by a communication steering manager 1240 as described with reference to FIG. 12.

Figure 21:
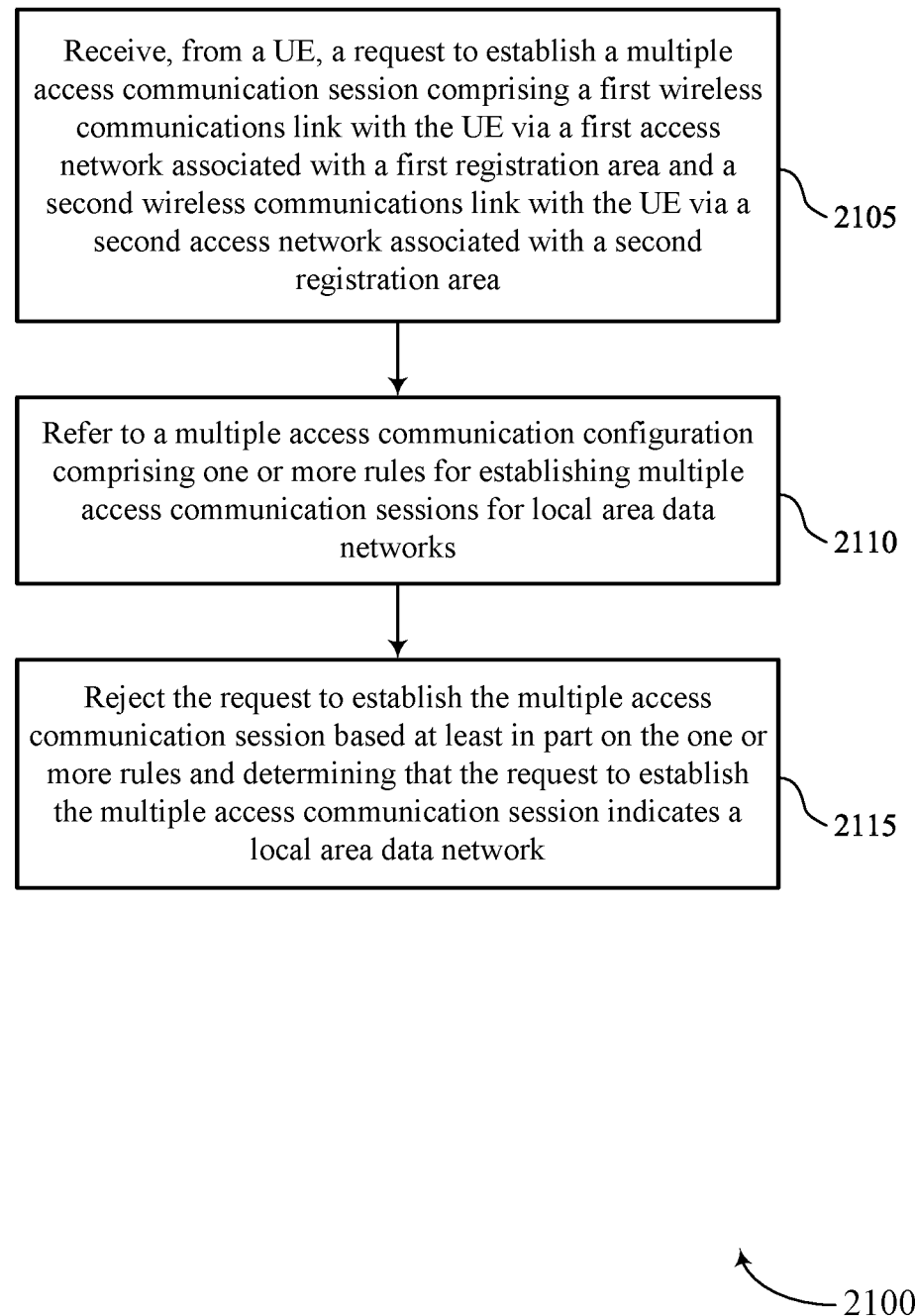

FIG. 21 shows a flowchart illustrating a method 2100 that supports multi-access packet data unit sessions for local area data networks in accordance with aspects of the present disclosure. The operations of the method 2100 may be implemented by a base station or its components as described herein. For example, the operations of the method 2100 may be performed by a base station 105 as described with reference to FIGS. 1 through 13. In some examples, a base station may execute a set of instructions to control the functional elements of the base station to perform the described functions. Additionally, or alternatively, the base station may perform aspects of the described functions using special-purpose hardware.

At 2105, the method may include receiving, from a UE, a request to establish a multiple access communication session including a first wireless communications link with the UE via a first access network associated with a first registration area and a second wireless communications link with the UE via a second access network associated with a second registration area. The operations of 2105 may be performed in accordance with examples as disclosed herein. In some examples, aspects of the operations of 2105 may be performed by a MA PDU session request manager 1225 as described with reference to FIG. 12.

At 2110, the method may include referring to a multiple access communication configuration including one or more rules for establishing multiple access communication sessions for local area data networks. The operations of 2110 may be performed in accordance with examples as disclosed herein. In some examples, aspects of the operations of 2110 may be performed by a multiple access communication configuration manager 1245 as described with reference to FIG. 12.

At 2115, the method may include rejecting the request to establish the multiple access communication session based on the one or more rules and determining that the request to establish the multiple access communication session indicates a local area data network. The operations of 2115 may be performed in accordance with examples as disclosed herein. In some examples, aspects of the operations of 2115 may be performed by a MA PDU session request manager 1225 as described with reference to FIG. 12.

Figure 22:
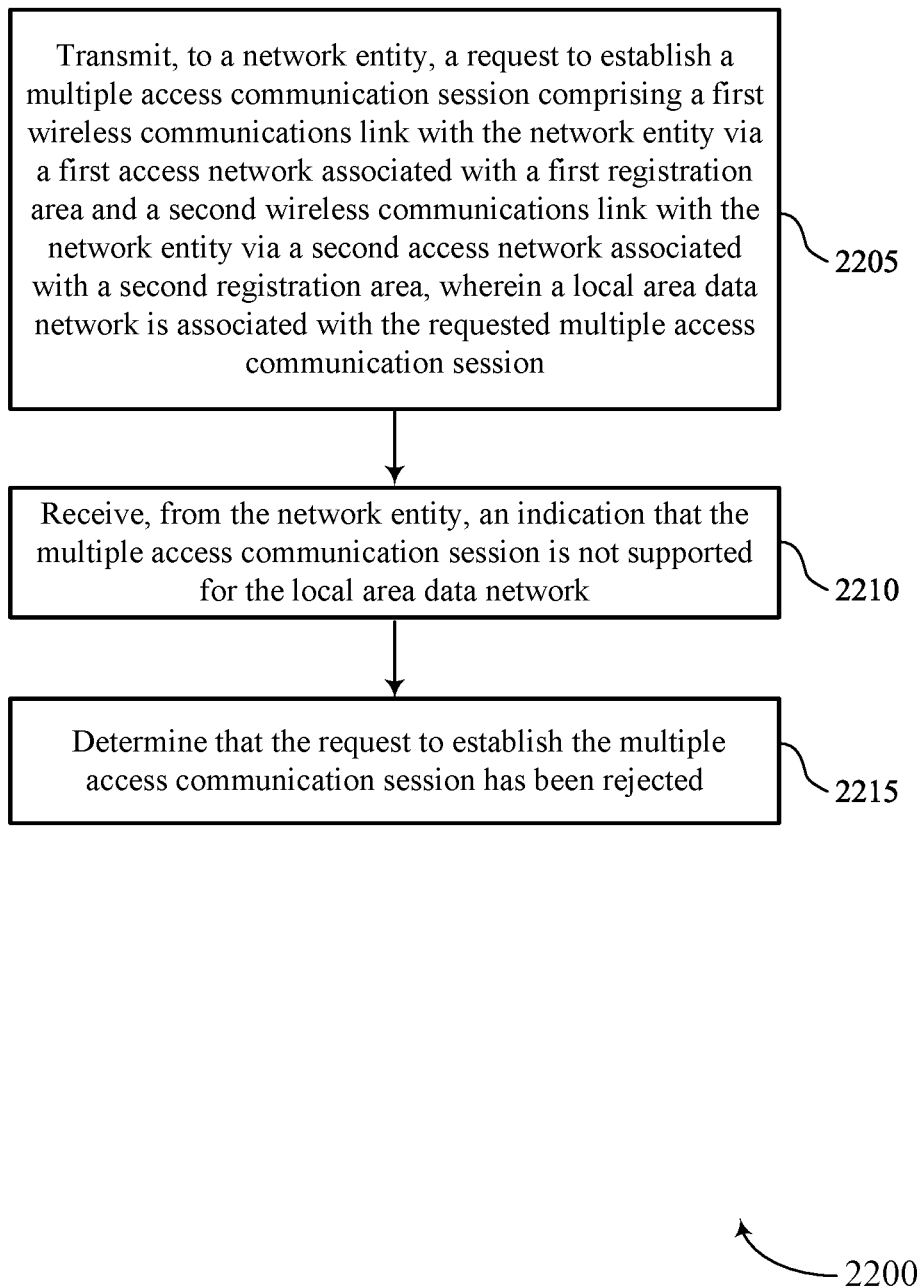

FIG. 22 shows a flowchart illustrating a method 2200 that supports multi-access packet data unit sessions for local area data networks in accordance with aspects of the present disclosure. The operations of the method 2200 may be implemented by a UE or its components as described herein. For example, the operations of the method 2200 may be performed by a UE 115 as described with reference to FIGS. 1 through 9 and 14 through 17. In some examples, a UE may execute a set of instructions to control the functional elements of the UE to perform the described functions. Additionally, or alternatively, the UE may perform aspects of the described functions using special-purpose hardware.

At 2205, the method may include transmitting, to a network entity, a request to establish a multiple access communication session including a first wireless communications link with the network entity via a first access network associated with a first registration area and a second wireless communications link with the network entity via a second access network associated with a second registration area, where a local area data network is associated with the requested multiple access communication session. The operations of 2205 may be performed in accordance with examples as disclosed herein. In some examples, aspects of the operations of 2205 may be performed by a MA PDU session request manager 1625 as described with reference to FIG. 16.

At 2210, the method may include receiving, from the network entity, an indication that the multiple access communication session is not supported for the local area data network. The operations of 2210 may be performed in accordance with examples as disclosed herein. In some examples, aspects of the operations of 2210 may be performed by a MA PDU session manager 1640 as described with reference to FIG. 16.

At 2215, the method may include determining that the request to establish the multiple access communication session has been rejected. The operations of 2215 may be performed in accordance with examples as disclosed herein. In some examples, aspects of the operations of 2215 may be performed by a MA PDU session establishment manager 1630 as described with reference to FIG. 16

Figure 23:
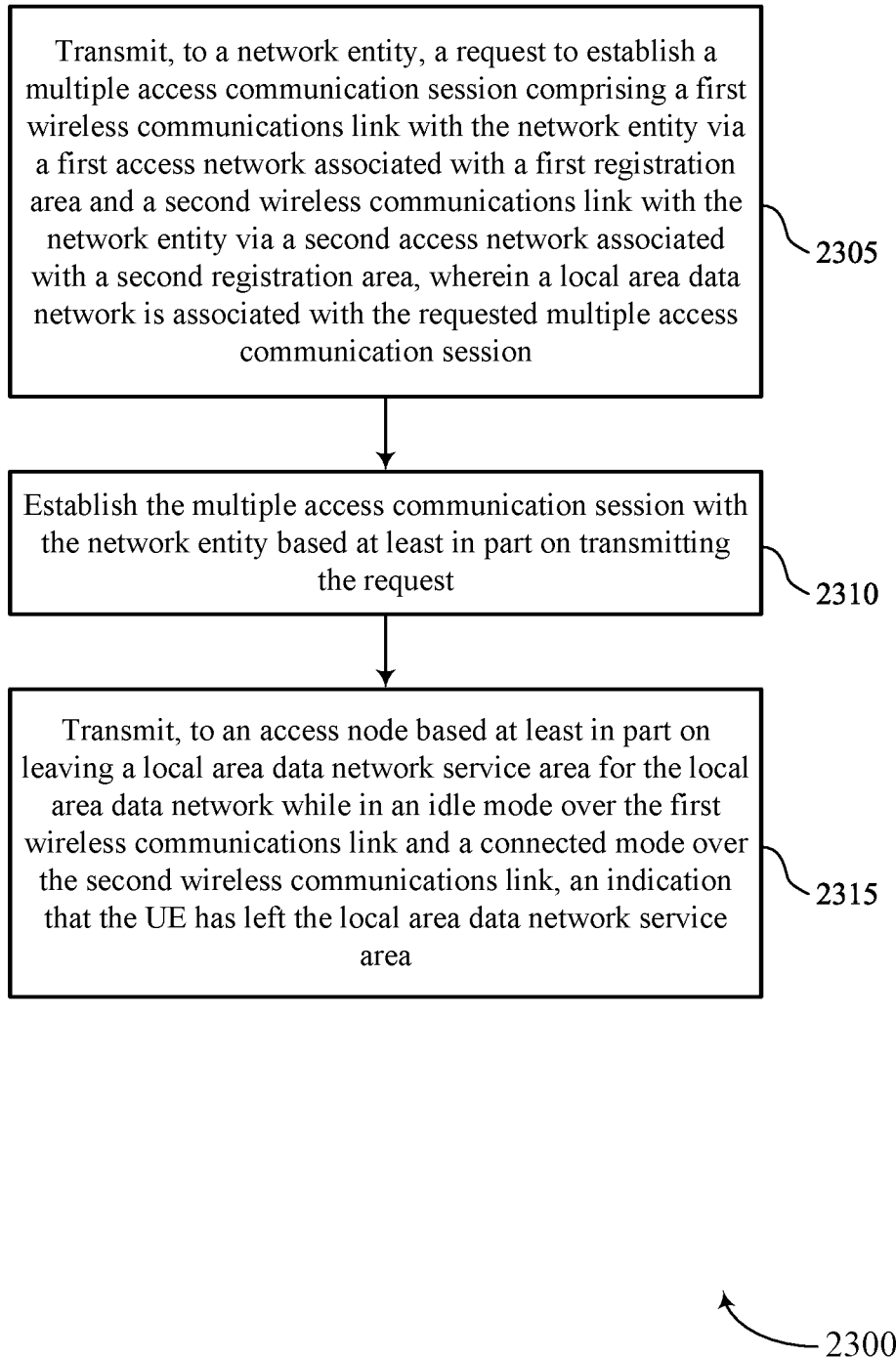

FIG. 23 shows a flowchart illustrating a method 2300 that supports multi-access packet data unit sessions for local area data networks in accordance with aspects of the present disclosure. The operations of the method 2300 may be implemented by a UE or its components as described herein. For example, the operations of the method 2300 may be performed by a UE 115 as described with reference to FIGS. 1 through 9 and 14 through 17. In some examples, a UE may execute a set of instructions to control the functional elements of the UE to perform the described functions. Additionally, or alternatively, the UE may perform aspects of the described functions using special-purpose hardware.

At 2305, the method may include transmitting, to a network entity, a request to establish a multiple access communication session including a first wireless communications link with the network entity via a first access network associated with a first registration area and a second wireless communications link with the network entity via a second access network associated with a second registration area, where a local area data network is associated with the requested multiple access communication session. The operations of 2305 may be performed in accordance with examples as disclosed herein. In some examples, aspects of the operations of 2305 may be performed by a MA PDU session request manager 1625 as described with reference to FIG. 16.

At 2310, the method may include establishing the multiple access communication session with the network entity based on transmitting the request. The operations of 2310 may be performed in accordance with examples as disclosed herein. In some examples, aspects of the operations of 2310 may be performed by a MA PDU session establishment manager 1630 as described with reference to FIG. 16.

At 2315, the method may include transmitting, to an access node based on leaving a local area data network service area for the local area data network while in an idle mode over the first wireless communications link and a connected mode over the second wireless communications link, an indication that the UE has left the local area data network service area. The operations of 2315 may be performed in accordance with examples as disclosed herein. In some examples, aspects of the operations of 2315 may be performed by a registration update manager 1645 as described with reference to FIG. 16.

Figure 24:
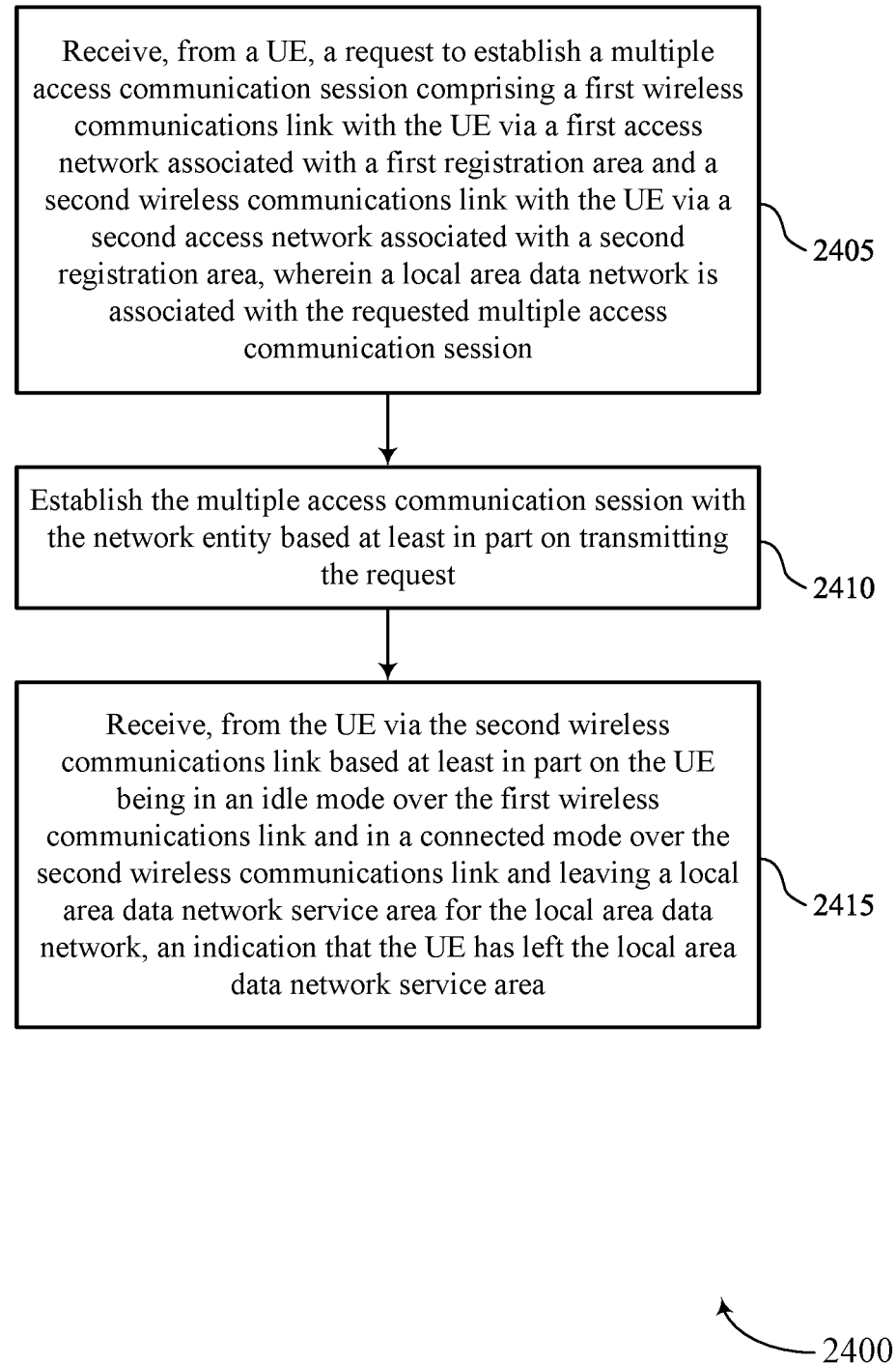

FIG. 24 shows a flowchart illustrating a method 2400 that supports multi-access packet data unit sessions for local area data networks in accordance with aspects of the present disclosure. The operations of the method 2400 may be implemented by a base station or its components as described herein. For example, the operations of the method 2400 may be performed by a base station 105 as described with reference to FIGS. 1 through 13. In some examples, a base station may execute a set of instructions to control the functional elements of the base station to perform the described functions. Additionally, or alternatively, the base station may perform aspects of the described functions using special-purpose hardware.

At 2405, the method may include receiving, from a UE, a request to establish a multiple access communication session including a first wireless communications link with the UE via a first access network associated with a first registration area and a second wireless communications link with the UE via a second access network associated with a second registration area, where a local area data network is associated with the requested multiple access communication session. The operations of 2405 may be performed in accordance with examples as disclosed herein. In some examples, aspects of the operations of 2405 may be performed by a MA PDU session request manager 1225 as described with reference to FIG. 12.

At 2410, the method may include establishing the multiple access communication session with the network entity based on transmitting the request. The operations of 2410 may be performed in accordance with examples as disclosed herein. In some examples, aspects of the operations of 2410 may be performed by a MA PDU session establishment manager 1230 as described with reference to FIG. 12.

At 2415, the method may include receiving, from the UE via the second wireless communications link based on the UE being in an idle mode over the first wireless communications link and in a connected mode over the second wireless communications link and leaving a local area data network service area for the local area data network, an indication that the UE has left the local area data network service area. The operations of 2415 may be performed in accordance with examples as disclosed herein. In some examples, aspects of the operations of 2415 may be performed by a registration update manager 1250 as described with reference to FIG. 12.

Figure 25:
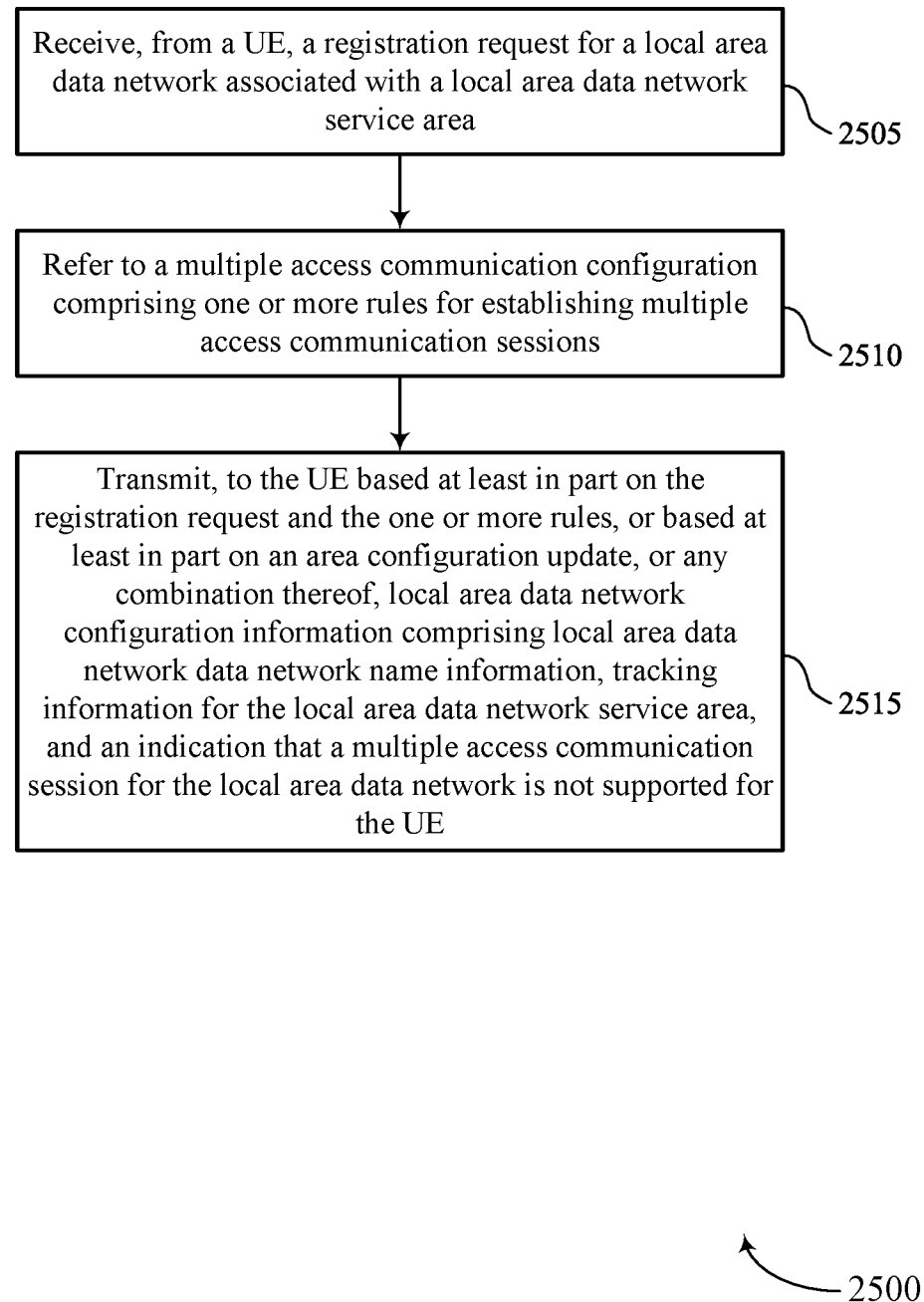

FIG. 25 shows a flowchart illustrating a method 2500 that supports multi-access packet data unit sessions for local area data networks in accordance with aspects of the present disclosure. The operations of the method 2500 may be implemented by a base station or its components as described herein. For example, the operations of the method 2500 may be performed by a base station 105 as described with reference to FIGS. 1 through 13. In some examples, a base station may execute a set of instructions to control the functional elements of the base station to perform the described functions. Additionally, or alternatively, the base station may perform aspects of the described functions using special-purpose hardware.

At 2505, the method may include receiving, from a UE, a registration request for a local area data network associated with a local area data network service area. The operations of 2505 may be performed in accordance with examples as disclosed herein. In some examples, aspects of the operations of 2505 may be performed by a MA PDU session request manager 1225 as described with reference to FIG. 12.

At 2510, the method may include referring to a multiple access communication configuration including one or more rules for establishing multiple access communication sessions. The operations of 2510 may be performed in accordance with examples as disclosed herein. In some examples, aspects of the operations of 2510 may be performed by a MA PDU session establishment manager 1230 as described with reference to FIG. 12.

At 2515, the method may include transmitting, to the UE based on the registration request and the one or more rules, or based on an area configuration update, or any combination thereof, local area data network configuration information including local area data network data network name information, tracking information for the local area data network service area, and an indication that a multiple access communication session for the local area data network is not supported for the UE. The operations of 2515 may be performed in accordance with examples as disclosed herein. In some examples, aspects of the operations of 2515 may be performed by a LADN support manager 1255 as described with reference to FIG. 12.

Figure 26:
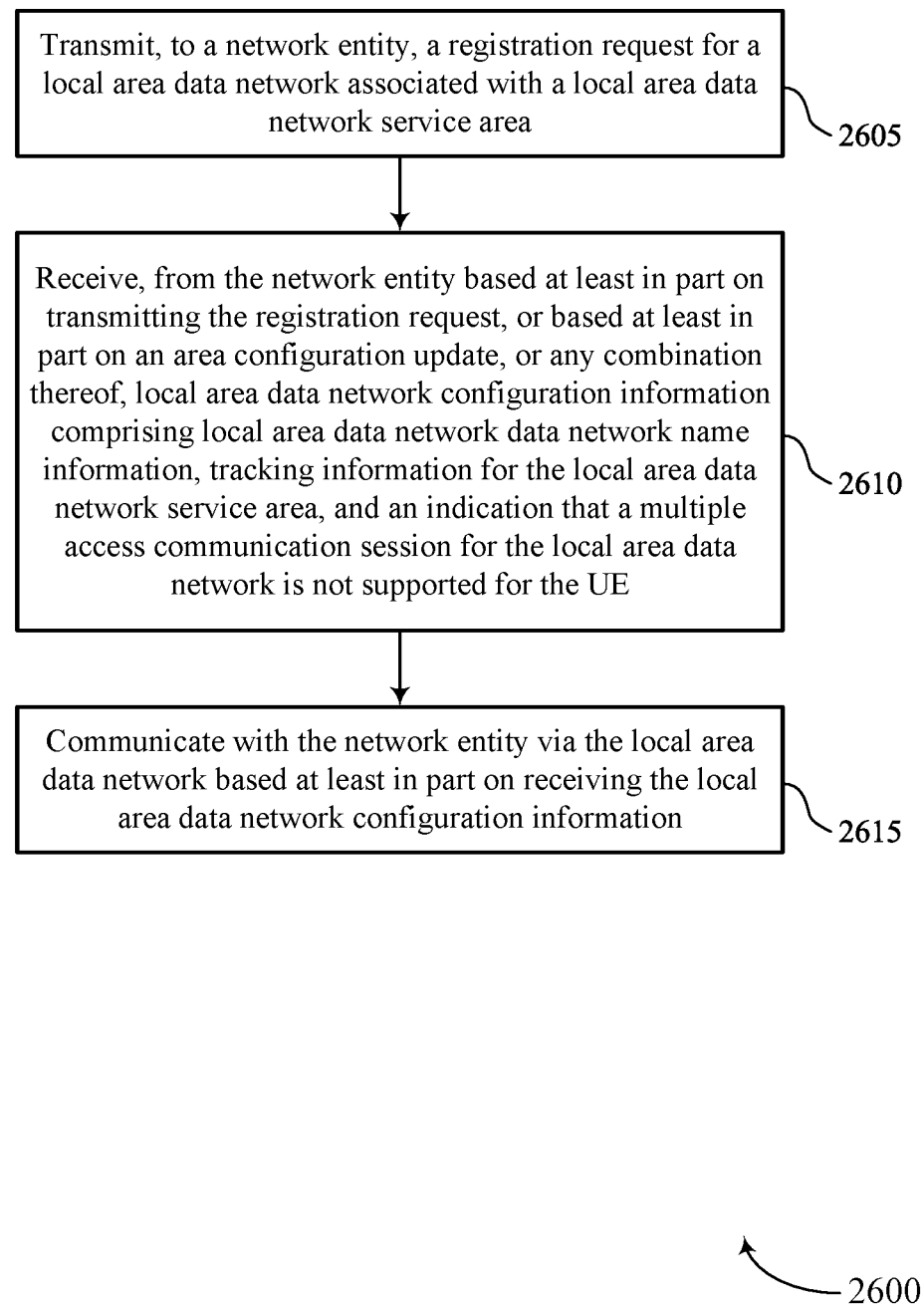

FIG. 26 shows a flowchart illustrating a method 2600 that supports multi-access packet data unit sessions for local area data networks in accordance with aspects of the present disclosure. The operations of the method 2600 may be implemented by a UE or its components as described herein. For example, the operations of the method 2600 may be performed by a UE 115 as described with reference to FIGS. 1 through 9 and 14 through 17. In some examples, a UE may execute a set of instructions to control the functional elements of the UE to perform the described functions. Additionally, or alternatively, the UE may perform aspects of the described functions using special-purpose hardware.

At 2605, the method may include transmitting, to a network entity, a registration request for a local area data network associated with a local area data network service area. The operations of 2605 may be performed in accordance with examples as disclosed herein. In some examples, aspects of the operations of 2605 may be performed by a LADN request manager 1650 as described with reference to FIG. 16.

At 2610, the method may include receiving, from the network entity based on transmitting the registration request, or based on an area configuration update, or any combination thereof, local area data network configuration information including local area data network data network name information, tracking information for the local area data network service area, and an indication that a multiple access communication session for the local area data network is not supported for the UE. The operations of 2610 may be performed in accordance with examples as disclosed herein. In some examples, aspects of the operations of 2610 may be performed by a MA PDU session support manager 1655 as described with reference to FIG. 16.

At 2615, the method may include communicating with the network entity via the local area data network based on receiving the local area data network configuration information. The operations of 2615 may be performed in accordance with examples as disclosed herein. In some examples, aspects of the operations of 2615 may be performed by a LADN support manager 1660 as described with reference to FIG. 16.

The following provides an overview of aspects of the present disclosure:

Aspect 1: A method for wireless communications at a network entity, comprising: receiving, from a UE, a request to establish a multiple access communication session comprising a first wireless communications link with the UE via a first access network associated with a first registration area and a second wireless communications link with the UE via a second access network associated with a second registration area; establishing, according to a multiple access communication configuration, the multiple access communication session with the UE based at least in part on receiving the request; and transmitting, to the UE, an area configuration update message that reconfigures the first registration area according to a mapping with a LADN service area associated with the multiple access communication session.

Aspect 2: The method of aspect 1, further comprising: reconfiguring the first registration area by mapping the first registration area according to a mapping with the LADN service area by mapping one or more aspects of a geographic boundary of the first registration area to one or more corresponding aspects of a geographic boundary of the LADN service area, wherein transmitting the area configuration update message is based at least in part on the reconfiguring.

Aspect 3: The method of any of aspects 1 through 2, further comprising: receiving, from the UE, a UE location update message with reference to the first registration area; determining, based at least in part on receiving the UE location update message and on the reconfigured first registration area, that the UE has left the LADN service area; and terminating the multiple access communications session with the UE based at least in part on the determining.

Aspect 4: The method of any of aspects 1 through 3, wherein the multiple access communication configuration comprises one or more conditions, and establishing the multiple access communication session is based at least in part on determining that the one or more conditions are satisfied.

Aspect 5: The method of any of aspects 1 through 4, wherein the multiple access communication session comprises a multiple access packet data unit session.

Aspect 6: The method of any of aspects 1 through 5, wherein the network entity comprises an access and AMF.

Aspect 7: The method of any of aspects 1 through 6, wherein the first wireless communications link comprises a first radio access technology link, and the second wireless communications link is a second radio access technology link that is different than the first radio access technology link.

Aspect 8: The method of any of aspects 1 through 7, wherein the first wireless communication link comprises a cellular link and the first registration area comprises one or more tracking areas; the second wireless communications link comprises a non-cellular link and the second registration area comprises one or more tracking areas; and the LADN service area comprises one or more of the tracking areas of the first registration area.

Aspect 9: A method for wireless communications at a UE, comprising: transmitting, to a network entity, a request to establish a multiple access communication session comprising a first wireless communications link with the network entity via a first access network associated with a first registration area and a second wireless communications link with the network entity via a second access network associated with a second registration area; establishing the multiple access communication session with the network entity based at least in part on transmitting the request; and receiving, from the network entity according to a multiple access communication configuration, an area configuration update message that reconfigures the first registration area according to a mapping with a LADN service area associated with the multiple access communication session.

Aspect 10: The method of aspect 9, further comprising: transmitting, to the network entity, a UE location update message with reference to the first registration area; and terminating the multiple access communication session based at least in part on leaving the first registration area transmitting the UE location update message.

Aspect 11: The method of any of aspects 9 through 10, wherein the multiple access communication session comprises a multiple access packet data unit session.

Aspect 12: The method of any of aspects 9 through 11, wherein the network entity comprises an access and AMF.

Aspect 13: The method of any of aspects 9 through 12, wherein the first wireless communications link comprises a first radio access technology link, and the second wireless communications link is a second radio access technology link that is different than the first radio access technology link.

Aspect 14: The method of any of aspects 9 through 13, wherein the first wireless communication link comprises a cellular link and the first registration area comprises one or more tracking areas; the second wireless communications link comprises a non-cellular link and the second registration area comprises one or more tracking areas; and the LADN service area comprises one or more of the tracking areas of the first registration area.

Aspect 15: A method for wireless communications at a network entity, comprising: receiving, from a UE, a request to establish a multiple access communication session comprising a first wireless communications link with the UE via a first access network associated with a first registration area and a second wireless communications link with the UE via a second access network associated with a second registration area, wherein a LADN is associated with the requested multiple access communication session; establishing, according to a multiple access communication configuration, the multiple access communication session with the UE based at least in part on receiving the request; and allocating a full amount of communications resources for the multiple access communication session to the first wireless communications link based at least in part on the multiple access communication configuration.

Aspect 16: The method of aspect 15, further comprising: allocating none of the communications resources for the multiple access communication session to the second wireless communications link based at least in part on the multiple access communication configuration.

Aspect 17: The method of any of aspects 15 through 16, further comprising: transmitting, to the UE, a load balancing parameter indicating that the full amount of communications resources for the multiple access communication session are to be allocated to the first wireless communications link.

Aspect 18: The method of any of aspects 15 through 17, wherein the multiple access communication configuration comprises one or more conditions, and establishing the multiple access communication session is based at least in part on determining that the one or more conditions are satisfied.

Aspect 19: The method of any of aspects 15 through 18, wherein the multiple access communication session comprises a multiple access packet data unit session.

Aspect 20: The method of any of aspects 15 through 19, wherein the network entity comprises an access and AMF.

Aspect 21: The method of any of aspects 15 through 20, wherein the first wireless communications link comprises a first radio access technology link, and the second wireless communications link is a second radio access technology link that is different than the first radio access technology link.

Aspect 22: The method of any of aspects 15 through 21, wherein the first wireless communication link comprises a cellular link and the first registration area comprises one or more tracking areas; the second wireless communications link comprises a non-cellular link and the second registration area comprises one or more tracking areas; and the LADN service area comprises one or more of the tracking areas of the first registration area.

Aspect 23: A method for wireless communications at a network entity, comprising: receiving, from a UE, a request to establish a multiple access communication session comprising a first wireless communications link with the UE via a first access network associated with a first registration area and a second wireless communications link with the UE via a second access network associated with a second registration area; rejecting the request to establish the multiple access communication session based at least in part on determining that the request to establish the multiple access communication session is for a LADN.

Aspect 24: The method of aspect 23, further comprising: transmitting, to the UE, an indication that the multiple access communication session is not supported for the LADN.

Aspect 25: The method of any of aspects 23 through 24, wherein the network entity comprises an access and AMF.

Aspect 26: The method of any of aspects 23 through 25, wherein the first access network comprises a third generation partnership project (3GPP) access network; and the second access network comprises a non-3GPP access network.

Aspect 27: The method of any of aspects 23 through 26, wherein the first wireless communications link comprises a first radio access technology link, and the second wireless communications link is a second radio access technology link that is different than the first radio access technology link.

Aspect 28: The method of aspect 27, wherein the first radio access technology link is a cellular link; and the second radio access technology link is a wireless fidelity (Wi-Fi) link.

Aspect 29: The method of any of aspects 23 through 28, wherein receiving the request to establish the multiple access communication session includes receiving a non-access stratum (NAS) transport message comprising a multi access PDU request, an identifier for the LADN, a PDU establishment request, or a combination thereof.

Aspect 30: A method for wireless communications at a UE, comprising: transmitting, to a network entity, a request to establish a multiple access communication session comprising a first wireless communications link with the network entity via a first access network associated with a first registration area and a second wireless communications link with the network entity via a second access network associated with a second registration area, wherein a LADN is applicable to the requested multiple access communication session; receiving, from the network entity, an indication that the multiple access communication session is not supported for the LADN; and determining that the request to establish the multiple access communication session has been rejected.

Aspect 31: The method of aspect 30, wherein the network entity comprises an access and AMF.

Aspect 32: The method of any of aspects 30 through 31, wherein the first access network comprises a 3GPP access network; and the second access network comprises a non-3GPP access network.

Aspect 33: The method of any of aspects 30 through 32, wherein the first wireless communications link comprises a first radio access technology link, and the second wireless communications link is a second radio access technology link that is different than the first radio access technology link.

Aspect 34: The method of aspect 33, wherein the first radio access technology link is a cellular link; and the second radio access technology link is a wireless fidelity (Wi-Fi) link.

Aspect 35: The method of any of aspects 30 through 34, wherein transmitting the request to establish the multiple access communication session includes transmitting a non-access stratum (NAS) transport message comprising a multi access PDU request, an identifier for the LADN, a PDU establishment request, or a combination thereof.

Aspect 36: A method for wireless communications at a UE, comprising: transmitting, to a network entity, a request to establish a multiple access communication session comprising a first wireless communications link with the network entity via a first access network associated with a first registration area and a second wireless communications link with the network entity via a second access network associated with a second registration area, wherein a LADN is associated with the requested multiple access communication session; establishing the multiple access communication session with the network entity based at least in part on transmitting the request; and transmitting, via an access node to the network entity, based at least in part on leaving a LADN service area for the LADN while in an idle mode over the first wireless communications link and a connected mode over the second wireless communications link, an indication that the UE has left the LADN service area.

Aspect 37: The method of aspect 36, wherein transmitting the indication that the UE has left the LADN service area comprises: transmitting, to the network entity, a UE registration update via the first wireless communications link.

Aspect 38: The method of any of aspects 36 through 37, wherein transmitting the indication that the UE has left the LADN service area comprises: transmitting, to the network entity, the indication that the UE has left the LADN service area via the second wireless communications link.

Aspect 39: The method of any of aspects 36 through 38, further comprising: identifying trigger conditions comprising the connected mode over the second wireless communications link at the UE and a location of the UE, wherein transmitting the indication that the UE has left the LADN service area is based at least in part on identifying the trigger conditions.

Aspect 40: The method of any of aspects 36 through 39, wherein the multiple access communication session comprises a multiple access packet data unit session.

Aspect 41: The method of any of aspects 36 through 40, wherein the network entity comprises an access and AMF.

Aspect 42: The method of any of aspects 36 through 41, wherein the first access network comprises a 3GPP access network; and the second access network comprises a non-3GPP access network.

Aspect 43: The method of any of aspects 36 through 42, wherein the first wireless communications link comprises a first radio access technology link, and the second wireless communications link is a second radio access technology link that is different than the first radio access technology link.

Aspect 44: The method of aspect 43, wherein the first radio access technology link is a cellular link; and the second radio access technology link is a wireless fidelity (Wi-Fi) link.

Aspect 45: The method of any of aspects 36 through 44, wherein the first wireless communications link comprises a cellular link and the first registration area comprises one or more tracking areas; the second wireless communications link comprises a non-cellular link and the second registration area comprises one or more tracking areas; and the LADN service area comprises one or more of the tracking areas of the first registration area.

Aspect 46: A method for wireless communications at a network entity, comprising: receiving, from a UE, a request to establish a multiple access communication session comprising a first wireless communications link with the UE via a first access network associated with a first registration area and a second wireless communications link with the UE via a second access network associated with a second registration area, wherein a LADN is associated with the requested multiple access communication session; establishing the multiple access communication session with the network entity based at least in part on transmitting the request; and receiving, from the UE via the second wireless communications link based at least in part on the UE being in an idle mode over the first wireless communications link and in a connected mode over the second wireless communications link and leaving LADN service area for the LADN, an indication that the UE has left the LADN service area.

Aspect 47: The method of aspect 46, wherein the multiple access communication session comprises a multiple access packet data unit session.

Aspect 48: The method of any of aspects 46 through 47, wherein the network entity comprises an access and AMF.

Aspect 49: The method of any of aspects 46 through 48, wherein the first access network comprises a 3GPP access network; and the second access network comprises a non-3GPP access network.

Aspect 50: The method of any of aspects 46 through 49, wherein the first wireless communications link comprises a first radio access technology link, and the second wireless communications link is a second radio access technology link that is different than the first radio access technology link.

Aspect 51: The method of aspect 50, wherein the first radio access technology link is a cellular link; and the second radio access technology link is a wireless fidelity (Wi-Fi) link.

Aspect 52: The method of any of aspects 46 through 51, wherein the first wireless communications link comprises a cellular link and the first registration area comprises one or more tracking areas; the second wireless communications link comprises a non-cellular link and the second registration area comprises one or more tracking areas; and the LADN service area comprises one or more of the tracking areas of the first registration area.

Aspect 53: A method for wireless communications at a network entity, comprising: receiving, from a UE, a registration request for a LADN associated with a LADN service area; referring to a multiple access communication configuration comprising one or more rules for establishing multiple access communication sessions; and transmitting, to the UE based at least in part on the registration request and the one or more rules, or based at least in part on an area configuration update, or any combination thereof, LADN configuration information comprising LADN data network name information, tracking information for the LADN service area, and an indication that a multiple access communication session for the LADN is not supported for the UE.

Aspect 54: The method of aspect 53, wherein the multiple access communication session comprises a multiple access packet data unit session.

Aspect 55: The method of any of aspects 53 through 54, wherein the network entity comprises an access and AMF.

Aspect 56: The method of any of aspects 53 through 55, wherein the first wireless communications link comprises a first radio access technology link, and the second wireless communications link is a second radio access technology link that is different than the first radio access technology link.

Aspect 57: A method for wireless communications at a UE, comprising: transmitting, to a network entity, a registration request for a LADN associated with a LADN service area; receiving, from the network entity based at least in part on transmitting the registration request, or based at least in part on an area configuration update, or any combination thereof, LADN configuration information comprising LADN data network data network name information, tracking information for the LADN data network service area, and an indication that a multiple access communication session for the LADN is not supported for the UE; and communicating with the network entity via the LADN based at least in part on receiving the LADN configuration information.

Aspect 58: The method of aspect 57, further comprising: refraining, based at least in part on receiving the LADN configuration information, from transmitting a request to establish the multiple access communication session comprising the LADN and the wireless communications link that is different than the wireless communication link over which the registration request was transmitted.

Aspect 59: The method of any of aspects 57 through 58, wherein the multiple access communication session comprises a multiple access packet data unit session.

Aspect 60: The method of any of aspects 57 through 59, wherein the network entity comprises an access and AMF.

Aspect 61: The method of any of aspects 57 through 60, wherein the first wireless communications link comprises a first radio access technology link, and the second wireless communications link is a second radio access technology link that is different than the first radio access technology link.

Aspect 62: An apparatus for wireless communications at a network entity, comprising a processor; memory coupled with the processor; and instructions stored in the memory and executable by the processor to cause the apparatus to perform a method of any of aspects 1 through 8.

Aspect 63: An apparatus for wireless communications at a network entity, comprising at least one means for performing a method of any of aspects 1 through 8.

Aspect 64: A non-transitory computer-readable medium storing code for wireless communications at a network entity, the code comprising instructions executable by a processor to perform a method of any of aspects 1 through 8.

Aspect 65: An apparatus for wireless communications at a UE, comprising a processor; memory coupled with the processor; and instructions stored in the memory and executable by the processor to cause the apparatus to perform a method of any of aspects 9 through 14.

Aspect 66: An apparatus for wireless communications at a UE, comprising at least one means for performing a method of any of aspects 9 through 14.

Aspect 67: A non-transitory computer-readable medium storing code for wireless communications at a UE, the code comprising instructions executable by a processor to perform a method of any of aspects 9 through 14.

Aspect 68: An apparatus for wireless communications at a network entity, comprising a processor; memory coupled with the processor; and instructions stored in the memory and executable by the processor to cause the apparatus to perform a method of any of aspects 15 through 22.

Aspect 69: An apparatus for wireless communications at a network entity, comprising at least one means for performing a method of any of aspects 15 through 22.

Aspect 70: A non-transitory computer-readable medium storing code for wireless communications at a network entity, the code comprising instructions executable by a processor to perform a method of any of aspects 15 through 22.

Aspect 71: An apparatus for wireless communications at a network entity, comprising a processor; memory coupled with the processor; and instructions stored in the memory and executable by the processor to cause the apparatus to perform a method of any of aspects 23 through 29.

Aspect 72: An apparatus for wireless communications at a network entity, comprising at least one means for performing a method of any of aspects 23 through 29.

Aspect 73: A non-transitory computer-readable medium storing code for wireless communications at a network entity, the code comprising instructions executable by a processor to perform a method of any of aspects 23 through 29.

Aspect 74: An apparatus for wireless communications at a UE, comprising a processor; memory coupled with the processor; and instructions stored in the memory and executable by the processor to cause the apparatus to perform a method of any of aspects 30 through 35.

Aspect 75: An apparatus for wireless communications at a UE, comprising at least one means for performing a method of any of aspects 30 through 35.

Aspect 76: A non-transitory computer-readable medium storing code for wireless communications at a UE, the code comprising instructions executable by a processor to perform a method of any of aspects 30 through 35.

Aspect 77: An apparatus for wireless communications at a UE, comprising a processor; memory coupled with the processor; and instructions stored in the memory and executable by the processor to cause the apparatus to perform a method of any of aspects 36 through 45.

Aspect 78: An apparatus for wireless communications at a UE, comprising at least one means for performing a method of any of aspects 36 through 45.

Aspect 79: A non-transitory computer-readable medium storing code for wireless communications at a UE, the code comprising instructions executable by a processor to perform a method of any of aspects 36 through 45.

Aspect 80: An apparatus for wireless communications at a network entity, comprising a processor; memory coupled with the processor; and instructions stored in the memory and executable by the processor to cause the apparatus to perform a method of any of aspects 46 through 52.

Aspect 81: An apparatus for wireless communications at a network entity, comprising at least one means for performing a method of any of aspects 46 through 52.

Aspect 82: A non-transitory computer-readable medium storing code for wireless communications at a network entity, the code comprising instructions executable by a processor to perform a method of any of aspects 46 through 52.

Aspect 83: An apparatus for wireless communications at a network entity, comprising a processor; memory coupled with the processor; and instructions stored in the memory and executable by the processor to cause the apparatus to perform a method of any of aspects 53 through 56.

Aspect 84: An apparatus for wireless communications at a network entity, comprising at least one means for performing a method of any of aspects 53 through 56.

Aspect 85: A non-transitory computer-readable medium storing code for wireless communications at a network entity, the code comprising instructions executable by a processor to perform a method of any of aspects 53 through 56.

Aspect 86: An apparatus for wireless communications at a UE, comprising a processor; memory coupled with the processor; and instructions stored in the memory and executable by the processor to cause the apparatus to perform a method of any of aspects 57 through 61.

Aspect 87: An apparatus for wireless communications at a UE, comprising at least one means for performing a method of any of aspects 57 through 61.

Aspect 88: A non-transitory computer-readable medium storing code for wireless communications at a UE, the code comprising instructions executable by a processor to perform a method of any of aspects 57 through 61.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a network entity, comprising:
   receiving, from a user equipment (UE), a request to establish a multiple access communication session comprising a first wireless communications link with the UE via a first access network associated with a first registration area and a second wireless communications link with the UE via a second access network associated with a second registration area, wherein the first wireless communications link and the second wireless communications link are associated with a local area data network (LADN) that the multiple access communication session does not support; and
   rejecting the request to establish the multiple access communication session based at least in part on the multiple access communication session not supporting the LADN.

2. The method of claim 1, further comprising:
   transmitting, to the UE, an indication that the multiple access communication session is not supported for the LADN.

3. The method of claim 1, wherein the network entity comprises an access and mobility management functionality (AMF).

4. The method of claim 1, wherein:
   the first access network comprises a third generation partnership project (3GPP) access network; and
   the second access network comprises a non-3GPP access network.

5. The method of claim 1, wherein:
the first wireless communications link comprises a first radio access technology link, and
the second wireless communications link is a second radio access technology link that is different than the first radio access technology link.

6. The method of claim 5, wherein:
the first radio access technology link is a cellular link; and
the second radio access technology link is a wireless fidelity (Wi-Fi) link.

7. The method of claim 1, wherein receiving the request to establish the multiple access communication session further comprises:
receiving a non-access stratum (NAS) transport message comprising a multi access protocol data unit request, an identifier for the LADN, a protocol data unit establishment request, or a combination thereof.

8. A method for wireless communications at a user equipment (UE), comprising:
transmitting, to a network entity, a request to establish a multiple access communication session comprising a first wireless communications link with the network entity via a first access network associated with a first registration area and a second wireless communications link with the network entity via a second access network associated with a second registration area, wherein the first wireless communications link and the second wireless communications link are associated with a local area data network (LADN) that the multiple access communication session does not support;
receiving, from the network entity, an indication that the multiple access communication session is rejected based at least in part on the multiple access communication session not supporting the LADN; and
determining that the request to establish the multiple access communication session has been rejected.

9. The method of claim 8, wherein the network entity comprises an access and mobility management functionality (AMF).

10. The method of claim 8, wherein:
the first access network comprises a third generation partnership project (3GPP) access network; and
the second access network comprises a non-3GPP access network.

11. The method of claim 8, wherein:
the first wireless communications link comprises a first radio access technology link, and
the second wireless communications link is a second radio access technology link that is different than the first radio access technology link.

12. The method of claim 11, wherein:
the first radio access technology link is a cellular link; and
the second radio access technology link is a wireless fidelity (Wi-Fi) link.

13. The method of claim 8, wherein transmitting the request to establish the multiple access communication session further comprises:
transmitting a non-access stratum (NAS) transport message comprising a multi access protocol data unit request, an identifier for the LADN, a protocol data unit establishment request, or a combination thereof.

14. A network entity, comprising:
one or more memories storing processor-executable code; and
one or more processors coupled with the one or more memories and individually or collectively operable to execute the code to cause the network entity to:
receive, from a user equipment (UE), a request to establish a multiple access communication session comprising a first wireless communications link with the UE via a first access network associated with a first registration area and a second wireless communications link with the UE via a second access network associated with a second registration area, wherein the first wireless communications link and the second wireless communications link are associated with a local area data network (LADN) that the multiple access communication session does not support; and
reject the request to establish the multiple access communication session based at least in part on the multiple access communication session not supporting the LADN.

15. The network entity of claim 14, wherein the one or more processors are individually or collectively further operable to execute the code to cause the network entity to:
transmit, to the UE, an indication that the multiple access communication session is not supported for the LADN.

16. The network entity of claim 14, wherein the network entity comprises an access and mobility management functionality (AMF).

17. The network entity of claim 14, wherein:
the first access network comprises a third generation partnership project (3GPP) access network; and
the second access network comprises a non-3GPP access network.

18. The network entity of claim 14, wherein:
the first wireless communications link comprises a first radio access technology link, and
the second wireless communications link is a second radio access technology link that is different than the first radio access technology link.

19. The network entity of claim 18, wherein:
the first radio access technology link is a cellular link; and
the second radio access technology link is a wireless fidelity (Wi-Fi) link.

20. The network entity of claim 14, wherein, to receive the request to establish the multiple access communication session, the one or more processors are individually or collectively further operable to execute the code to cause the network entity to:
receive a non-access stratum (NAS) transport message comprising a multi access protocol data unit request, an identifier for the LADN, a protocol data unit establishment request, or a combination thereof.

21. A user equipment (UE), comprising:
one or more memories storing processor-executable code; and
one or more processors coupled with the one or more memories and individually or collectively operable to execute the code to cause the UE to:
transmit, to a network entity, a request to establish a multiple access communication session comprising a first wireless communications link with the network entity via a first access network associated with a first registration area and a second wireless communications link with the network entity via a second access network associated with a second registration area, wherein the first wireless communications link and the second wireless communications link are associated with a local area data network (LADN) that the multiple access communication session does not support;

receive, from the network entity, an indication that the multiple access communication session is rejected based at least in part on the multiple access communication session not supporting the LADN; and determine that the request to establish the multiple access communication session has been rejected.

22. The UE of claim 21, wherein the network entity comprises an access and mobility management functionality (AMF).

23. The UE of claim 21, wherein:
the first access network comprises a third generation partnership project (3GPP) access network; and
the second access network comprises a non-3GPP access network.

24. The UE of claim 21, wherein:
the first wireless communications link comprises a first radio access technology link, and
the second wireless communications link is a second radio access technology link that is different than the first radio access technology link.

25. The UE of claim 24, wherein:
the first radio access technology link is a cellular link; and
the second radio access technology link is a wireless fidelity (Wi-Fi) link.

26. The UE of claim 21, wherein, to transmit the request to establish the multiple access communication session, the one or more processors are individually or collectively further operable to execute the code to cause the UE to:
transmit a non-access stratum (NAS) transport message comprising a multi access protocol data unit request, an identifier for the LADN, a protocol data unit establishment request, or a combination thereof.

* * * * *